United States Patent
Hayakawa et al.

(10) Patent No.: US 7,278,393 B2
(45) Date of Patent: Oct. 9, 2007

(54) DIRECT INJECTION TYPE FUEL INJECTION DEVICE AND FUEL INJECTION CONTROL DEVICE FOR INTERNAL COMBUSTION ENGINE

(75) Inventors: Masaya Hayakawa, Obu (JP); Kazuhiro Yoneshige, Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 10/747,452

(22) Filed: Dec. 30, 2003

(65) Prior Publication Data

US 2004/0154584 A1 Aug. 12, 2004

(30) Foreign Application Priority Data

Feb. 6, 2003 (JP) ............................. 2003-029419
Jun. 30, 2003 (JP) ............................. 2003-186472

(51) Int. Cl.
*F02M 43/00* (2006.01)
*F02B 3/00* (2006.01)
(52) U.S. Cl. ...................................... 123/304; 123/294
(58) Field of Classification Search ................ 123/304, 123/305, 294, 299, 300, 27 GE, 472
See application file for complete search history.

(56) References Cited

U.S. PATENT DOCUMENTS 4,742,801 A * 5/1988 Kelgard ................. 123/27 GE

FOREIGN PATENT DOCUMENTS

| JP | A 04-50469 | 2/1992 |
| JP | A 11-280593 | 10/1999 |
| JP | A 2000-97032 | 4/2000 |

* cited by examiner

*Primary Examiner*—John T. Kwon
(74) *Attorney, Agent, or Firm*—Oliff & Berridge PLC

(57) ABSTRACT

A fuel injection device is provided with a fuel injection valve for injecting fuel into a combustion chamber and an air injection valve for the injection of air into the combustion chamber. One fuel injection orifice which opens into the combustion chamber is provided correspondingly to the fuel injection valve and plural air injection orifices which open into the combustion chamber are provided correspondingly to the air injection valve. A design is made so that fuel and air injected from the fuel injection orifice and the air injection orifices come into collision with each other at a collision point. The shape, size and direction of the fuel injection orifice are specified. Likewise, the number, shape, size and direction of the air injection orifice, as well as its arrangement relative to the fuel injection orifice, are specified. A design is made so that the size of a fuel spray and that of air jets at the collision point become equal to each other. A fuel injection control device is provided with various sensors for detecting an operating condition of an engine and an electronic control unit (ECU) for controlling the fuel injection valve and the air injection valve each independently. For controlling a spray penetration distance, a spray particle diameter and a spray shape of the fuel injected from the fuel injection orifice, the ECU, on the basis of the detected operating condition of the engine, controls the fuel injection valve and also controls at least one of timing and period of air injection performed by the air injection valve.

22 Claims, 45 Drawing Sheets

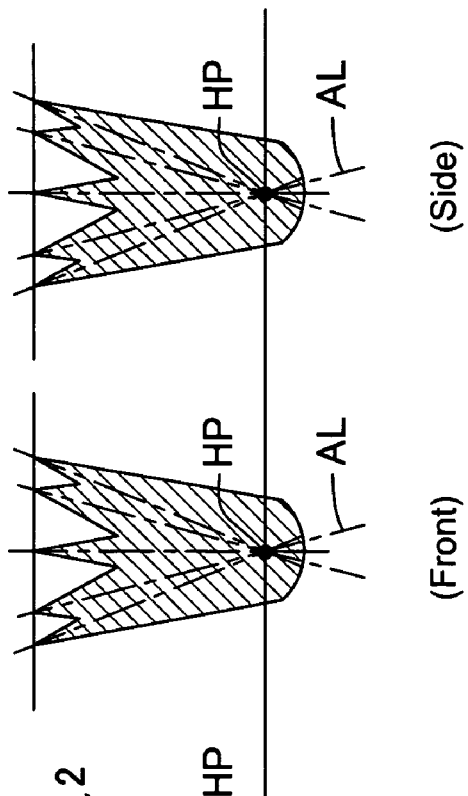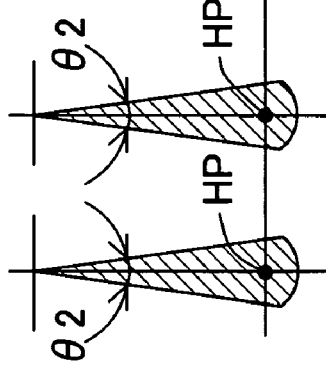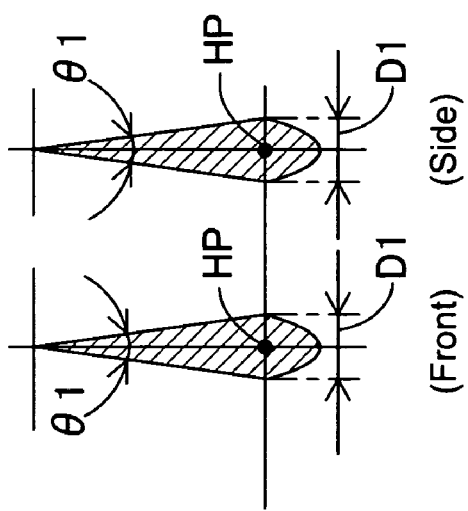

Fuel spray

One air jet
(Free jet)

Peripheral air jets
(Multi-orifice jets)

FIG. 13

| Operating Conditions | ① Low temperature starting operation | ② Partial load operation | ③ Full load operation |
|---|---|---|---|
| a) Combustion Pattern | Warm-up Combustion | Stratified Charge Combustion | Uniform Combustion |
| b) Fuel/air injection periods | Same period | Air injection period is longer. | Air injection period is somewhat longer. |
| c) Fuel/air injection timing difference | Same timing | Air injection timing precedes. | Air injection timing somewhat precedes. |
| d) Spray penetration distance | Short | Long | Medium |
| e) Spray particle diameter | Small | Small | Small |
| f) Spray shape | Large spray angle | Small spray angle | Medium spray angle |

FIG. 14A Fuel injection valve
FIG. 14B Air injection valve
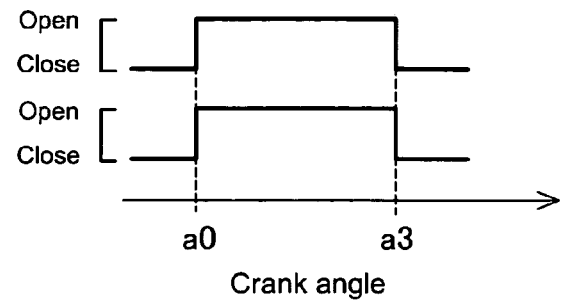
FIG. 15A Fuel injection valve
FIG. 15B Air injection valve
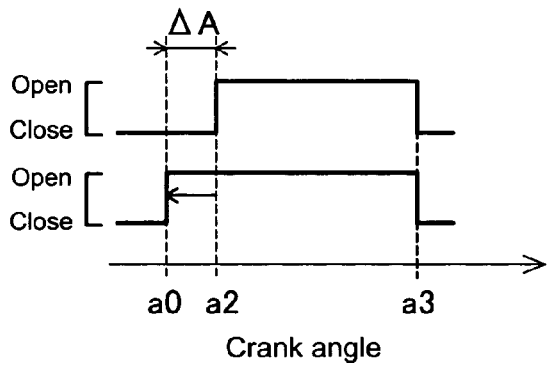
FIG. 16A Fuel injection valve
FIG. 16B Air injection valve
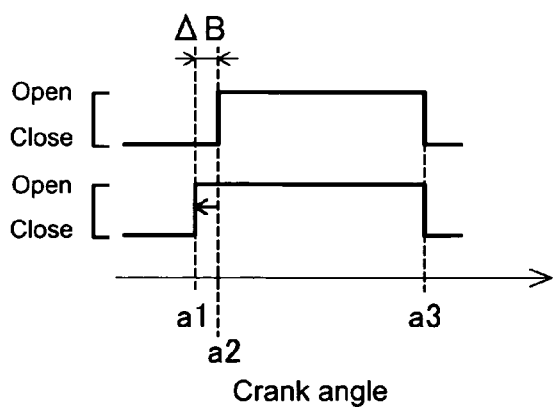

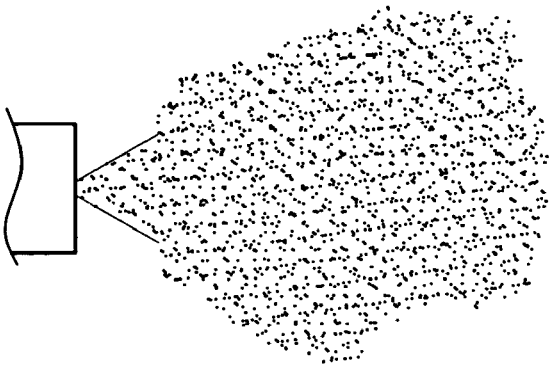
FIG. 20C  Fuel spray with air injection preceding fuel injection by "2.0 ms"
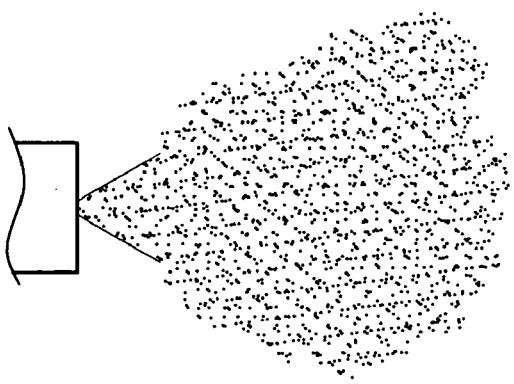
FIG. 20B  Fuel spray with air injection preceding fuel injection by "1.0 ms"
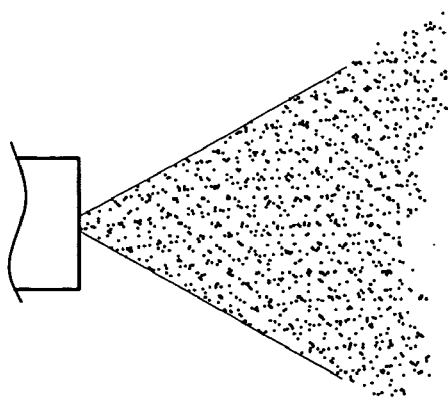
FIG. 20A  Fuel spray with no air injection FIG. 21B
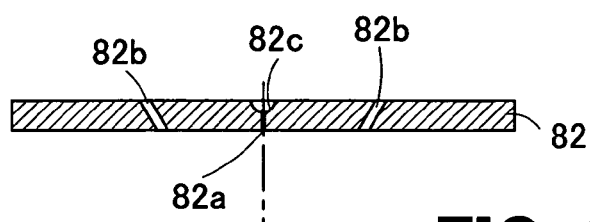
FIG. 21A  FIG. 21D  FIG. 21C
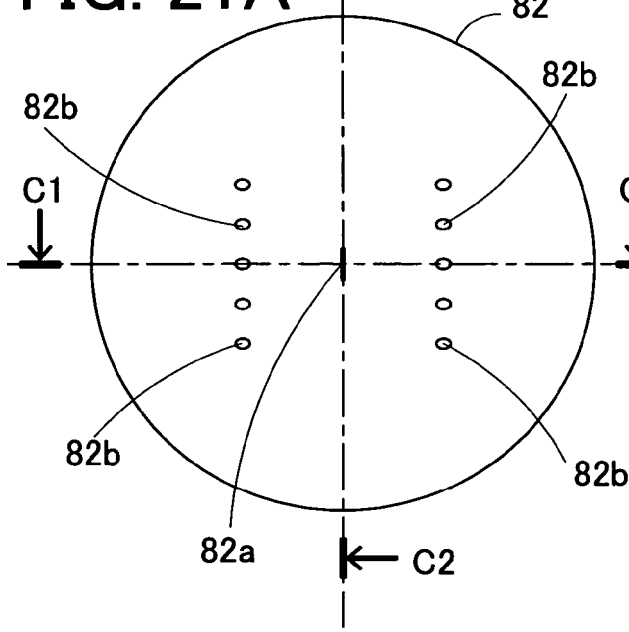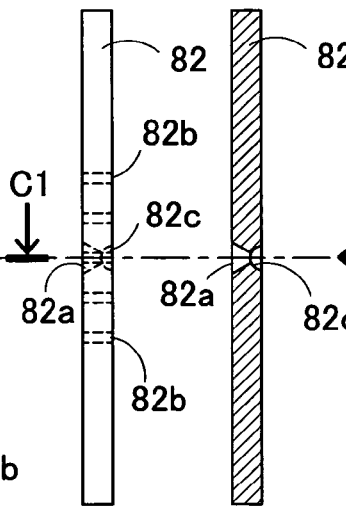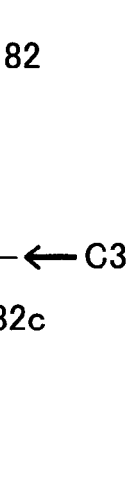

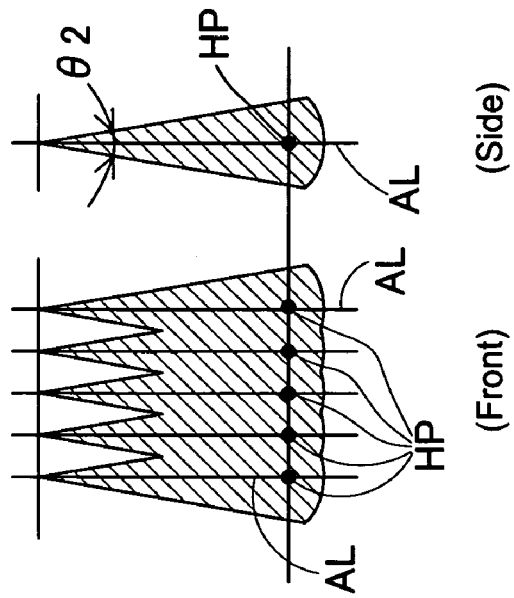
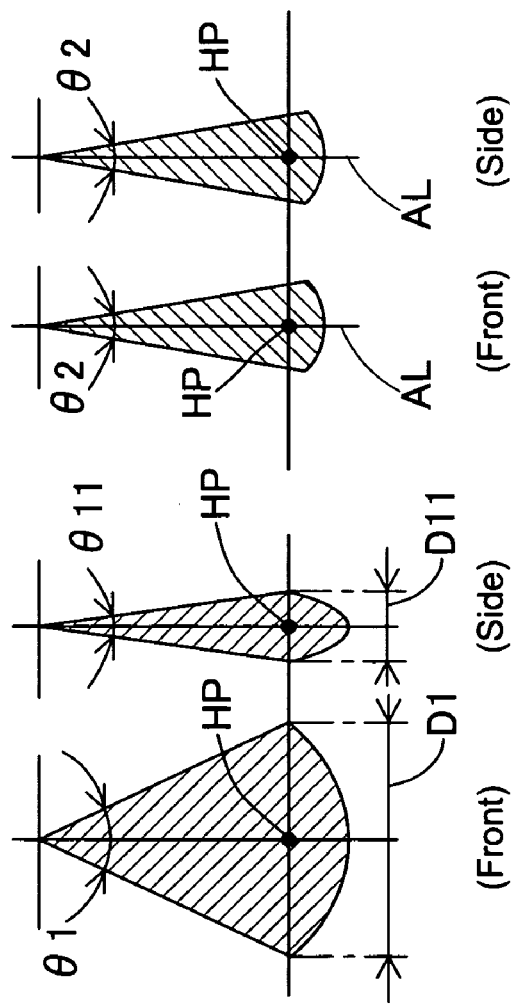

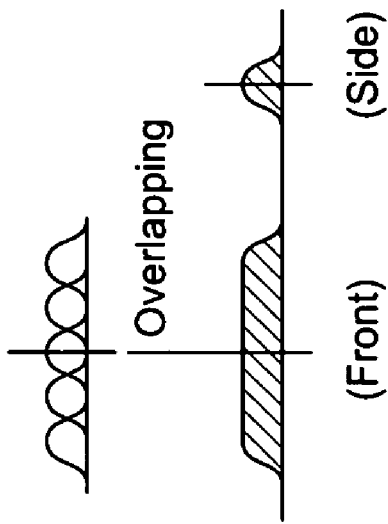
FIG. 23C — Plural air jets (Multi-orifice jets) — Overlapping — (Front) (Side)
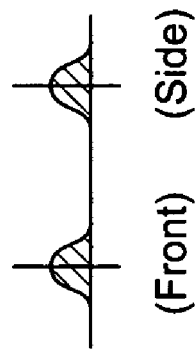
FIG. 23B — One air jet (Free jet) — (Front) (Side)
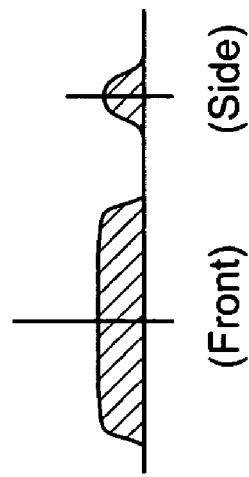
FIG. 23A — Fuel spray (Flat) — (Front) (Side)

FIG. 25B
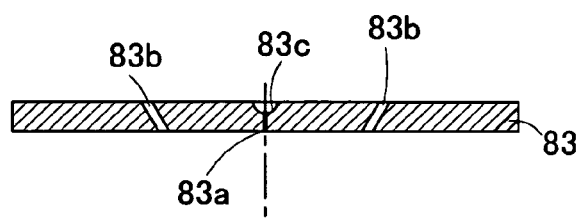
FIG. 25A  FIG. 25D  FIG. 25C
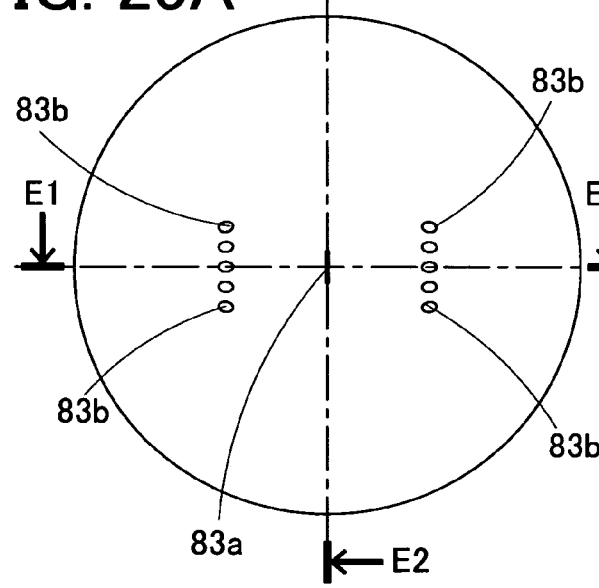
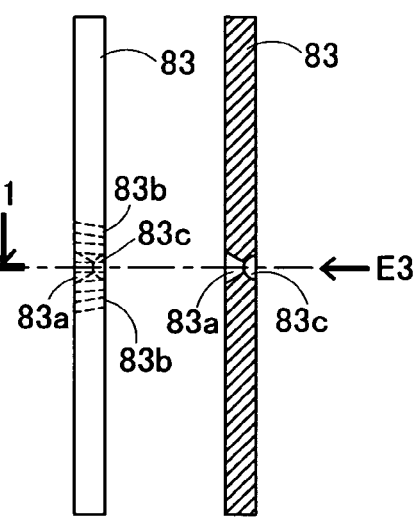

Fuel spray (Flat)

(Front) (Side)

Plural air jets (Multi-orifice jets)

(Front) (Side)

Fuel spray (Flat)

(Front) (Side)

Plural air jets (Multi-orifice jets)

Overlapping (Front) (Side)

(Front)

(Side)

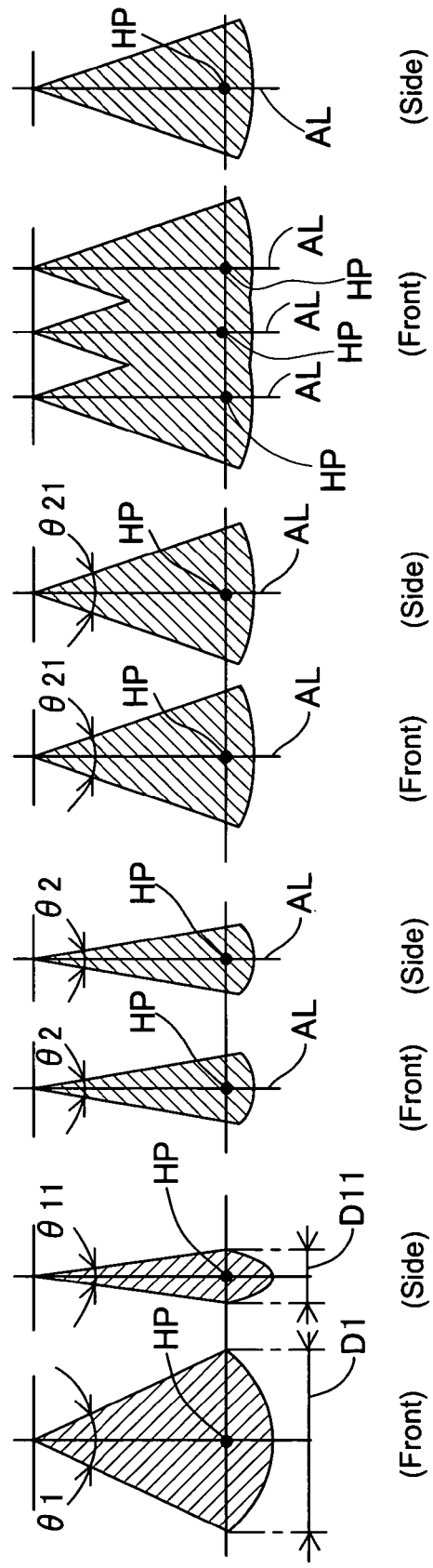

Fuel spray (Flat)

(Front) (Side)

Air jet from orifice not divergent (Front) (Side)

Air jet from divergent orifice of a large diameter (Front) (Side)

Plural air jets (Multi-orifice jets)

(Front) (Side)

Overlapping

FIG. 33B
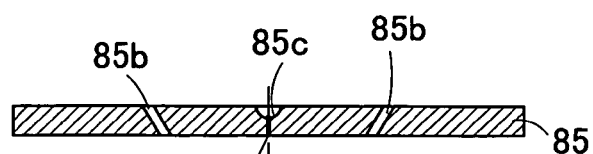
FIG. 33A  FIG. 33D  FIG. 33C
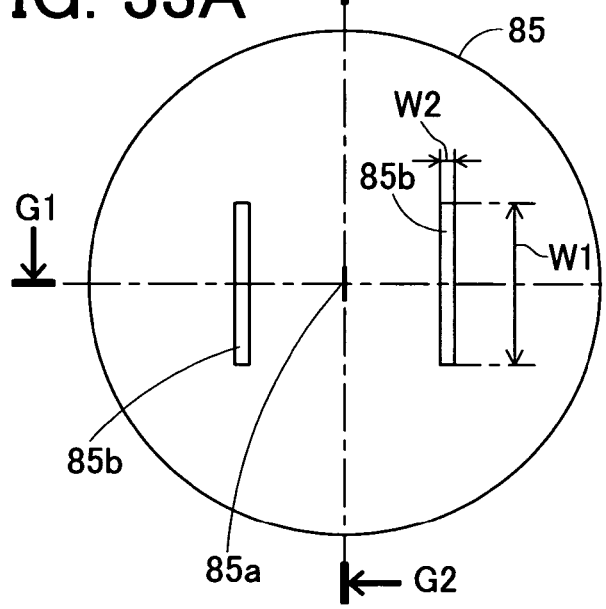
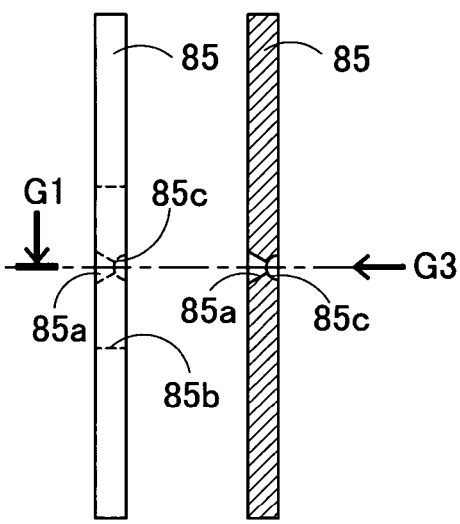

FIG. 34A
Fuel spray (Flat)
FIG. 34B
Air jet
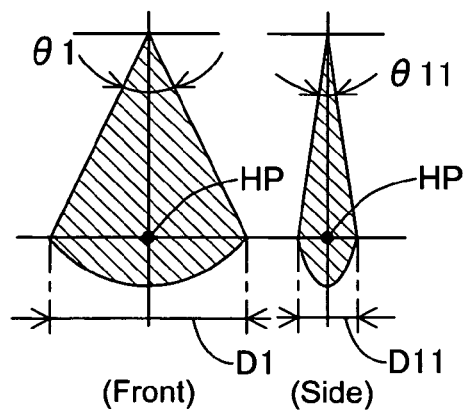
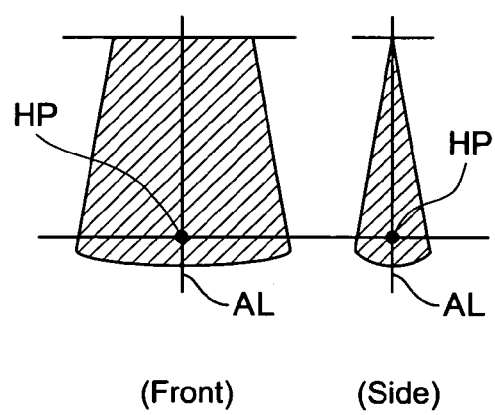
FIG. 35A
Fuel spray (Flat)
FIG. 35B
Air jet
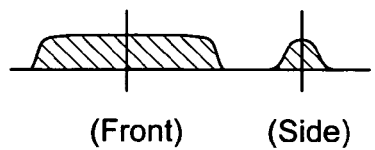
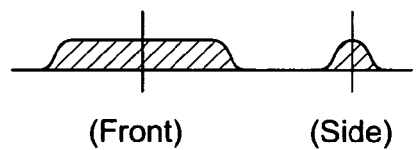
FIG. 36A
FIG. 36B
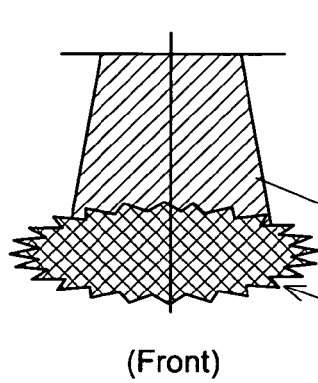
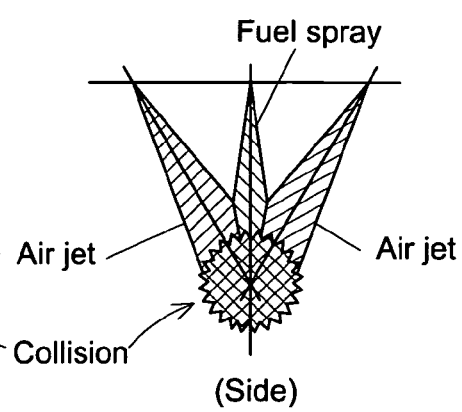

Fuel spray (Flat)

(Front)　(Side)

Air jet (Front)　(Side)

Fuel spray (Flat)

(Front)　(Side)

Air jet (Front)　(Side)

(Front)

(Side)

FIG. 41B
FIG. 41A  FIG. 41D  FIG. 41C
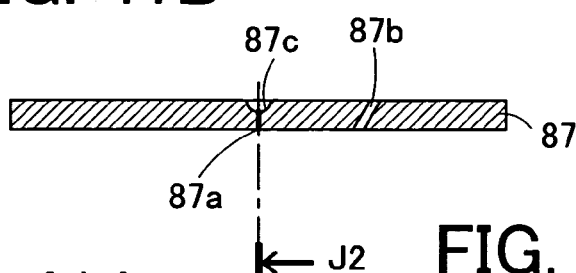
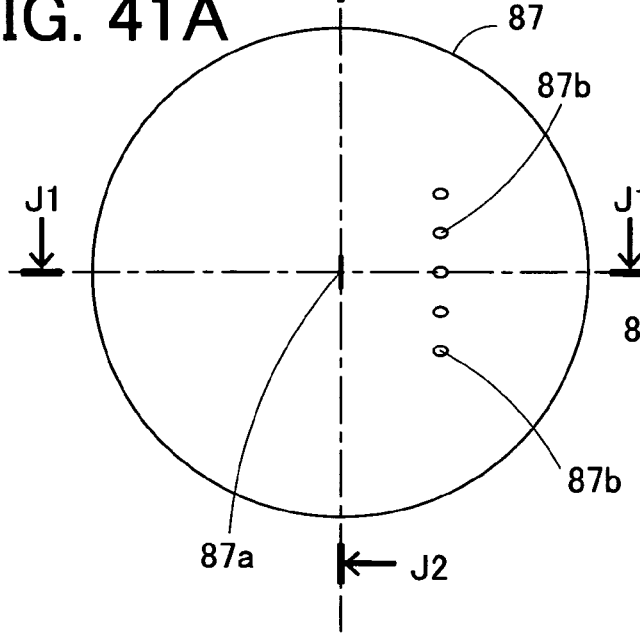
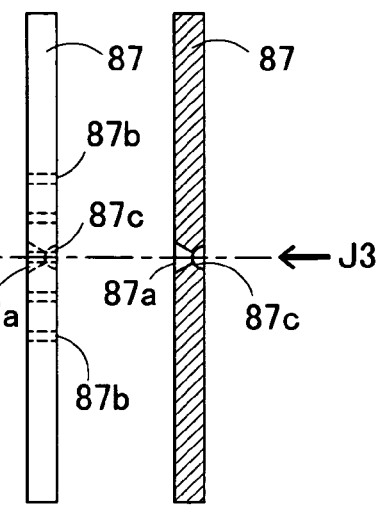

FIG. 42A
Fuel spray (Flat)
FIG. 42B
Plural air jets (Multi-orifice jets)
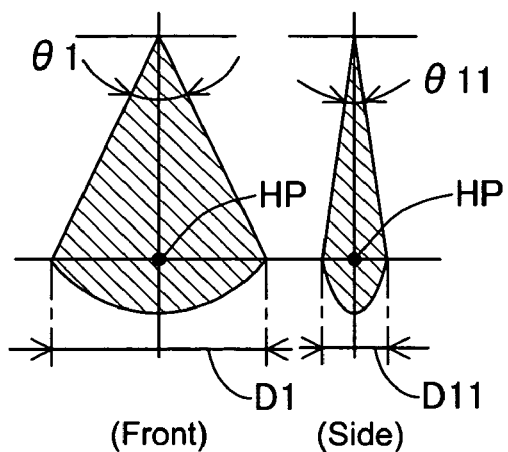
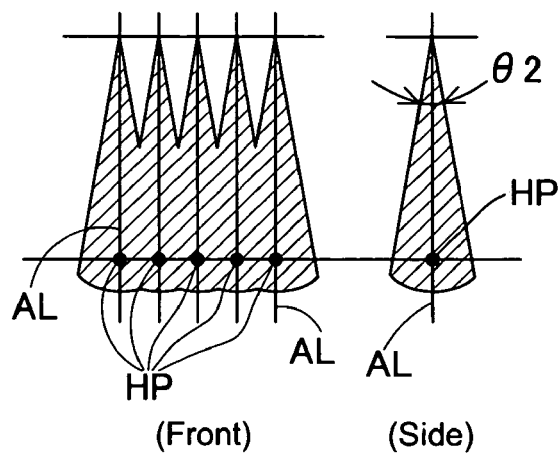
(Front)    (Side)         (Front)    (Side)
FIG. 43A
Fuel spray (Flat)
FIG. 43B
Plural air jets (Multi-orifice jets)
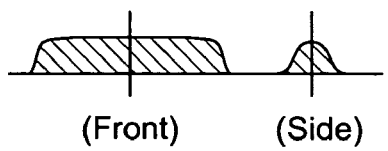
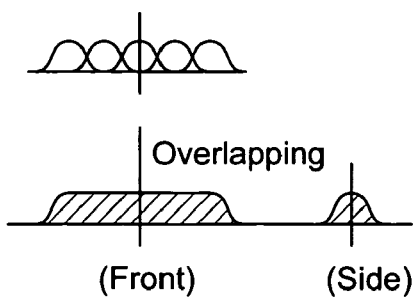
Overlapping
(Front)    (Side)         (Front)    (Side)

(Side: fuel spray direction changed by collision of air jets)

(Side)

(Front)

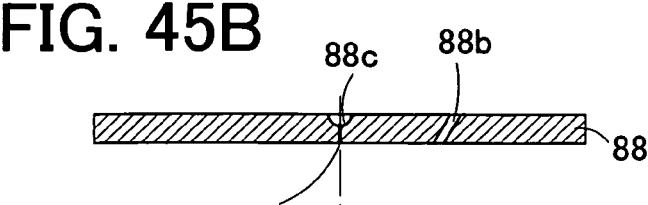
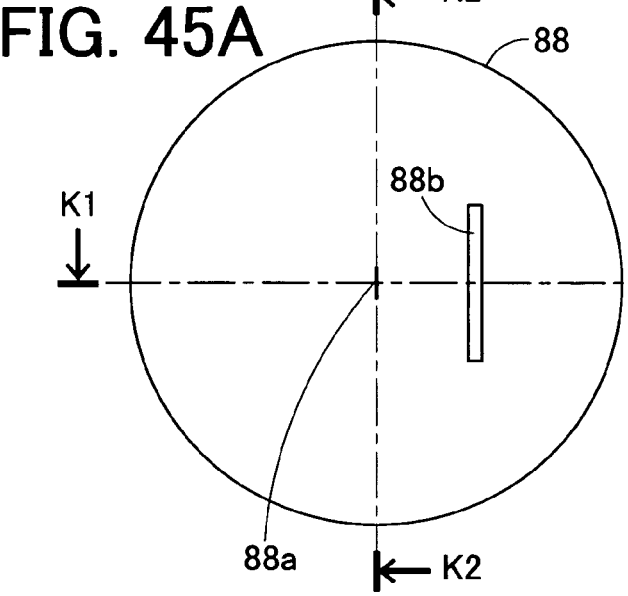
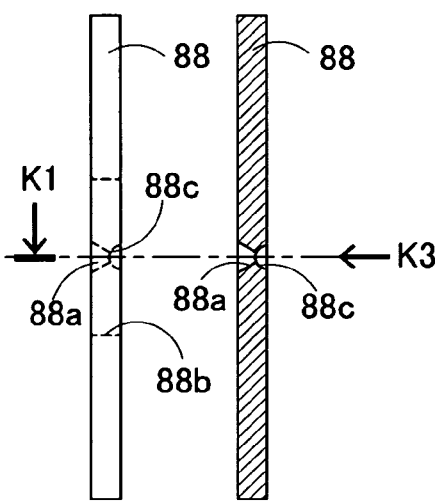

Fuel spray (Flat)

(Front)  (Side)

Air jet (Front)  (Side)

Fuel spray (Flat)

(Front)  (Side)

Air jet (Front)  (Side)

DIRECT INJECTION TYPE FUEL INJECTION DEVICE AND FUEL INJECTION CONTROL DEVICE FOR INTERNAL COMBUSTION ENGINE

BACKGROUND OF THE INVENTION

1. Field of the Invention

The present invention relates to a direct injection type fuel injection device adapted to inject fuel directly into a combustion chamber in an internal combustion engine. More particularly, the present invention is concerned with a direct injection type fuel injection device constructed such that fuel injected from a fuel injection valve and gas injected from a gas injection valve are brought into collision with each other.

The present invention also relates to a fuel injection control device applied to an internal combustion engine of a direct injection type wherein fuel is injected directly into a combustion chamber. More particularly, the present invention is also concerned with a fuel injection control device for an internal combustion engine which is constructed to control a fuel injection valve and a gas injection valve in such a manner that fuel injected into a combustion chamber from the fuel injection valve and gas injected into the combustion chamber from the gas injection valve are brought into collision with each other.

2. Description of Related Art

As conventional fuel injection systems, for example in the following Patent Literatures 1 and 2 there are disclosed fuel injection devices constructed such that fuel injected from a fuel injection valve and air injected from an air injection valve are brought into collision with each other.

In Patent Literature 1 it is described that, in a cylinder injection (direct injection) type spark ignition engine, a mounting angle of an air injection valve and that of a fuel injection valve are each set at an angle at which both injection axes cross each other in both vertical and horizontal directions and both injection directions face a cavity combustion chamber. It is described in Patent Literature 1 that, according to the construction, since the air injection axis and the fuel injection axes cross each other, fuel can be atomized at the time of fuel injection in an intake (suction) stroke, and since injected air is directed toward the interior of the cavity combustion chamber, it is possible to suppress the adhesion of fuel to the same chamber and hence possible to diminish the production of smoke and unburned HC.

On the other hand, in Patent Literature 2 it is described that, in an internal combustion engine of a fuel injection type though not a direct injection type, a pair of air assist orifices are formed so that their fuel injecting directions cross each other on both sides of a fuel injection orifice in a plane which substantially includes the fuel injection orifice. It is described in the same patent literature that, according to the above construction, a fuel flow jetted from the fuel injection orifice is narrowed by air flows from both sides thereof and becomes flat as a whole.

For attaining an optimal combustion performance in a direct injection type internal combustion engine, it is necessary to promote the atomization of fuel for the improvement of combustibility throughout the whole region of engine operating conditions. In a direct injection type internal combustion engine, moreover, in order to attain a combustion performance to match the start-up in the cold or to match a partial load operation, it is necessary to adjust a spray penetration distance (distance from a fuel injection orifice of a fuel injection valve up to a spray tip) and a spray shape.

There is known an internal combustion engine of a direct injection type wherein the pressure of fuel fed to a fuel injection valve is kept constant. In this case, when the internal combustion engine is started up in the cold, the wall surface temperature of a combustion chamber is low, so that the fuel injected from the fuel injection valve adheres to the wall surface of the combustion chamber and becomes difficult to evaporate, with a consequent fear that the combustion performance may be deteriorated, leading to a worsening of exhaust emission of the internal combustion engine.

In a partial load operation of the internal combustion engine, in order to realize an effective stratified charge combustion, it is necessary to create a fuel spray not yielding to an intake flow. In other words, it is necessary to form a fuel spray having a strong inertia force and a large spray penetration distance (distance from a fuel injection orifice of a fuel injection valve up to a spray tip at a certain time elapsed after the injection of fuel). Further, in a direct injection type internal combustion engine, in order to improve the intake efficiency by fuel evaporation cooling in the whole region of engine operating conditions, it is necessary to atomize a fuel spray.

In the internal combustion engine of a direct injection type, even in the case where the fuel pressure is made variable for the fuel injection valve, there has heretofore been a fear that the fuel pressure may not rise to a predetermined level but remain low at the time of start-up of the engine, with a consequent worsening of atomization of a fuel spray. Further, since the fuel injection valve usually employed has a fixed fuel injection orifice, it has so far been impossible to change the spray penetration distance and spray particle diameter of fuel although it has been possible to change the fuel pressure.

In a direct injection type internal combustion engine, therefore, at the time of start-up in the cold or in a full-load operation, it is necessary to promote the atomization of the whole of fuel spray and shorten the spray penetration distance, while in a partial load operation it is necessary to promote the atomization of the entire fuel spray and lengthen the spray penetration distance. Generally, the spray shape of fuel is set in conformity with the shape of a combustion chamber and therefore it is preferable that the spray shape be not changed or the spray penetration distance and the spray particle diameter be made variable while retaining the similarity of the spray shape.

In the following Patent Literature 3 there is disclosed a fuel injection device wherein fuel injected from a fuel injection valve and air injected from an air injection valve are correlated with each other. According to the fuel injection device disclosed therein, fuel and air can be jetted to the exterior each independently and there is obtained an optimal spray shape matching an operating condition of an internal combustion engine.

Patent Literature 1:
Japanese patent unexamined publication No. 2000-97032 (pages 5 and 6, FIGS. 10 and 11);
Patent Literature 2:
Japanese patent unexamined publication No. Hei 4(1992)-50469 (pages 2 to 6, FIG. 2);
Patent Literature 3:
Japanese patent unexamined publication No. Hei 11(1999)-280593 (pages 2 to 4, FIGS. 1 to 5).

In the internal combustion engine described in the above Patent Literature 1, however, if a large amount of air corresponding to the amount of intake air is injected into collision with fuel at the time of stratified charge combustion (mainly in a partial load operation), the resulting air-fuel mixture is dispersed and it becomes impossible to stratify the mixture which is required for stratified charge combustion. Consequently, in stratified charge combustion, it is impossible to effect fuel atomization by air collision, with the result that it has so far been impossible to attain the atomization of fuel throughout the whole region of operating conditions required for obtaining an optimal combustion performance in a direct injection type internal combustion engine.

In the Patent Literatures 1 and 2 there is described no construction permitting adjustment of the spray penetration distance and the spray shape.

Therefore, for attaining a combustion performance matching the start-up in the cold of an internal combustion engine or matching a partial load operation of the engine, it has been impossible to adjust the spray penetration distance and the spray shape and hence impossible to improve the combustion performance.

Further, in the Patent Literatures 1 and 2 there merely is described the construction wherein air is brought into collision with a fuel spray. A construction wherein air is brought into collision uniformly with sprayed fuel to match the entire distribution of the sprayed fuel is neither described nor suggested therein. Thus, it has been impossible to atomize fuel more uniformly and finely as a whole and hence impossible to improve the combustion performance.

On the other hand, in the fuel injection device described in the Patent Literature 3, since fuel and air are not brought into collision with each other, it is impossible to make the spray penetration distance or the spray grain diameter variable at all. Thus, as is the case with the Patent Literatures 1 and 2, for attaining a combustion performance matching the start-up in the cold of an internal combustion engine or matching a partial load operation of the engine, it is impossible to make the spray penetration distance or the spray particle diameter variable and hence impossible to improve the combustion performance.

SUMMARY OF THE INVENTION

The present invention has been accomplished in view of the above-mentioned circumstances and it is a first object of the invention to provide a direct injection type fuel injection device capable of effecting the atomization of fuel throughout the whole region of operating conditions.

It is a second object of the present invention to provide a direct injection type fuel injection device capable of adjusting the spray penetration distance and the spray shape in addition to the first object. It is a third object of the present invention to provide a direct injection type fuel injection device wherein a gas jet of about the same size as a fuel spray is brought into collision with the fuel spray, thereby making it possible to atomize fuel into finer particles throughout the entire fuel spray, in addition to the first or the second object.

It is a further object of the present invention to provide a fuel injection control device for an internal combustion engine of a direct injection type wherein the spray penetration distance or spray particle diameter of fuel is changed according to a difference in operating conditions of the engine to obtain an optimal fuel spray, thereby permitting improvement of the fuel combustion performance.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a direct injection type fuel injection device having a fuel injection valve for injecting fuel into a combustion chamber in an internal combustion engine which includes an intake valve and an exhaust valve, and having a gas injection valve for injecting gas into the combustion chamber, the direct injection type fuel injection device comprising: the one fuel injection valve, with one or more fuel injection orifices being provided correspondingly to the fuel injection valve and opened into the combustion chamber; and at least the one gas injection valve, with one or more gas injection orifices being provided correspondingly to the gas injection valve and opened into the combustion chamber, the shape, size, direction, and arrangement of the fuel injection orifice being specified, the number, shape, size, direction, and arrangement relative to the fuel injection orifice, of the gas injection orifice being specified, wherein fuel injected from the fuel injection valve into the combustion chamber through the fuel injection orifice and gas injected from the gas injection valve into the combustion chamber through the gas injection orifice are brought into collision with each other.

According to another aspect of the invention, there is provided a fuel injection control device for an internal combustion engine of the type in which fuel is injected directly into a combustion chamber, the fuel injection control device comprising: a fuel injection valve which includes a fuel injection orifice opened into the combustion chamber and which is for injecting pressurized fuel into the combustion chamber from the fuel injection orifice; a gas injection valve which includes a gas injection orifice opened into the combustion chamber and which is for injecting pressurized gas into the combustion chamber from the gas injection orifice, the direction of the gas injection orifice and that of the fuel injection orifice being set so that the gas injected from the gas injection orifice comes into collision with a fuel spray injected from the fuel injection orifice, operating condition detecting means for detecting an operating condition of the internal combustion engine; and control means for controlling the fuel injection valve and the gas injection valve each independently, wherein, for controlling a penetration distance of the fuel spray injected from the fuel injection orifice, the control means, on the basis of the detected operating condition, controls the fuel injection valve and controls at least one of timing and period of gas injection performed by the gas injection valve.

Furthermore, according to another aspect of the invention, there is provided a fuel injection control device for an internal combustion engine of the type in which fuel is injected directly into a combustion chamber, the fuel injection control device comprising: a fuel injection valve which includes a fuel injection orifice opened into the combustion chamber and which is for injecting pressurized fuel into the combustion chamber from the fuel injection orifice; a gas injection valve which includes a gas injection orifice opened into the combustion chamber and which is for injecting pressurized gas into the combustion chamber from the gas injection orifice, the direction of the gas injection orifice and that of the fuel injection orifice being set so that the gas injected from the gas injection orifice comes into collision with a fuel spray injected from the fuel injection orifice, operating condition detecting means for detecting an operating condition of the internal combustion engine; and control means for controlling the fuel injection valve and the gas injection valve each independently, wherein, for controlling the particle diameter of a fuel spray injected from the fuel injection orifice, the control means, on the basis of the detected operating condition, controls the fuel injection valve and controls at least one of timing and period of gas injection performed by the gas injection valve.

BRIEF DESCRIPTION OF THE DRAWINGS

FIGS. 1 to 20 are concerned with a first embodiment of the present invention, of which:

FIG. 1 is a schematic construction diagram showing a direct injection type engine system;

FIG. 2 is a sectional view showing a mounted state of a fuel injection device to the engine;

FIG. 3 is a conceptual construction diagram showing an electric wiring, etc. related to a fuel injection valve and an air injection valve;

FIG. 4 an enlarged sectional view showing a tip portion of a mounting member;

FIG. 5 is a plan view showing an orifice plate;

FIG. 6 is a sectional view taken on line A-A in FIG. 5;

FIGS. 7A to 7C are conceptual diagrams each showing a fuel spray and an air jet;

FIG. 8 is a conceptual diagram showing collision between a fuel spray and air jets at a collision point;

FIG. 9 is a conceptual diagram showing an air jet;

FIG. 11 is a conceptual diagram showing a state of collision of air jets with a fuel spray;

FIG. 12 is a flow chart showing a fuel injection control routine;

FIG. 13 is a table showing a relation between engine operating conditions and combustion patterns, etc.;

FIGS. 14A and 14B are time charts showing an opening/closing timing of a fuel injection valve and that of an air injection valve;

FIGS. 15A and 15B are time charts showing an opening/closing timing of the fuel injection valve and that of the air injection valve;

FIGS. 16a and 16B are time charts showing an opening/closing timing of the fuel injection valve and that of the air injection valve;

FIG. 17 is an image diagram showing spray characteristics in warm-up combustion;

FIG. 18 is an image diagram showing spray characteristics in stratified charge combustion;

FIG. 19 is an image diagram showing spray characteristics in homogeneous combustion; and FIGS. 20A to 20C are explanatory diagrams showing different penetration distances in fuel spray.

FIGS. 21 to 24 are concerned with a second embodiment of the present invention, of which:

FIGS. 21A to 21D are characteristic diagrams of an orifice plate;

FIGS. 22A to 22C are conceptual diagrams each showing a fuel spray and an air jet(s);

FIGS. 23A to 23C are conceptual diagrams each showing a difference between a spray strength and a jet strength at a collision point.

FIGS. 25 to 28 are concerned with a third embodiment of the present invention, of which:

FIGS. 25A to 25D are characteristic diagrams of an orifice plate;

FIGS. 29 to 32 are concerned with a fourth embodiment of the present invention, of which:

FIGS. 30A to 30D are conceptual diagrams each showing a fuel spray and an air jet(s);

FIGS. 33 to 36 are concerned with a fifth embodiment of the present invention, of which:

FIGS. 33A to 33D are characteristic diagrams of an orifice plate;

FIGS. 34A and 34B are conceptual diagrams each showing a fuel spray and an air jet;

FIGS. 35A and 35B are conceptual diagrams each showing a difference between a spray strength and a jet strength at a collision point; and FIGS. 36A and 36B are conceptual diagrams each showing a state of collision of air jets with a fuel spray.

FIGS. 37 to 40 are concerned with a sixth embodiment of the present invention, of which:

FIGS. 41 to 44 are concerned with a seventh embodiment of the present invention, of which:

FIGS. 41A to 41D are characteristic diagrams of an orifice plate;

FIGS. 42A and 42B are conceptual diagrams each showing a fuel spray and an air jet(s);

FIGS. 43A and 43B are conceptual diagrams each showing a difference between a spray strength and a jet strength at a collision point.

FIGS. 45 to 48 are concerned with an eighth embodiment of the present invention, of which:

FIGS. 45A to 45D are characteristic diagrams of an orifice plate;

FIGS. 54 to 56 are concerned with a fourteenth embodiment of the present invention, of which:

FIG. 54 is a sectional view showing a schematic construction of a fuel injection device;

FIG. 55 is a sectional view showing a schematic construction of the fuel injection device;

FIG. 56 is a sectional view showing a schematic construction of the fuel injection device;

DETAILED DESCRIPTION OF THE PREFERRED EMBODIMENTS

First Embodiment

A direct injection type fuel injection device and a fuel injection control device for an internal combustion engine both according to a first embodiment of the present invention will be described below in detail with reference to accompanying drawings.

Figure 1:
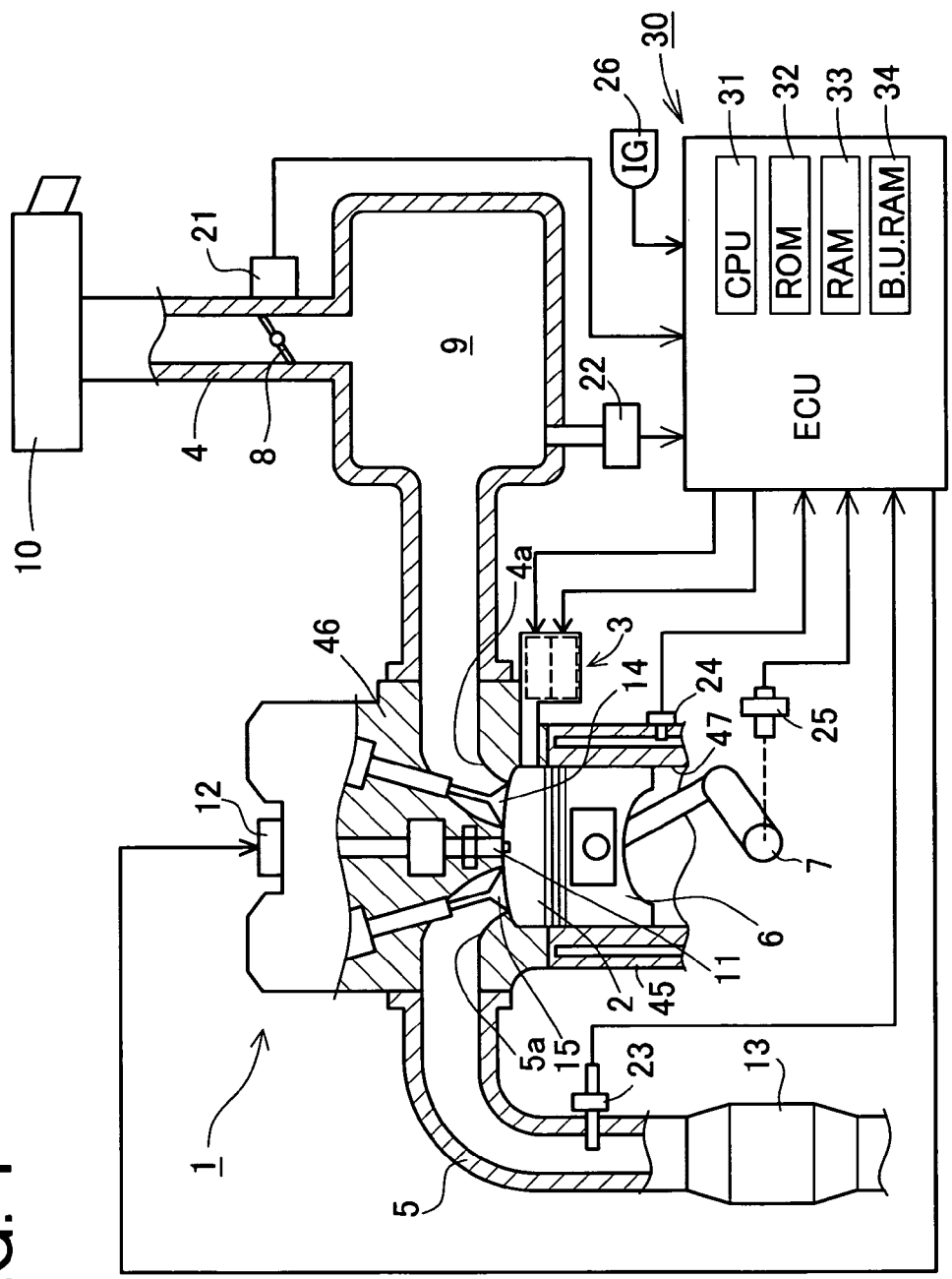

FIG. 1 is a schematic construction diagram of a direct injection type internal combustion engine system (hereinafter referred to as the "direct injection type engine system") including a direct injection type fuel injection device and a fuel injection control device for an internal combustion engine both embodying the present invention as a first embodiment. A direction injection type engine system mounted on an automobile includes a reciprocating multi-cylinder engine 1 of a known structure. A direct injection type fuel injection device (simply "fuel injection device" hereinafter) 3 is installed in each of combustion chambers 2 which are formed respectively in the cylinders of the engine 1. The fuel injection device 3 is constructed so as to inject fuel and air directly into the associated combustion chamber 2. In the engine 1, a combustible air/fuel mixture of the air introduced through an intake passage 4 and the fuel and air injected from the fuel injection device 3 is exploded and burned in the combustion chamber 2 in each cylinder and the exhaust gas after the combustion is discharged to the exterior through an exhaust passage 5, whereby a piston 6 is operated to rotate a crankshaft 7 and produce power.

A throttle valve 8 disposed in the intake passage 4 is opened and closed for adjusting the amount of air (intake quantity) Ga which is introduced into the combustion chamber 2 in each cylinder through the passage 4. The valve 8 operates in interlock with the operation of an accelerator pedal (not shown) provided in the driver's seat. A throttle sensor 21, which is provided correspondingly to the throttle valve 8, detects an opening degree, or an angle (throttle position) TA of the valve 8, and outputs an electric signal proportional to the detected value. Since the throttle valve 8 interlocks with the operation of the accelerator pedal, the operation of the accelerator pedal is reflected in the throttle position TA detected by the throttle sensor 21. A surge tank 9 is provided in the intake passage 4 and an intake pressure sensor 22 is attached to the surge tank 9. The intake pressure sensor 22 detects a pressure (intake pressure) PM of intake air in the intake passage 4 at a position downstream of the throttle valve 8 and outputs an electric signal proportional to the detected value.

Each fuel injection device 3 injects fuel and air directly into the corresponding combustion chamber 2. Each fuel injection device 3 is supplied with fuel and air at a predetermined pressure from predetermined fuel supply unit and air supply unit (neither shown). By operation of the fuel injection device 3, both fuel and air thus fed to each fuel injection device 3 are injected into the corresponding combustion chamber 2. Air is introduced into the intake passage 4 from the exterior through an air cleaner 10. The air thus introduced into the intake passage 4 is then introduced into the combustion chamber 2 in each cylinder. Both fuel and air are injected from each fuel injection device 3 into the air to form a combustible air/fuel mixture.

A spark plug 11 provided in the combustion chamber 2 of each cylinder performs an igniting operation upon receipt of an ignition signal provided form an ignition coil 12. The ignition plug 11 and the ignition coil 12 constitute an ignition device for igniting the combustible air/fuel mixture formed in the combustion chamber 2.

A catalytic converter 13 installed in the exhaust passage 5 contains a three-way catalyst for purifying the exhaust gas discharged from the combustion chamber 2. An oxygen sensor 23 disposed upstream of the catalytic converter 13 detects an oxygen concentration Ox in the exhaust gas which is discharged from the combustion chamber 2 to the exhaust passage 5 and outputs an electric signal proportional to the detected value.

A water temperature sensor 24 installed in the engine 1 detects the temperature (cooling water temperature) THW of cooling water flowing through the interior of the engine 1 and outputs an electric signal proportional to the detected value. An engine speed sensor 25 installed in the engine 1 detects a rotational speed of the crankshaft 7 as an engine rotational speed (hereinafter, referred to as an "engine speed") NE and outputs an electric signal proportional to the detected value. The sensor 25 detects a change in rotational angle (crank angle) of the crankshaft 7 at every predetermined angle and outputs the detected value as a pulse signal. An ignition switch 26 installed in the driver's seat outputs a start signal when turned ON for starting the engine 1. The ignition switch 26 outputs a stop signal when turned OFF for stopping the engine 1.

In this embodiment, the throttle sensor 21, intake pressure sensor 22, oxygen sensor 23, water temperature sensor 24, and the engine speed sensor correspond to an operating condition detecting means in the present invention which is for detecting an operating condition of the engine. In this embodiment, the intake quantity Ga is obtained by conversion from the values of intake pressure PM and engine speed NE which are detected by the intake pressure sensor 22 and the engine speed sensor 25, respectively.

In this embodiment, an electronic control unit (ECU) 30 receives various signals from the throttle sensor 21, intake pressure sensor 2, oxygen sensor 23, water temperature sensor 24, engine speed sensor 25, and ignition switch 26. In accordance with these input signals, the ECU 30 executes controls such as fuel injection control and ignition timing control and controls each fuel injection device 3 and ignition coil 12.

By the fuel injection control is meant to control each fuel injection device 3 in accordance with an operating condition of the engine 1, thereby controlling fuel injection quantity, fuel injection timing, and fuel spray. By the ignition timing control is meant to control the ignition coil 12 in accordance with an operating condition of the engine 1, thereby controlling the ignition timing in each spark plug 11.

As known well, the ECU 30 comprises a central processing unit (CPU) 31, a read-only memory (ROM) 32, a random access memory (RAM) 33, and a backup RAM (B.U. RAM) 34. In the ROM 32 are beforehand stored predetermined control programs associated with the foregoing various controls. In accordance with the stored control programs the ECU 30 (CPU 31) executes the foregoing various controls.

Figure 2:
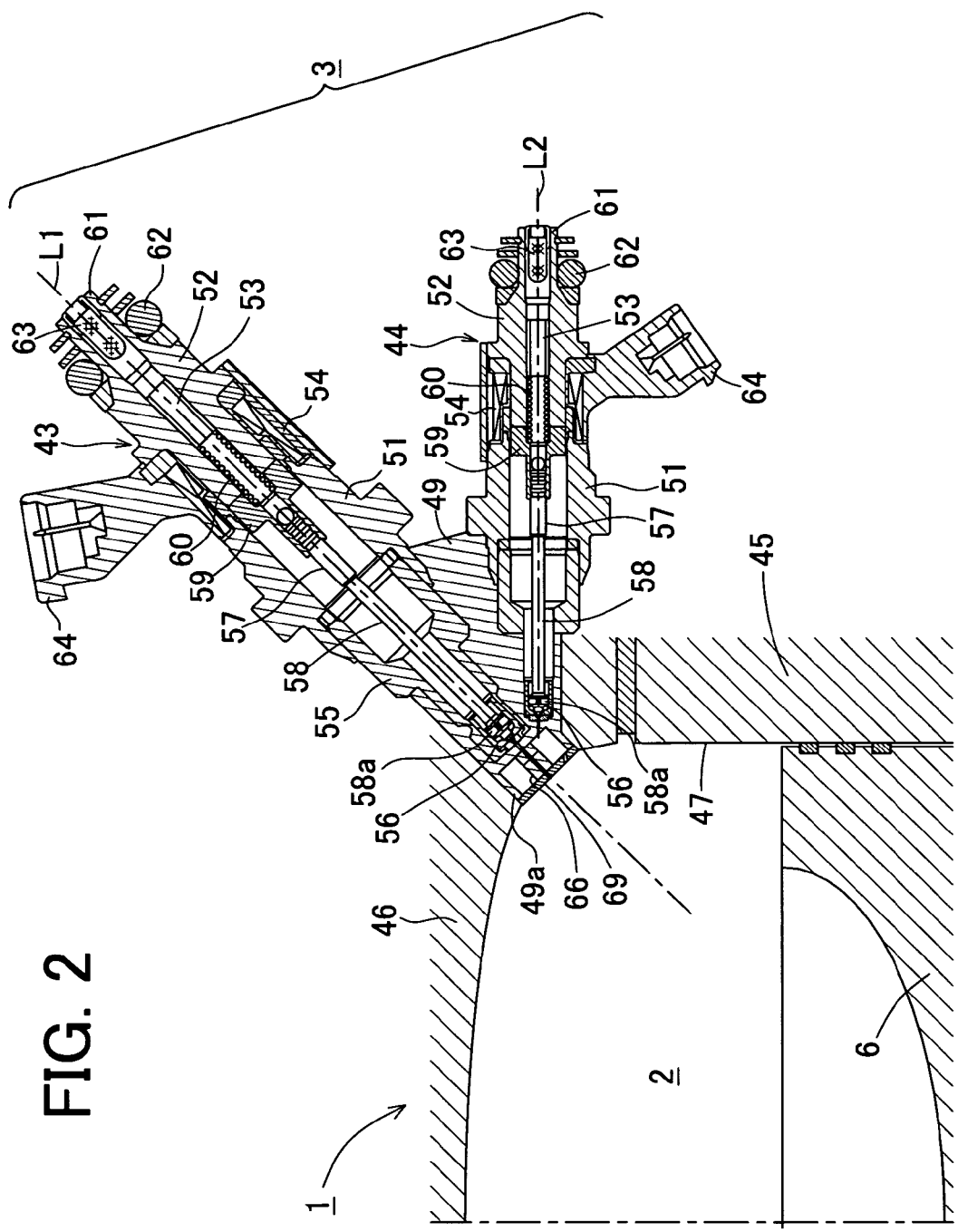

FIG. 2 is a sectional view showing in what state each fuel injection device 3 is mounted to the engine 1. The fuel injection system 3 is provided with a fuel injection valve 43 for the injection of fuel into the corresponding combustion chamber 2 in the engine 1 and an air injection valve 44 as a gas injection valve for the injection of air as gas into the combustion chamber 2. The engine 1 includes a cylinder block 45 and a cylinder head 46. A piston 6 is provided for reciprocating motion in each of cylinder bores 47 formed in the cylinder block 45. Each combustion chamber 2 is constituted as a space enclosed with the corresponding cylinder bore 47, piston 6, and cylinder head 46. As shown in FIG. 1, intake ports 4*a* and exhaust ports 5*a* communicating with the combustion chambers 2 are formed in the cylinder head 46. An intake valve 14 of a known structure is mounted in each intake port 4*a*, while an exhaust valve 15 of a known structure is mounted in each exhaust port 5*a*. The fuel injection valve 43 and the air injection valve 44 are integrally mounted to the cylinder head 46 through a mounting member 49 correspondingly to the associated combustion chamber 2. Both valves 43 and 44 are secured to the mounting member 49 so that respective central axes L1 and L2 cross each other obliquely.

The fuel injection valve 43, which is constituted by a known electromagnetic valve, comprises a housing 51, a core 52 fitted in the housing 51, an adjusting pipe 53 disposed in the interior of the core 52, a solenoid 54 disposed between the housing 51 and the core 52, a lower body 55 disposed on a front end side of the housing 51, a nozzle body 56 disposed in the interior of the lower body 55, and a valve body 57 disposed between the nozzle body 56 and the core 52. The valve body 57 is provided with a valve stem 58 having a valve portion 58*a* at a front end thereof and an armature 59 mounted to a base end thereof A compression spring 60 is disposed between the armature 59 and the adjusting pipe 53. A base end portion of the core 52 is formed as a pipe connector 61 connected to a fuel pipe (not shown). An O-ring 62 is fitted on an outer periphery of the pipe connector 61. A strainer 63 for the removal of foreign matters is disposed in the interior of the pipe connector 61. A wiring connector 64 connected to an electric wiring is formed on the housing 51. A basic construction of the fuel injection valve 43 and that of the air injection valve 44 are substantially the same and therefore, as to the construction of the air injection valve 44, its components are identified by the same reference numerals as those of the components of the fuel injection valve 43 and explanations thereof will be omitted.

Figure 3:
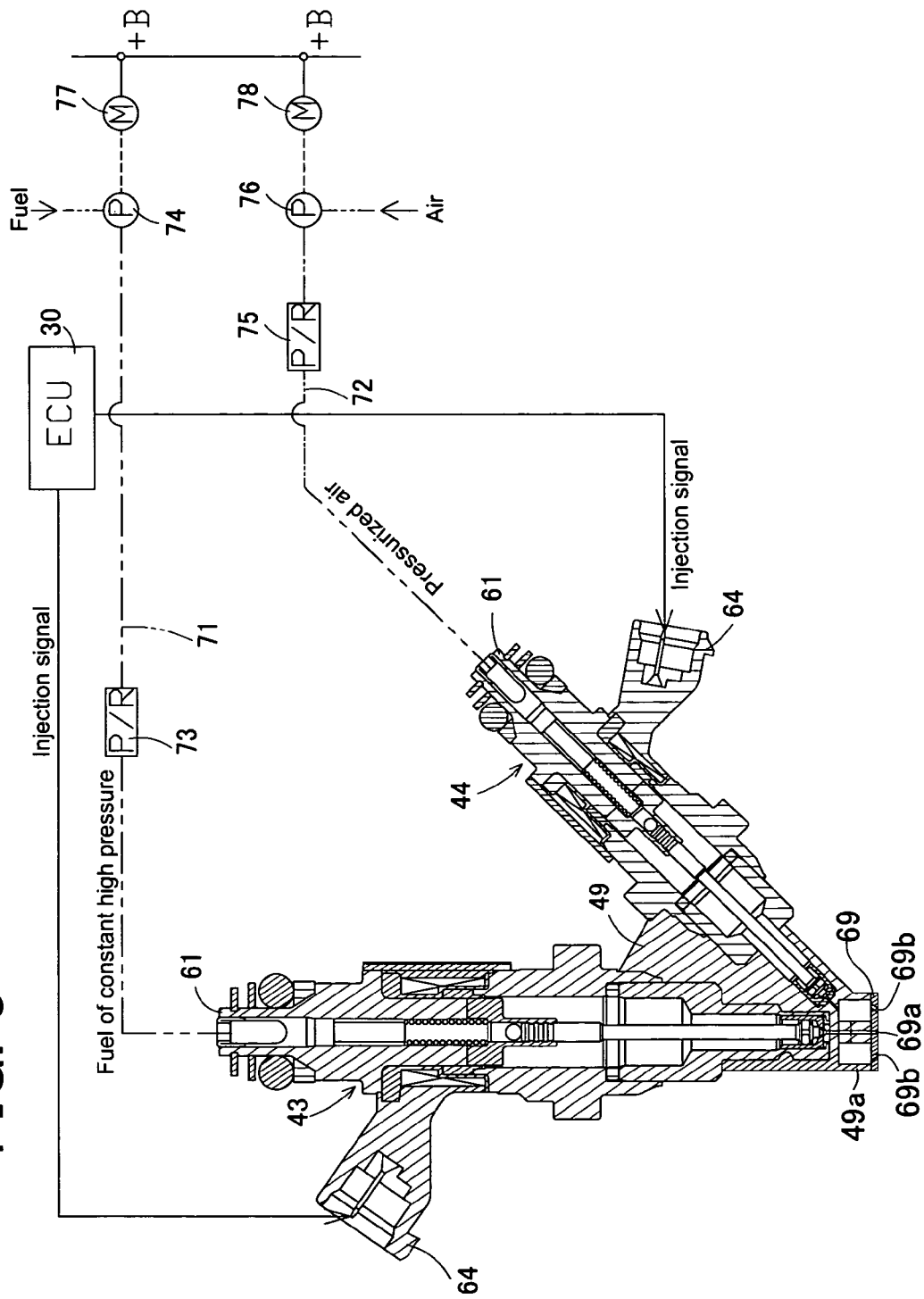

FIG. 3 is a conceptual construction diagram showing electric wiring and fuel and air piping associated with the fuel injection valve 43 and the air injection valve 44. As shown in the same figure, a fuel pipe 71 is connected to the pipe connector 61 in the fuel injection valve 43, while an air pipe 72 is connected to the pipe connector 61 in the air injection valve 44. A pressure regulator 73 and a fuel pump 74 are installed in the fuel pipe 71, while a pressure regulator 75 and an air pump 76 are installed in the air pipe 72. The pumps 74 and 76 are actuated by corresponding motors 77 and 78, respectively. When the fuel pump 74 is actuated, fuel stored in a fuel tank (not shown) is discharged from the pump 74 and is fed as fuel of a constant high pressure to the fuel injection valve 43 though the pressure regulator 73. Likewise, when the air pump 76 is actuated, air is discharged from the pump 76 and is fed as pressurized air to the air injection valve 44 through the pressure regulator 75.

As shown in FIG. 3, the wiring connector 64 in the fuel injection valve 43 and the wiring connector 64 in the air injection valve 44 are electrically connected to the ECU 30. The fuel injection valve 43 and the air injection valve 44 operate in accordance with injection signals provided from the ECU 30. When the fuel injection valve 43 operates in accordance with an injection signal provided from the ECU 30, fuel of a high pressure is injected from the injection valve 43. Likewise, when the air injection valve 34 operates in accordance with an injection signal provided from the ECU 30, pressurized air is injected from the injection valve 44. In this embodiment, the ECU 30 corresponds to a control means in the present invention for controlling the fuel injection valve 43 and the air injection valve 44 each independently.

Figure 4:
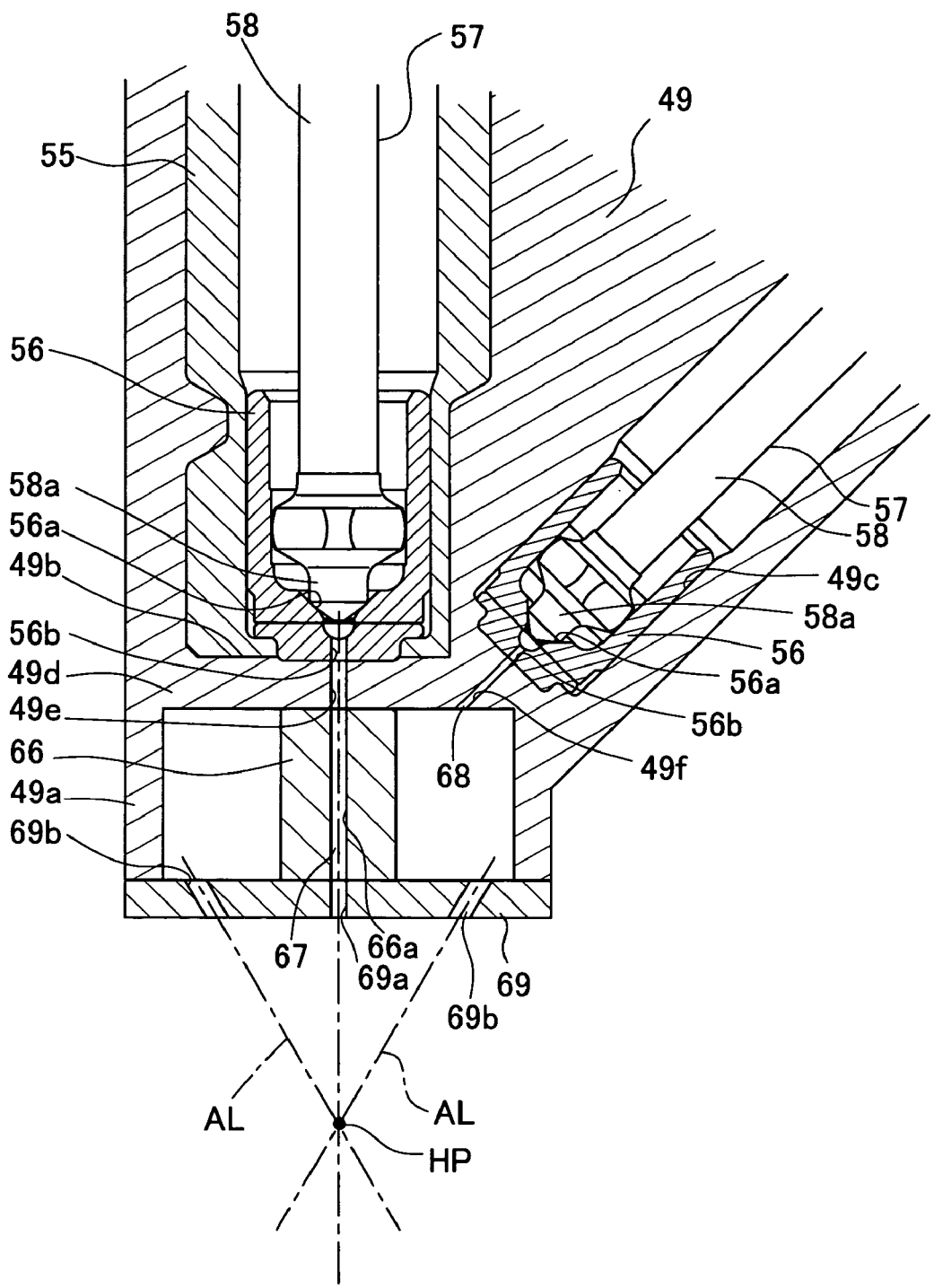

FIG. 4 is an enlarged sectional view of a tip portion of the mounting member 49. As shown in FIGS. 2 to 4, the mounting member 49, which is like a block, comprises a cylindrical portion 49*a* which faces the corresponding combustion chamber 2, a first mounting hole 49*b* into which the lower body 55 of the fuel injection valve 43 is fitted, and a second mounting hole 49*c* into which the nozzle body 56 of the air injection valve 44 is fitted. The cylindrical portion 49*a* and the first mounting hole 49*b* are disposed in alignment with each other and are partitioned from each other by a partition wall 49*d*. A hole 49*e* is formed centrally of the partition wall 49*d*. A tube 66 having a hole 66*a* is provided at the center of the cylindrical portion 49*a*. The nozzle body 56 fitted in the first mounting hole 49*b* is formed with a valve seat 56*a* corresponding to the valve portion 58*a*. A valve hole 56*b* formed in the valve seat 56*a* is aligned with the two holes 49*e* and 66*a* to constitute a single fuel passage 67. In the mounting member 49 is formed a hole 49*f* which extends from the center of the second mounting hole 49*c* toward the inside of the cylindrical portion 49*a*. The hole 49*f* is positioned so as to intersect the center of the cylindrical portion 49*a* obliquely. A valve seat 56*a* corresponding to the valve portion 58*a* is formed in the nozzle body 56 which is fitted in the second mounting hole 49*c*. A valve hole 56*b* formed in the valve seat 56*a* is aligned with the oblique hole 49*f* to constitute a single air passage 68.

An orifice plate 69 is fixed to an open end of the cylindrical portion 49*a*. At the center of the orifice plate 69 is formed a single fuel injection orifice 69*a* correspondingly to the fuel injection valve 43. The fuel injection orifice 69a is opened into the combustion chamber 2 and is aligned with the fuel passage 67. In the orifice plate 69 there are formed plural air injection orifices 69b as gas injection orifices correspondingly to the air injection valve 44. The air injection orifices 69b are positioned in the vicinity of the fuel injection orifice 69a, are opened into the combustion chamber 2 and communicate with the inside of the cylindrical portion 49a. Consequently, high pressure fuel injected from the fuel injection valve 43 passes through the fuel passage 67 and is injected into the combustion chamber 2 from the fuel injection orifice 69a formed in the orifice plate 69. On the other hand, pressurized air injected from the air injection valve 44 passes through the fuel passage 68 and is once injected into the cylindrical portion 69a, then is injected into the combustion chamber 2 from the air injection orifices 69b formed in the orifice plate 69. The foregoing "vicinity" is represented by distance X from the center of the fuel injection orifice to the center of each gas injection orifice and is defined as follows.

Figure 8:
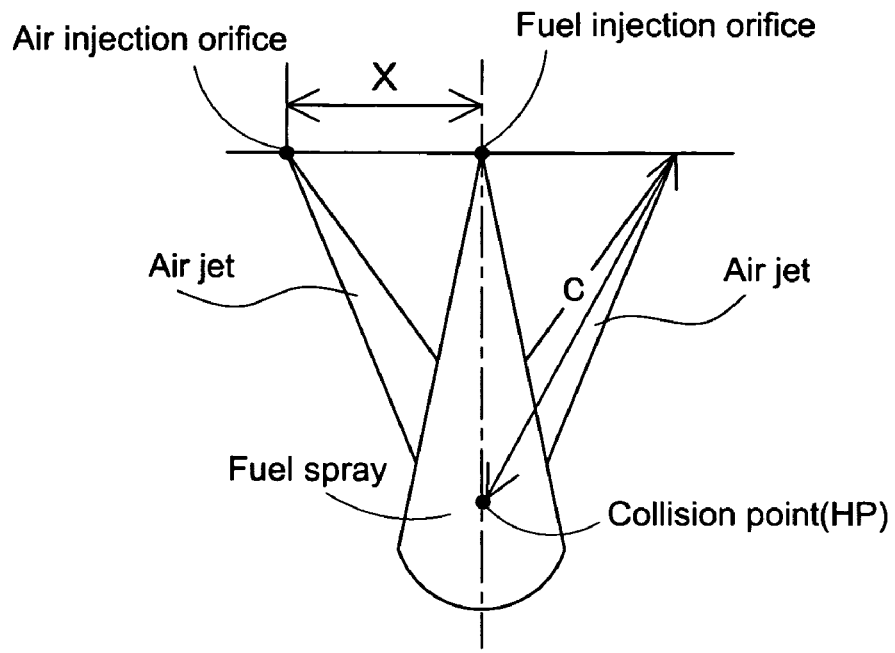

The "vicinity" means a distance between each gas injection orifice and the fuel injection orifice which distance brings about a fuel spray atomizing effect and a fuel spray length changeable effect even in the event of change of the following injection conditions. As an example, as shown in FIG. 8, if the distance from the fuel injection orifice to each gas injection orifice is assumed to be X, X which satisfies the following conditions (Expressions 1 to 3) can be defined as the foregoing "vicinity."

A gas jet arrival distance "L(m)" and a jet angle "α(°)" are represented as follows from a general kinematic theory related to gas injection:

$$L=(\rho_a/\rho_0)^{0.25}*(d*u*t/\tan\alpha)^{0.5} \quad \text{(Expression 1)}$$

$$\tan\alpha=0.427*(\rho_0/\rho_a)^{0.35} \quad \text{(Expression 2)}$$

where, "$\rho_a$" stands for a gas density (kg/m$^3$) at an absolute pressure of injected gas, "$\rho_0$" stands for a gas density (kg/m$^3$) in the interior of each cylinder (injection site), "d" stands for the diameter (or a shortest width (m)) of each gas injection orifice, "u" stands for an initial gas injection speed (m/s), "t" stands for time (s) after injection, and "α" stands for a temporary jet half-angle value (°).

If a jet speed at a collision point is calculated in accordance with the above expressions and restrictive conditions for fuel spray atomization and for making the spray length variable, which are obtained from predetermined experimental values or calculated values, are added, the distance "X" is represented as follows:

$$X \leq a*d*P_a^{0.5}*\rho_a^{0.35}*\rho_0^{-0.85} \quad \text{(Expression 3)}$$

where, "X" stands for a maximum distance (m) as the vicinity, and "$P_a$" stands for an absolute pressure (Pa) of injected gas. It is possible to apply "0.03" to the constant "a".

As an example, if the injected gas is air and if air injection diameter, injection pressure, gas density at an absolute pressure of injected gas, and gas density in each cylinder (injection site), are d≦0.0005 (m), $P_a$≦600000 (Pa), $\rho_a$≦7.23 (kg/m$^3$), and $\rho_0$≧1.205 (kg/m$^3$), respectively, X≦0.0199 (m)=19.9 (mm). Under these injection conditions, unless gas injection orifices are disposed within 19.9 mm from the fuel injection orifice, there will not be obtained the fuel spray atomizing effect and the spray length changeable effect.

Figure 5:
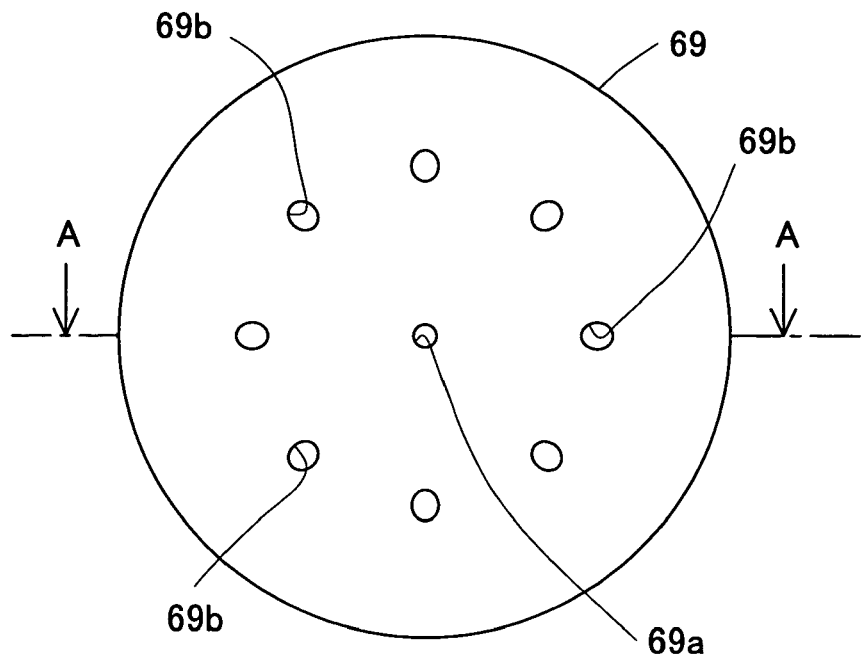
Figure 6:
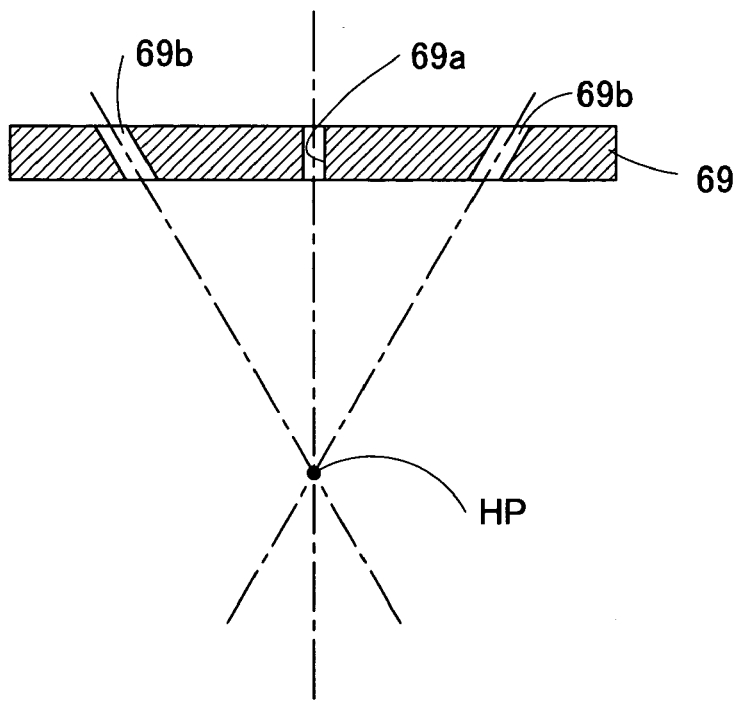

FIG. 5 is a plan view of the orifice plate 69 and FIG. 6 is a sectional view taken on line A-A in FIG. 5. As shown in FIGS. 5 and 6, the fuel injection orifice 69a is circular in section and is formed perpendicularly through an end face of the orifice plate 69. The plural air injection orifices 69b are also circular in section (elliptic at their open ends) and are formed obliquely through the end face of the orifice plate 69. As shown in FIG. 5, the plural (eight in the illustrated example) air injection orifices 69b are arranged at equal angle intervals on a circumference centered on the fuel injection orifice 69a. In this embodiment, the inside diameter of the fuel injection orifice 69a is set at 0.6 mm and that of each air injection orifice 69b is set at 1.0 mm.

As shown in FIG. 6, the fuel injection orifice 69a and the air injection orifice 69b are formed in such a manner that a central line of the fuel injection orifice 69a and that of each air injection orifice 69b cross each other at one point ("collision point" hereinafter) HP. Fuel is injected from the fuel injection orifice 69a toward the collision point HP, whereby there is formed a fuel spray. Likewise, air is injected from the air injection orifices 69b toward the collision pint HP, whereby there is formed an air jet. Thus, the fuel spray and the air jets collide with each other, centered on the collision point HP. In this embodiment, as described above, the directions of the air injection orifices 69b and the fuel injection orifice 69a are set so that the air jets from the air injection orifices 69b come into collision with the fuel spray injected from the fuel injection orifice 69a.

FIGS. 7A to 7C are conceptual diagrams of a fuel spray and an air jet(s). As shown in FIG. 7A, a fuel spray is generally conical in both front and side face. A spread angle (spray angle) θ1 of the fuel spray is determined by the size of inside diameter of the fuel injection orifice 69a formed in the orifice plate 69. As shown in FIG. 7B, one air jet (free jet) is generally conical in both front and side face. A spread angle (jet angle) θ2 of the air jet is determined, for example, by the size of inside diameter of each air injection orifice 69b formed in the orifice plate 69. As shown in FIG. 7C, peripheral air jets (multi-orifice jets) from the plural air injection orifices 69b are generally crown-shaped in both front and side face. In general, the energy of a gas jet becomes smaller with separation from a gas injection orifice. Therefore, the collision point HP in fuel spray is set at a position at which there is maintained a distance from each air injection orifice 69b to the extent that the energy of each air jet interferes with the fuel spray and permits adjustment of the fuel spray atomization and of the spray penetration distance and the spray shape. The size (outside diameter (width)) at the collision point HP of each air jet injected from each air injection hole 69b is set so as to become almost equal to an outside diameter D1 at the collision point HP of the fuel spray injected from the fuel injection orifice 69a. "The size of each air jet" which becomes almost equal to the outside diameter D1 of the fuel spray is defined from "jet angle β" and "air jet outside diameter, b" of an air jet shown in FIG. 9, "distance, c" from an air injection orifice to the collision point HP shown in FIG. 8, and a predetermined expression "b=2*c*tan(β/2)." As described above, the fuel injection device 3 is constructed so that the fuel injected from the fuel injection valve 43 and the air injected from the air injection valve 44 are brought into collision with each other within the combustion chamber 2.

Figure 10A:
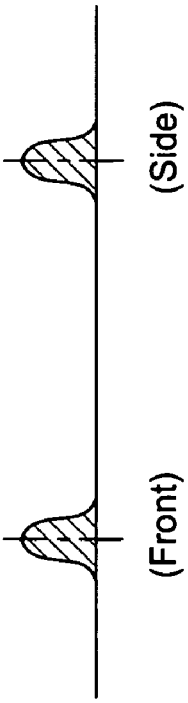
FIGS. 10A to 10C are conceptual diagrams each showing a difference between a spray strength and a jet strength at a collision point.
Figure 10B:
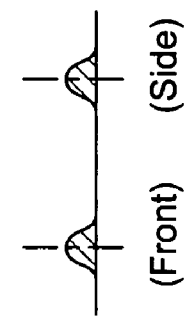
Figure 10C:
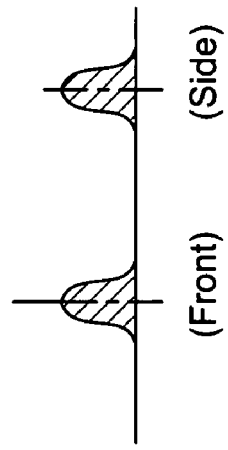

FIGS. 10A to 10C are conceptual diagrams showing a difference between a fuel spray strength (spray strength) and an air jet strength (jet strength) at the collision point HP. As shown in FIG. 10A, a fuel spray exhibits a spray strength having the same distribution width in both front and side faces. As shown in FIG. 10B, one air jet (free jet) exhibits a jet strength having the same distribution width in both front and side face. This jet strength is a little lower than the spray strength. As shown in FIG. 10C, a jet strength based on plural air jets (multi-orifice jets) has the same distribution width in both front and side face. The jet strength of the multi-orifice jets is higher than that of one air jet. Thus there is made design so that the air jet strength distribution is uniformly superimposed on the fuel spray strength distribution. The spray strength and the jet strength can be calculated from the product of flow velocity and density.

According to the fuel injection device 3 of this embodiment thus constructed, fuel from one fuel injection valve 43 is injected into the combustion chamber 2 through one corresponding fuel injection orifice 69a, whereby there is formed a fuel spray within the combustion chamber 2. The form of the fuel spray is determined upon specifying of shape, size, and direction of the fuel injection orifice 69a. On the other hand, air from one air injection valve 44 is injected into the combustion chamber 2 through corresponding plural air injection orifices 69b, whereby there are formed air jets within the combustion chamber 2. The form of the air jets and the influence thereof on the fuel spray are determined upon specifying of the number, shape, size, and direction of each air injection orifice 69b, as well as the arrangement thereof with respect to the fuel injection orifice.

Air jet axes AL (see FIG. 4) extending from the air injection orifices 69b are set so as to cross each other at the center of a maximum diameter D1 (see FIG. 7A) in the fuel spray injected from the fuel injection orifice 69a. Therefore, according to the form of the fuel spray, each air jet collides with the whole of the fuel spray, centered at the collision point HP, so that the strength distributions of air jets relative to the fuel spray become equal. As a result, it is possible to attain uniform and finer fuel atomization in the whole of the fuel spray and hence possible to promote the atomization of fuel. Consequently, it is possible to improve the combustion performance of the direct injection type engine 1.

Particularly, in this embodiment, since the fuel injection orifice 69a formed in the orifice plate 69 is circular, the fuel spray becomes conical and the spray angle θ1 (see FIG. 7A) of the fuel spray is determined by the size of inside diameter of the fuel injection orifice 69a. Further, since each air injection orifice 69b formed in the orifice plate 69 is circular, each air jet becomes conical and the jet angle θ2 thereof (see FIG. 7B) determined by, for example, the size of inside diameter of each air injection orifice 69b. Plural air injection orifices 69b are arranged at equal angle intervals on a circumference centered at the fuel injection orifice 69a and, as shown in FIG. 7C, plural air jets from the air injection orifices 69b are inclined toward one collision point HP. Thus, plural air jets collide with the peripheral portion of the conical fuel spray and the strength distributions of the air jets relative to the fuel spray become equal. Consequently, according to the shape of the fuel spray, air jets can be brought into collision with the fuel spray uniformly throughout the whole in the width direction of the fuel spray. Particularly, for a conical fuel spray, it is possible to attain uniform and finer fuel atomization in the whole of the fuel spray without greatly changing the spray shape and hence possible to promote the atomization of fuel.

In this embodiment, each air injection orifice 69b is disposed in the vicinity of the fuel injection orifice 69a. For adjusting the fuel spray penetration distance and the spray shape with use of air jets, it is necessary that, at the collision point HP between the fuel spray and the air jets, the energy of the air jets interfere with the fuel spray and be maintained to such an extent as permits adjustment of fuel atomization and of the spray penetration distance and the spray shape. The energy of each air jet becomes smaller with separation from each air injection orifice 69b. Therefore, when each air injection orifice 69b is disposed in the vicinity of the fuel injection orifice 69a, the collision point HP between each air jet and the fuel spray is set in the vicinity of the fuel injection orifice 69a. As a result, it becomes possible to adjust the atomization of fuel and the spray penetration distance and spray shape.

In this embodiment, it is designed that an air jet to be injected from each air injection orifice 69b is almost equal in size to a fuel spray to be injected from the fuel injection orifice 69a. Therefore, air jets come into collision with the whole of the fuel spray correspondingly to the form of the fuel spray and it becomes possible to effect the atomization of fuel and adjustment of the fuel penetration distance and the spray shape. Thus, by making an air jet of about the same size as a fuel spray collide with the fuel spray, it is possible to atomize the fuel more finely in the whole of the fuel spray.

In this embodiment, since the fuel injection orifice 69a and the air injection orifices 69b are both circular in section, the injection orifices 69a and 69b can be formed relatively easily by punching with use of a punch or the like. Therefore, the orifice plate 69 can be fabricated relatively easily. Moreover, by merely changing pressure and the shape (e.g., "taper") of each air injection orifice 69b, the jet angle θ2 of each air jet (see FIG. 7B) is changed and the air jet strength distribution is adjusted. Further, by merely changing the inside diameter of the circular fuel injection orifice 69a, the spray angle θ1 of the fuel spray (see FIG. 7A) is changed and the fuel spray strength distribution is adjusted. Consequently, a particle size level for atomization can be set arbitrarily in a relatively easy manner. Additionally, by adjusting the spray angle θ1 and jet angle θ2 and adjusting the direction of fuel spray and that of air spray, it is possible to set a desired spray penetration distance an a desired spray shape relatively easily.

Figure 11:
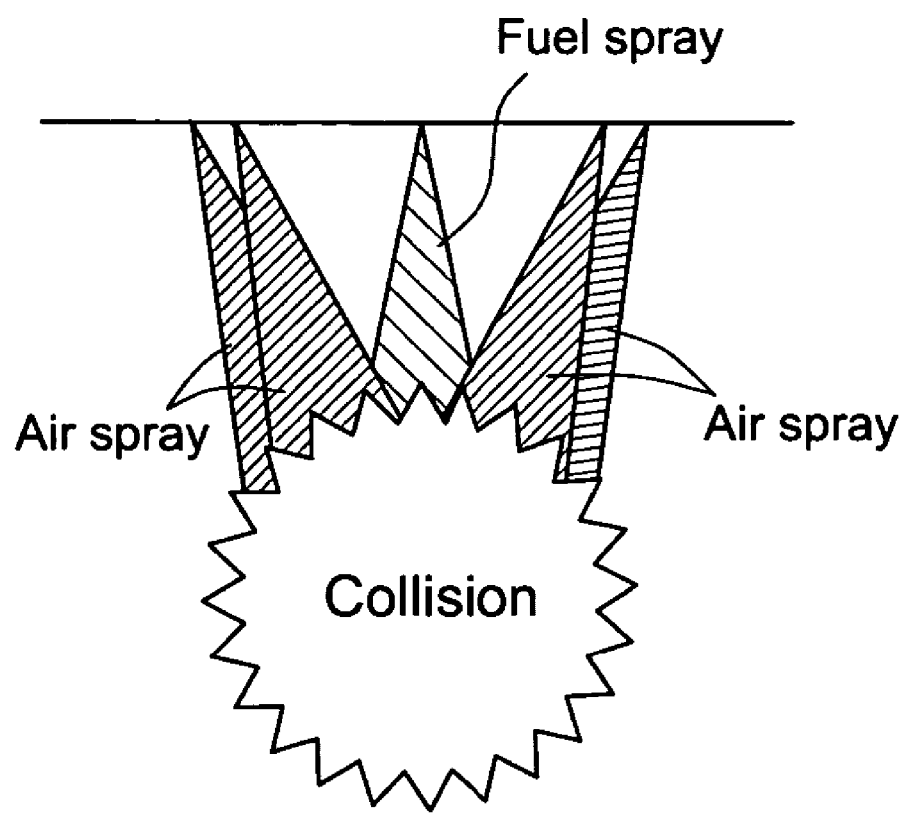

FIG. 11 is a conceptual diagram showing a state of collision of plural air jets with a fuel spray. In this embodiment, as shown in FIGS. 7A to 7C, plural air jets having the same size and strength distribution are collided with one fuel spray, so even if the strength distribution of the fuel spray itself is not uniform, it is possible to let the influence of air jets be exerted uniformly on the whole of the spray. As a result, it is possible to atomize the fuel appropriately and hence possible to set an appropriate spray penetration distance, etc.

In this embodiment, the fuel injection valve 43 and the air injection valve 44 are integrally mounted to the cylinder head 46 through the mounting member 49 correspondingly to the combustion chamber 2. Therefore, in comparison with the case where the injection valves 43 and 44 are mounted each independently, the positional accuracy of the air injection orifices 69b relative to the fuel injection orifice 69a becomes higher and mounting works, including machining, for the cylinder head 46 decrease. If the fuel injection valve 43 and the air injection valve 44 are assembled beforehand to the mounting member 49, all that is required is a mere mounting of the mounting member 49 to the cylinder head 46, whereby the injection valves 43 and 44 are also mounted to the cylinder head 46 simultaneously. Consequently, it is possible to simplify the manufacture of the fuel injection device.

Figure 12:
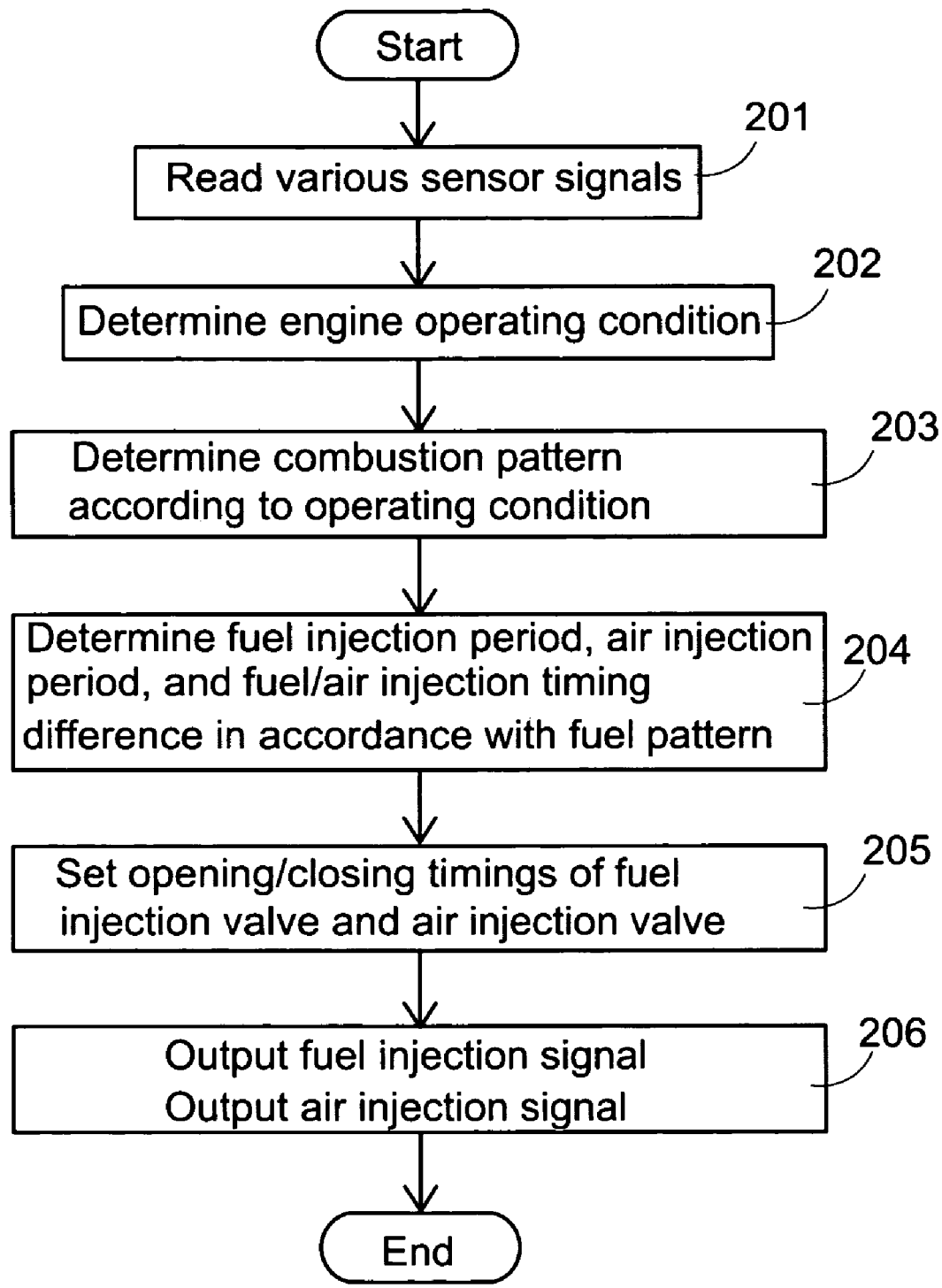

Next, a description will be given below about the contents of a fuel injection control processing which the ECU 30 executes for making the fuel spray penetration distance, spray particle diameter and spray shape variable. FIG. 12 shows an associated "fuel injection control routine" in terms of a flow chart. The ECU 30 executes this routine periodically at every predetermined time during operation of the engine 1.

First, in step 201, the ECU 30 reads detected signals provided from the throttle sensor 21, intake pressure sensor 22, oxygen sensor 23, water temperature sensor 24, and engine speed sensor 25.

In step 202, the ECU 30 determines an operating condition of the engine 1 on the basis of the detected signals thus inputted. In this embodiment, the ECU 30 determines an operating condition out of conditions including "low temperature starting operation," "partial load operation," and "full load operation." For example, when the cooling water temperature THW and the engine speed NE are relatively low and the throttle angle TH is relatively small, the ECU 30 determines that the engine operation is a "low temperature starting operation." When the cooling water temperature THW and the engine speed NE are somewhat high and there is a slight change in the throttle angle TA, the ECU 30 determines that the engine operation is a "partial load operation." Further, when the cooling water temperature THW and the engine speed NE are somewhat high and the throttle angle TA changes to full open, the ECU 30 determines that the engine operation is a "full load operation."

In step 203, the ECU 30 determines an optimal combustion pattern corresponding to the operating condition thus determined. In this embodiment, combustion patterns suitable for various operating conditions are confirmed and established experimentally in advance. FIG. 13 tabulates relations between operating conditions and combustion patterns. As is seen from the table of FIG. 13, when the engine operation is a "low temperature starting operation," "warm-up combustion" is determined as a combustion pattern. Likewise, in case of a "partial load operation," "stratified charge combustion" is determined as a combustion pattern. Further, in case of a "full load operation," "uniform combustion" is determined as a combustion pattern.

In step 204, in accordance with the combustion pattern thus determined, the ECU 30 determines "fuel injection period," "air injection period," and "fuel/air injection timing difference" in the injection by the fuel injection valve 43 and the air injection valve 44. For example, in case of "warm-up combustion," as shown in FIG. 13, "Fuel/air injection periods" are determined to be "same period" and "Fuel/air injection timing difference" is determined to be "same timing." In case of "stratified charge combustion," as shown in FIG. 13, "Fuel/air injection periods" are determined such that "Air injection period is long." and "Fuel/air injection timing difference" is determined such that "Air injection timing precedes." Further, in case of "uniform combustion," as shown in FIG. 13, "Fuel/air injection periods" are determined such that "Air injection period is somewhat long." and "Fuel/air injection timing difference" is determined such that "Air injection timing somewhat precedes."

In step 205, on the basis of the thus-determined "fuel/air injection periods" and "fuel/air injection timing difference," the ECU 30 establishes opening/closing timings of the fuel injection valve 43 and the air injection valve 44 corresponding to a change of crank angle. For example, in case of "warm-up combustion," as shown in FIGS. 14A and 14B, an opening timing of the fuel injection valve 43 and that of the air injection valve 44 are similarly set in the range from angle a0 to angle a3. In case of "stratified charge combustion," as shown in FIGS. 15A and 15B, an opening timing of the fuel injection valve 43 is set in the range from angle a2 to angle a3, while an opening timing of the air injection valve 44 is set in the range from angle a0 which precedes the angle a2 of the fuel injection valve 43 by an angle difference of ΔA to angle a3 as in the case of the fuel injection valve 43. Further, in case of "uniform combustion," as shown in FIGS. 16A and 16B, an opening timing of the fuel injection valve 43 is set in the range from angle a2 to angle a3, while an opening timing of the air injection valve 44 is set in the range from angle a1 which somewhat precedes the angle a2 of the fuel injection valve 43 by an angle difference of ΔB (ΔB<ΔA) to angle a3 as in the case of the fuel injection valve 43.

Then, in step 206, the ECU 30 outputs a fuel injection signal and an air injection signal corresponding to the thus-set opening/closing timings to the fuel injection valve 43 and the air injection valve 44, respectively.

Controlling the opening/closing timings of the fuel injection valve 43 and the air injection valve 44 as above is for controlling the fuel spray penetration distance, spray particle diameter and spray shape in the injection of fuel by the fuel injection device 3. That is, for controlling the fuel spray penetration distance, spray particle diameter and spray shape, the ECU 30 sets the fuel injection timing and fuel injection period in fuel injection performed by the fuel injection valve 43 to constant values correspondingly to a change of crank angle and then controls both air injection timing and air injection period in the injection of air performed by the air injection valve 44 on the basis of an operating condition determined for the engine 1. More specifically, for attaining "warm-up combustion," the ECU 30 equalizes the timing of air injection performed by the air injection valve 44 to the timing of fuel injection performed by the fuel injection valve 43 and at the same time equalizes the period of air injection performed by the air injection valve 44 to the period of fuel injection performed by the fuel injection valve 43. Further, for attaining "stratified charge combustion" and "uniform combustion," the ECU 30 makes the timing of air injection performed by the air injection valve 44 precede or somewhat precede the timing of fuel injection performed by the fuel injection valve 43 and makes the period of air injection performed by the air injection valve 44 longer than the period of fuel injection performed by the fuel injection valve 43 by an angle difference ΔA or ΔB based on the crank angle.

Figure 17:
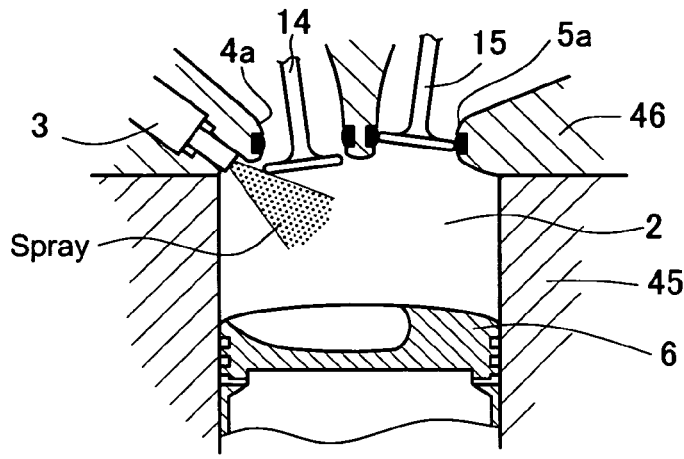

According to the above fuel injection control, as shown in FIG. 13, in "warm-up combustion," the fuel/air injection periods are set to "same period" and the injection timing difference to "same timing." With this arrangement, there are obtained spray characteristics such that the spray penetration distance is short, the spray particle diameter is relatively small, and the spray shape has a large spray angle. FIG. 17 is an image diagram of the spray characteristics in question. In a low temperature starting operation of the engine 1, in order to prevent the adhesion of fuel to the crown of the piston 6, it is desirable that the spray penetration distance be set relatively short, the spray particle diameter for promoting the evaporation of fuel be set relatively small, and the spray shape for dispersing fuel throughout the whole of the combustion chamber 2 be set large in spray angle. Thus, the above spray characteristics for "warm-up combustion" become suitable for a low temperature starting operation of the engine 1.

Figure 18:
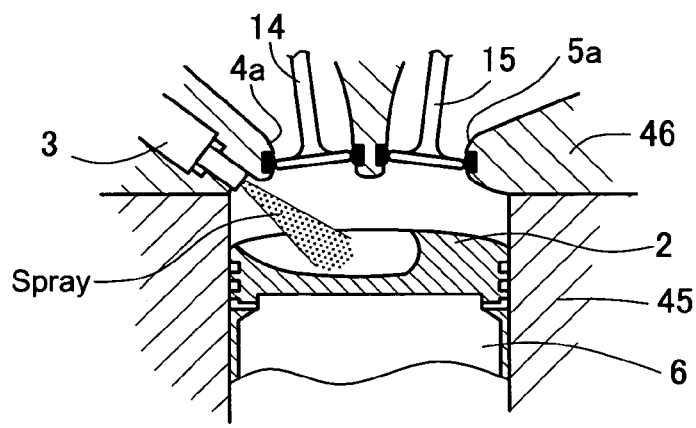

On the other hand, in "stratified charge combustion," as shown in FIG. 13, the fuel/air injection periods are set such that "Air injection period is somewhat long." and the injection timing difference is set such that "Air injection timing precedes." With this arrangement, there are obtained spray characteristics such that the spray penetration distance is relatively long, the spray particle diameter is relatively small, and the spray shape is small in spray angle. FIG. 18 is an image diagram of the spray characteristics in question. In a partial load operation of the engine 1, a strong (long penetration distance) spray is required so that a stable air/fuel mixture can be collected around the spark plug at every cycle without being influenced by such a disturbance as air flow variation in the combustion chamber 2. Moreover, with heat from the piston 6, it is not required to attain such a high atomization as in a low temperature starting operation, but in order to make the formation of a stable air-fuel mixture it is desired to form spray particles smaller in diameter than in the present state. Further, it is required to obtain a spray shape having a small spray angle suitable for the stratification of spray. Consequently, the above spray characteristics for "stratified charge combustion" are suitable for a partial load operation of the engine 1.

Figure 19:
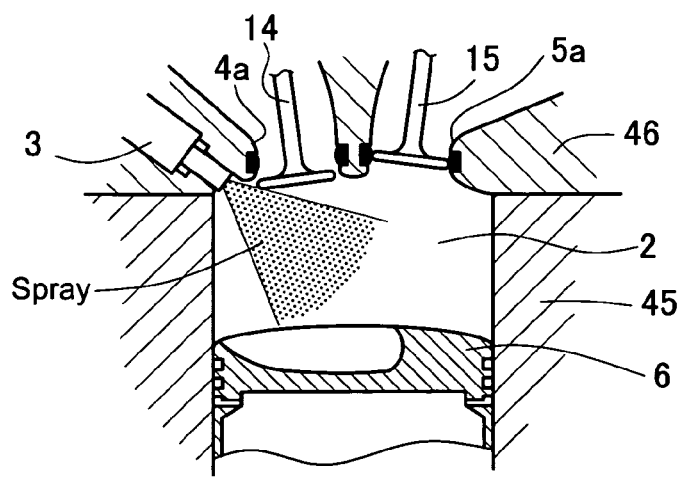

On the other hand, in "uniform combustion," as shown in FIG. 13, the fuel/air injection periods are set such that "Air injection period is long." and the injection timing difference is set such that "Air injection timing somewhat precedes." With this arrangement, there are obtained spray characteristics such that the spray penetration distance is relatively medium or so, the spray particle diameter is relatively small, and the spray shape is medium in spray angle. FIG. 19 is an image diagram showing the spray characteristics in question. In a full load operation of the engine 1, heat from the wall surface of the combustion chamber 2 can be expected despite of equal conditions to those in a low temperature starting operation. Therefore, it is required that the spray penetration distance be longer than that in a low temperature starting operation and shorter than that in a partial load operation. Moreover, for forming a stable air-fuel mixture, it is required that the spray particle diameter be made smaller than in the present state. Further, it is required that the spray angle be made smaller than that in a low temperature starting operation and larger than that in a partial load operation. Thus, the spray characteristics for "uniform combustion" are suitable for a full load operation of the engine 1.

According to the fuel injection control device of this embodiment described above, fuel is injected from the fuel injection orifice 69a in the fuel injection device 3 into the combustion chamber 2 to form a fuel spray in the combustion chamber 2. On the other hand, air is injected from the air injection orifices 69b in the fuel injection device 3 into the combustion chamber 2 to form air jets in the combustion chamber 2. In this construction, the air injection orifices 69b and the fuel injection orifice 69a are oriented such that the air jets injected from the air injection orifices 69b collide with the fuel spray injected from the fuel injection orifice 69a. Therefore, the shape of the fuel spray is changed upon collision of the air jets with the fuel spray.

For controlling the spray penetration distance, spray particle diameter and spray shape (spray angle) of the fuel spray injected from the fuel injection orifice 69a, the ECU 30 controls the fuel injection valve 43 and the air injection valve 44 each independently on the basis of an operating condition of the engine 1. In this control, the ECU 30 particularly controls both timing and period of air injection which is performed by the air injection valve 44. With this control, the fuel spray penetration distance, spray particle diameter and spray shape (spray angle) can be changed according to a difference in operating conditions of the direct injection type engine 1 and there can be obtained a fuel spray having characteristics best suited to the operating condition determined. As a result, it is possible to improve the combustion characteristic of fuel in each combustion chamber 2 of the engine 1, whereby it is possible to improve the exhaust emission of the engine 1 and improve the fuel economy and output of the engine.

A description will now be given of a mechanism of controlling the spray penetration distance. As shown in FIG. 14, it is when the air injection time is set equal to the fuel injection time and the air injection period is set equal to the fuel injection period by controlling the opening/closing timing of the fuel injection valve 43 and the air injection valve 44 that the spray penetration distance becomes relatively short. This is because air jets formed simultaneously with the formation of a fuel spray act as resistance to the fuel spray. On the other hand, as shown in FIGS. 15 and 16, it is when the air injection timing is allowed to precede or somewhat precede the fuel injection timing by controlling the opening/closing timing of the fuel injection valve 43 and the air injection valve 44 that the spray penetration distance becomes relatively long. This is because air jets formed ahead of or somewhat ahead of a fuel spray impart vigor to the fuel spray. Therefore, by changing the degree of precedence of the air injection timing relative to the fuel injection timing it is possible to make the spray penetration distance variable.

FIGS. 20A to 20C show control examples for the spray penetration distance, in which there are illustrated states of fuel sprays formed by using the fuel injection device 3. More specifically, FIG. 20A shows a fuel spray formed without air injection at the time of fuel injection. FIG. 20B shows a fuel spray formed by allowing air injection precede fuel injection by "1.0 ms."FIG. 20C shows a fuel spray formed by allowing air injection to precede fuel injection by "2.0 ms." From FIGS. 20A to 20C it is seen that the more preceded air injection relative to fuel injection, the longer the spray penetration distance relatively.

Next, a description will be given of a mechanism of controlling the spray particle diameter. As shown in FIGS. 14 to 16, it is in all of the cases where the relation between the air injection timing and the fuel injection timing and the relation between the air injection period and the fuel injection period are changed by controlling the opening/closing timing of the fuel injection valve 43 and the air injection valve 44 that the spray particle size becomes relatively small. This is because in all of the cases the fuel spray particles are divided by collision of air jets with the fuel spray.

Next, a description will be given of a mechanism of controlling the spray shape. As shown in FIGS. 14 to 16, it is in all of the cases where the relation between the air injection timing and the fuel injection timing and the relation between the air injection period and the fuel injection period are changed by controlling the opening/closing timing of the fuel injection valve 43a and the air injection valve 44 that the spray shape (spray angle) changes. As shown in FIG. 13, the reason why the spray angle becomes large ("Large spray angle") by the control for "Warm-up combustion" is that the fuel/air injection periods and the fuel/air injection timings are the same and that therefore the dispersion to the environs upon fuel-air collision is improved. As shown in FIG. 13, the reason why the spray angle becomes small ("Small spray angle") by the control for "stratified charge combustion" is that, by allowing air injection to precede fuel injection, a fuel spray extends in the direction of fuel injection while being carried by a current of air, resulting in the spray penetration distance becoming long, while in the width direction the expanse of the fuel spray becomes small in inverse proportion to the increase of length even upon collision therewith of air. As shown in FIG. 13, the reason why the spray angle becomes medium ("Medium spray angle") by the control for "uniform combustion" is that the degree of precedence of air injection is smaller than that in "stratified charge combustion."

In connection with the above fuel injection control for "warm-up combustion," "stratified charge combustion," and "uniform combustion,"descriptions have been given of the case where a change of fuel/air injection timings and a change of fuel/air injection periods are combined with each other, but in the case where the fuel/air injection timings and the fuel/air injection periods are changed each independently, it is presumed that there will be obtained the following functions and effects.

When the ECU 30 makes control to let the timing of air injection performed by the air injection valve 44 precede the timing of fuel injection performed by the fuel injection valve 43, the fuel spray penetration distance becomes long relatively, while the fuel spray particle diameter becomes relatively small, and there is obtained a fuel spray having characteristics suitable for stratified charge combustion. As a result, it is possible to improve the fuel combustion performance of the engine 1.

When the ECU 30 makes control to let the air injection period by the air injection valve 44 be equal to the fuel injection period by the fuel injection valve 43, the fuel spray particle diameter becomes relatively small throughout the whole fuel injection period, whereby it is possible to improve the fuel combustion performance of the engine 1.

Further, when the ECU 30 makes control to let the air injection period by the air injection valve 44 be longer than the fuel injection period by the fuel injection valve 43, the fuel spray penetration distance becomes relatively long and the spray particle diameter becomes relatively small throughout the whole region of the fuel spray, whereby it is possible to improve the fuel combustion performance of the engine 1.

In this embodiment, each component may be materialized in the following examples 1, 2, and 3, which produces specific effects.

EXAMPLE 1

Figure 57:
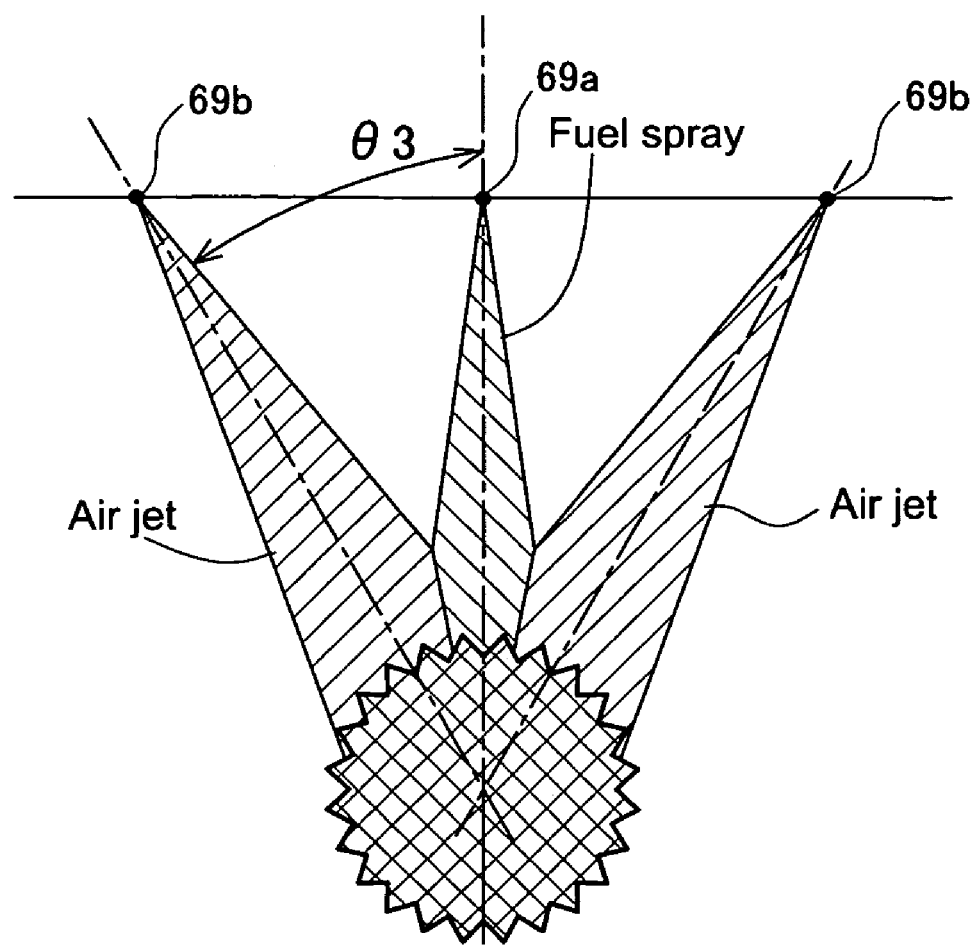
FIG. 57 is a conceptual diagram showing a state of collision of air jets with a fuel spray in Example 1 in the first embodiment.

Depending on settings of an angle$\theta 3$ of collision between a fuel spray injected from the fuel injection orifice 69a and an air jet injected from the air injection orifice 69b, as shown in FIG. 57, the spray penetration distance of the fuel spray (herein, referred to as a "spray length") can be made shorter or longer.

If the collision angle $\theta 3$ is set somewhat large (for example, 75°), the spray length can be made shorter or longer by setting the air injection timing appropriately. For example, when both fuel and air are injected simultaneously, an air resistance between spray and air current increases due to reverse flowing of an air current generated upon collision and also due to the atomization of spray. This air resistance increasing action combines with the fuel spray-air jet collision, with the result that the spray length becomes shorter than in the case where air is not injected. Conversely, if air is injected ahead of the injection of fuel, a current of air occurs also in the spray extending direction at the time of collision, so that the spray length becomes longer. However, it has been known that the spray length varying effect in this case is less significant than in case of setting small the collision angle $\theta 3$ as will be explained below.

On the other hand, if the collision angle $\theta 3$ is set small (for example, 45°), it becomes possible to make the spray length longer by setting the air injection timing appropriately. This is because an air jet is brought into collision with a fuel spray in a direction of pushing the fuel spray. In the simultaneous injection of both fuel and air, the spray length becomes longer, and in the case where air is injected ahead of fuel, the spray length becomes still longer because there exists such an air current as becomes longer at the time of injection. In this case, a variable quantity of the spray length becomes longer than in case of setting the collision angle $\theta 3$ large, so in the basic fuel spray, even if the fuel pressure is reduced (for example, from 12 MPa to 2 MPa), a worsening of spray atomization caused by that decrease of fuel pressure can be remedied by air blast. Consequently, the spray length can be controlled in a variable manner by adjusting the fuel-air injection timing appropriately while keeping the fuel pressure reduced and thereby controlling both fuel spray and air jet. For example, when both fuel and air are injected at a time, the spray length can be made long (shorter than in case of setting the fuel pressure at 12 MPa and omitting air blast), and when air is injected ahead of fuel, it is possible to further increase the spray length (it has already been made sure that the spray particle diameter can be made smaller than in case of setting the fuel pressure at 12 MPa and omitting air blast).

Figure 58:
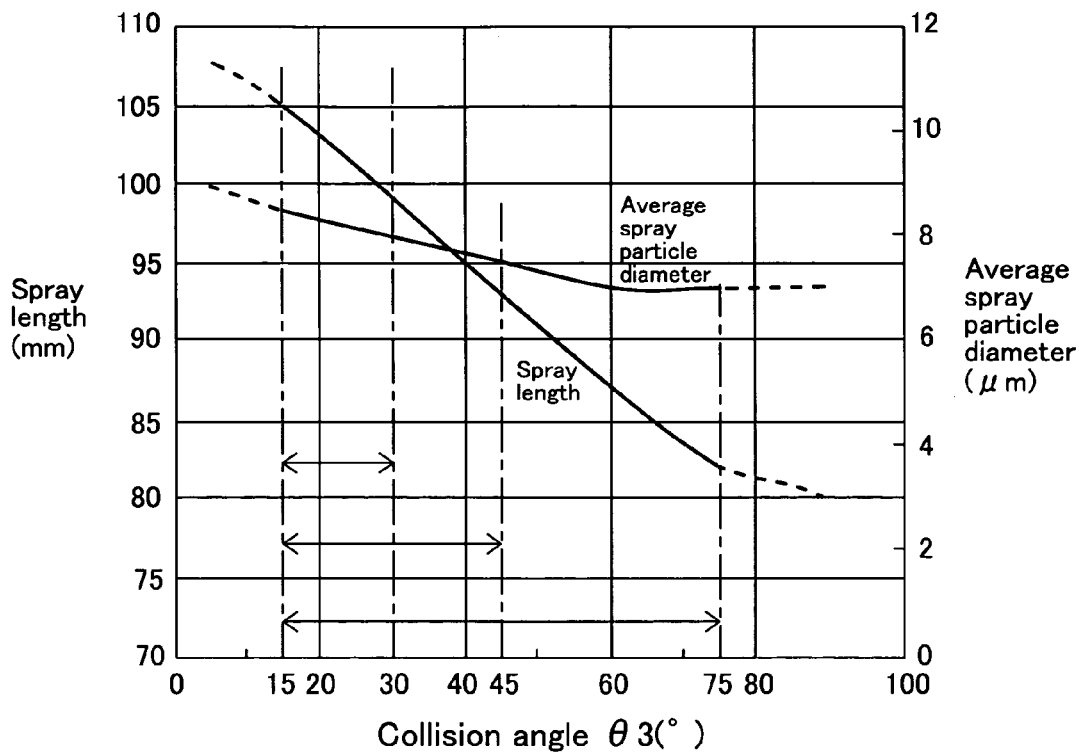
FIG. 58 is a graph showing a relation of collision angle to spray length and average spray particle diameter in Example 1 in the first embodiment.

Such experimental results as shown in FIG. 58 were obtained with respect to the relation of collision angle $\theta 3$ to spray length and average spray particle diameter. In this experiment, the fuel injection device 3 shown in FIGS. 2 and 3 was used and the fuel (n-heptane) pressure was set to 12 MPa, the air pressure of air blast was set to 1 MPa, the fuel injection quantity was set to $9.18*10^{-3}$ (g/ms), the distance X from the fuel injection orifice 69a to the air injection orifice 69b was set to 1 mm, and the injection of air was set at an advance injection by 1 ms ahead of fuel injection.

As is seen from FIG. 58, at a collision angle $\theta 3$ in the range of 15° to 75° an effective spray length in the range of 105 to 82 mm is obtained and an effective average spray particle diameter in the range of 8.5 to 7 μm is obtained.

Under the above conditions, the spray length was 75 mm when air injection was not conducted.

In view of the above points, the collision angle $\theta 3$ in this Example 1 is set to a predetermined value in the range of 15° to 75°, preferably 15° to 45°, whereby an effective spray length in the range of 105 to 93 mm and an effective average spray particle diameter of 8.5 to 7.5 μm are obtained. More preferably, the collision angle $\theta 3$ is set to a predetermined value in the range of 15° to 30°, whereby an effective spray length in the range of 105 to 99 mm and an effective average spray particle diameter in the range of 8.5 to 8.0 μm are obtained. That is, in this Example 1 the spray length can be made larger by a restrictive setting of the collision angle $\theta 3$.

EXAMPLE 2

By setting the distance X from the fuel injection orifice 69a to the air injection orifice 69b as above higher spray atomization and larger spray length at the same air pressure can be attained.

Figure 59:
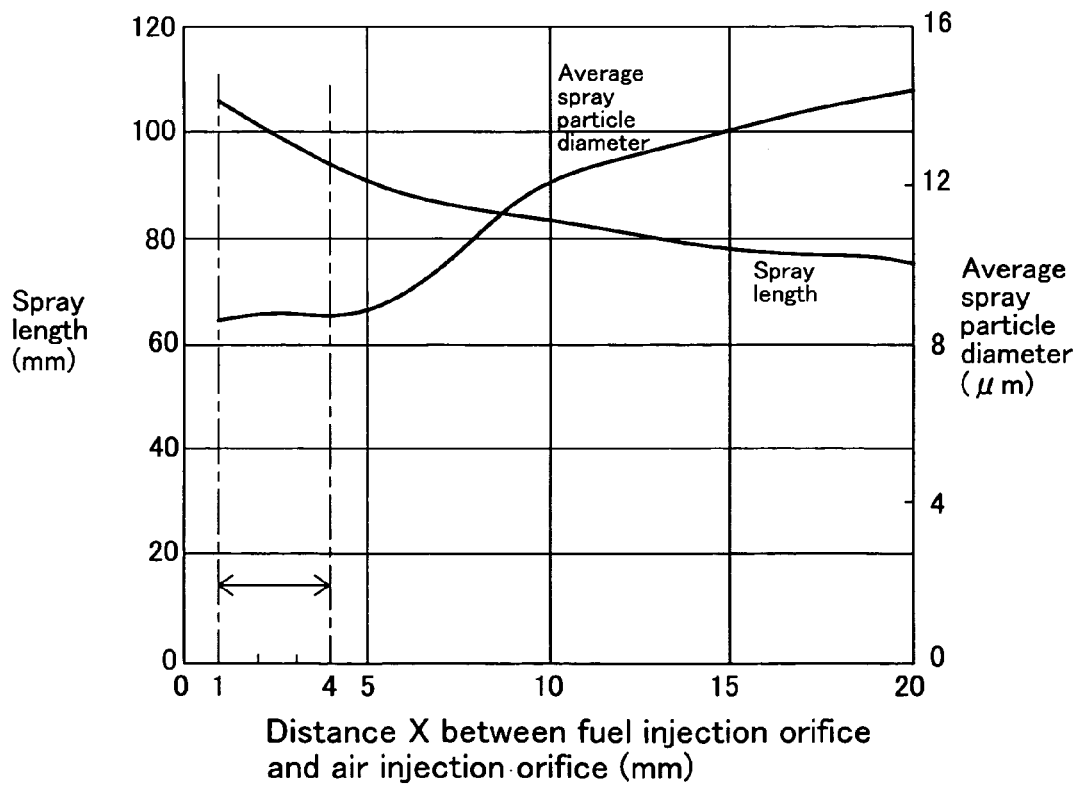
FIG. 59 is a graph showing a relation of distance X to spray length and average spray particle diameter in Example 2 in the first embodiment.

Such experimental results as shown in FIG. 59 were obtained with respect to the relation between the distance X to spray length and average spray particle diameter. In this experiment, the fuel injection device 3 shown in FIGS. 2 and 3 was used and the fuel (n-heptane) pressure was set to 12 MPa, the air pressure of air blast was set to 1 MPa, the fuel injection quantity was set to $9.18*10^{-3}$ (g/ms), the collision angle $\theta 3$ was set to 15°, and the injection of fuel was set at an advance injection by 1 ms ahead of fuel injection.

As is seen from FIG. 59, the smaller the distance X, the greater the effect of spray atomization and an extension effect of spray length. It has been known that by only reducing the distance X to half there is obtained the same effect as that obtained by doubling the air pressure. Thus, by making the distance X as short as possible, a high spray atomization effect and an extension effect of spray length can be obtained with less energy. As is seen from FIG. 59, the curve of an average spray particle diameter is somewhat gentle at a distance X of 4 mm and thereabouts. In the distance X range of 1 to 4 mm an effective spray length in the range of 105 to 95 mm is obtained and an effective average spray particle diameter of about 9 µm is obtained. In this Example 2, therefore, the distance X is set to a predetermined value in the range of 1 to 4 mm. By making such a restrictive setting it is possible to attain high spray atomization and make the spray length larger without changing the air pressure.

Under the above conditions, the spray length was 75 mm when air injection was not conducted.

EXAMPLE 3

By setting the pressure of fuel fed to the fuel injection valve 43 to a predetermined low pressure it is possible to increase the spray length variable quantity [a difference in spray length between the case where air is brought into collision with fuel spray (with air) and the case where air is not brought into collision with fuel spray (without air)] without greatly changing the spray particle diameter.

Figure 60:
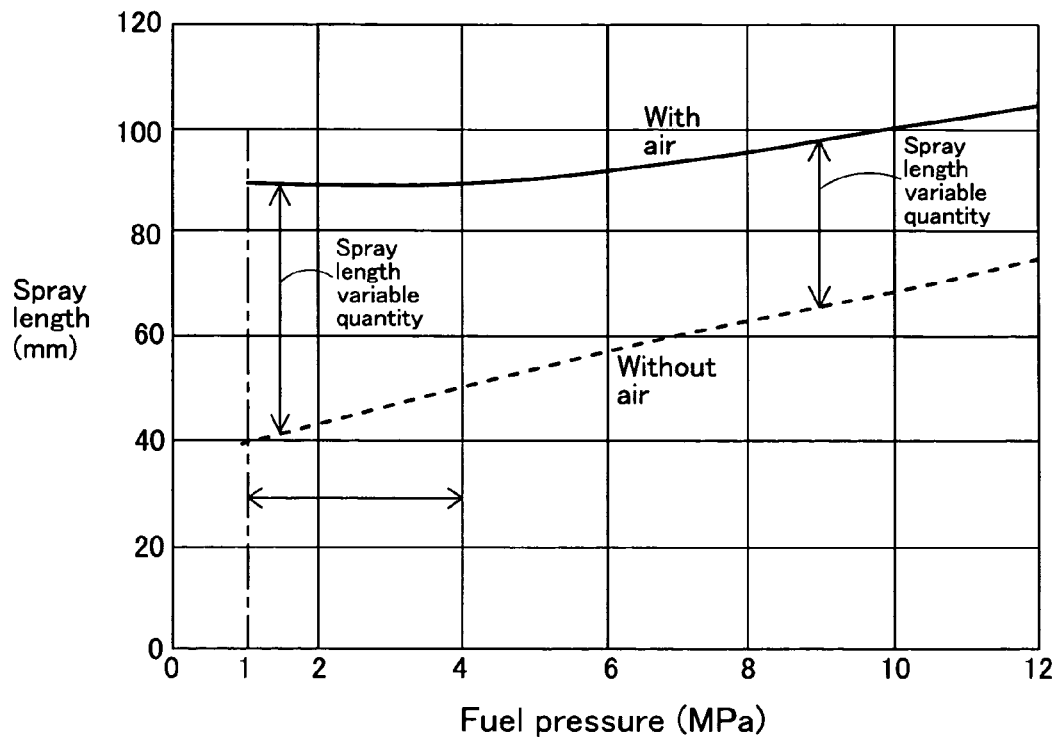
FIG. 60 is a graph showing a relation between fuel pressure and spray length in Example 3 in the first embodiment.
Figure 61:
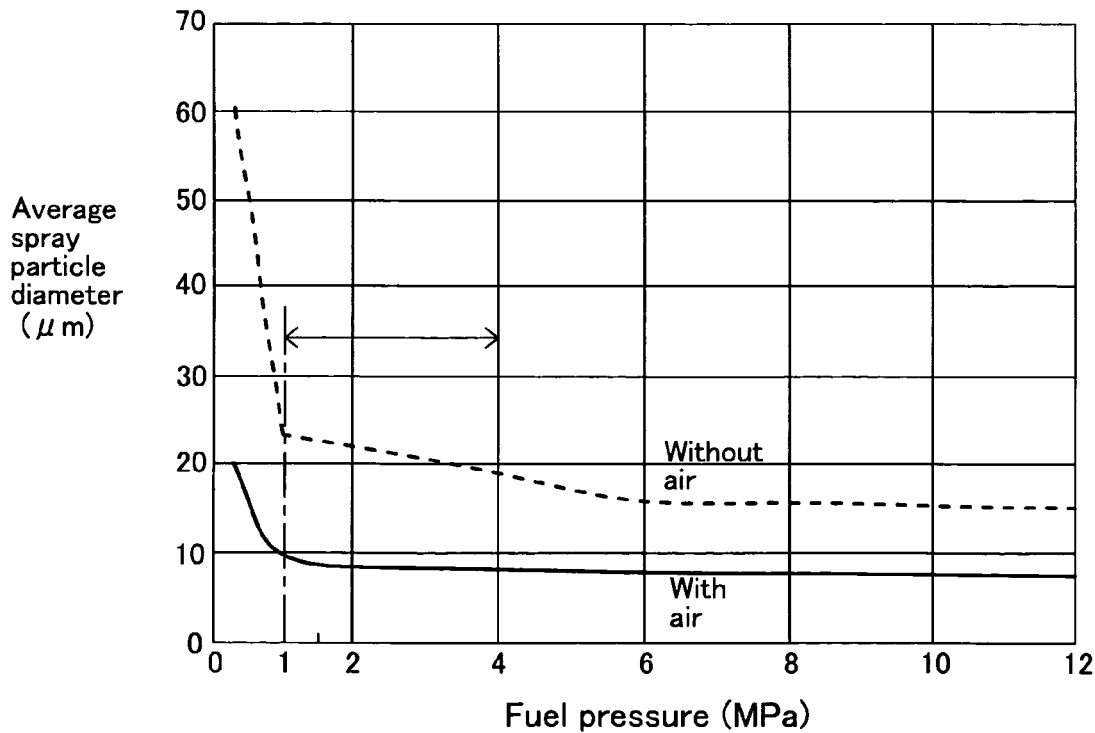
FIG. 61 is a graph showing a relation between fuel pressure and average spray particle diameter in Example 3 in the first embodiment.

Such experimental results as shown in FIG. 60 were obtained with respect to the relation between fuel pressure and spray length. Further, such experimental results as shown in FIG. 61 were obtained with respect to the relation between fuel pressure and average spray particle diameter. In both experiments, the fuel injection device 3 shown in FIGS. 2 and 3 was used and the type of fuel was set to n-heptane, the air pressure of air blast was set to 1 MPa, the fuel injection quantity was set to $9.18*10^{-3}$ (g/ms), the collision angle θ3 was set to 15°, and the injection of air was set at an advance injection by 1 ms ahead of fuel injection.

As a characteristic required for injection, with respect to spray particle diameter and spray length variable quantity, it is desirable that the pressure of fuel fed to the fuel injection valve be as low as possible from the standpoint of structure of the fuel injection valve and energy loss. Spray atomization by air blast can be done with less energy, but for increasing the spray length variable quantity it is necessary to provide large energy by air injection. Therefore, if the spray length variable quantity is set so as to satisfy a required value, the spray particle diameter becomes smaller than its required value and the occasion of using wasteful atomization energy increases. In this case, by reducing the fuel pressure and enlarging the particle diameter of fuel spray with air not collided therewith, it is possible to reduce the fuel pressure while meeting the required values of spray particle diameter and spray length variable quantity. Since the fuel pressure is reduced, the kinetic energy of the fuel spray becomes smaller and the energy of air jet becomes larger relatively, so that the spray length variable quantity becomes larger.

As is apparent from FIGS. 60 and 61, the spray atomization effect by air blast (with air) is such that the average spray particle diameter bears a relation close to $-\frac{1}{2}$ square relative to fuel pressure. Further, it is seen that the lower the fuel pressure, the larger the spray length variable quantity. From this fact it is seen that, for making both spray atomization and spray length variable quantity compatible with each other by the use of air blast, a most efficient fuel pressure from the standpoint of energy consumption lies in a low pressure range in which the spray length variable quantity becomes large, and is preferably set in the range just before change of the spray particle diameter. Therefore, in this Example 3, the pressure of fuel fed to the fuel injection valve 43 is set to a predetermined value in the range of 1 to 4 MPa, whereby the spray length variable quantity can be made large without so greatly changing the average spray particle diameter.

Second Embodiment

Next, a direct injection type fuel injection device according to a second embodiment of the present invention will be described in detail below with reference to associated drawings.

In the embodiments which follow, including this second embodiment, the same components as in the previous first embodiment are identified by the same reference numerals as in the first embodiment and explanations thereof will be omitted. Different points will mainly be described below.

The construction of an orifice plate used in this embodiment is different from that used in the first embodiment. FIGS. 21A to 21D are characteristic diagrams of an orifice plate. FIG. 21A is a plan view of an orifice plate 82, FIG. 21B is a sectional view taken on line C1-C1 in FIG. 21A, FIG. 21C is a sectional view taken on line C2-C2 in FIG. 21A, and FIG. 21D is a conceptual diagram showing a positional relation between a fuel injection orifice 82a and air injection orifices 82b when the orifice plate 82 shown in FIG. 21A is seen in the direction of arrow C3.

As shown in FIGS. 21A to 21D, one rectangular slit-like fuel injection orifice 82a and plural (five in the illustrated example) air injection orifices 82b are formed in the orifice plate 82, the air injection orifices 82b being arranged at equal intervals on each of both sides of the fuel injection orifice 82a and in the longitudinal direction of the fuel injection orifice 82a. The air injection orifices 82b are positioned in the vicinity of the fuel injection orifice 82a. The "vicinity" is defined in terms of the foregoing distance X from the fuel injection orifice to each air injection orifice. As shown in FIGS. 21C and 21D, the fuel injection orifice 82a includes an inner surface which is divergently tapered in the direction of injection (leftwards in the figure) and also includes a curved recess 82c on the side (right-hand side in the figure) opposite to the injection side. The recess 82c is aligned with the opening of the hole 66a of the tube 66. Each air injection orifice 82b is circular in section (elliptic at its open end) and extends through the orifice plate 82 obliquely relative to an end face of the orifice plate 82. In this embodiment, a maximum width of the fuel injection orifice 82a is 2.0 mm, while an inside diameter of each air injection orifice 82b is set at 1.0 mm. Further, the spacing between adjacent air injection orifices 82b in each row is set at 1.5 mm.

Figure 9:
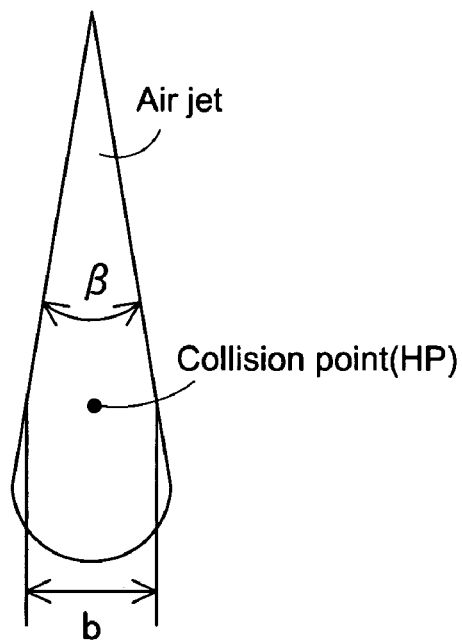

FIGS. 22A to 22C are conceptual diagrams of a fuel spray and an air jet(s). As shown in FIG. 22A, the fuel spray is flat and generally conical in shape. A spray angle θ1 at a front face of the spray is larger than a spray angle θ11 at a side face of the spray. The shape (taper angle) of each of the spray angles θ1 and θ11 is determined by maximum and minimum widths of the fuel injection orifice 82a formed in the orifice plate 82. As shown in FIG. 22B, a front shape and a side shape of one air jet (free jet) are almost the same conical shapes. A spread angle (jet angle) θ2 of the jet is determined by the size of inside diameter of each air injection orifice 82*b* formed in the orifice plate 82. As shown in FIG. 22C, multi-orifice jets injected from the plural air injection orifices 82*b* are in a serrated shape having a wide front face and narrow side faces. A collision point HP in this fuel spray is set so as to be positioned at a distance from an air injection orifice 82*b* at which the energy of an air jet injected from the air injection orifice 82*b* interferes with the fuel spray and permits adjusting the atomization of the fuel spray and the spray penetration distance and spray shape. The size (outside diameter (width)) at the collision point HP of an air jet injected from each air injection orifice 82*b* is set so as to become almost equal to an outside diameter D1 at the collision point HP of a fuel spray injected from the fuel injection orifice 82*a*. The "size of an air jet" which becomes almost equal to the outside diameter D1 of the fuel spray is defined from "jet angle β," "gas jet outside diameter, b" and "distance, c" which are shown in FIGS. 8 and 9 and also from the foregoing expression "b=2*c*tan(β/2)." Thus, this fuel injection device is constructed so that the fuel injected from the fuel injection valve 43 and the air injected from the air injection valve 44 are brought into collision with each other within the combustion chamber 2.

FIGS. 23A to 23C illustrate a difference between a spray strength and a jet strength at the collision point HP. As shown in FIG. 23A, the fuel spray exhibits a spray strength having a distribution range which is wide at a front face and narrow at a side face. As shown in FIG. 23B, one air jet (free jet) exhibits a jet strength having a distribution width in which both front face and side face are of the same width. As shown in FIG. 23C, multi-orifice jets exhibit a jet strength having a distribution range which is wide at a front face and narrow at a side face. The front width of this jet strength is obtained by overlap of plural air jets. Thus, a design is made so that the strength distribution of air jets is superimposed uniformly on the strength distribution of the fuel spray.

Figures 24A, 24B:
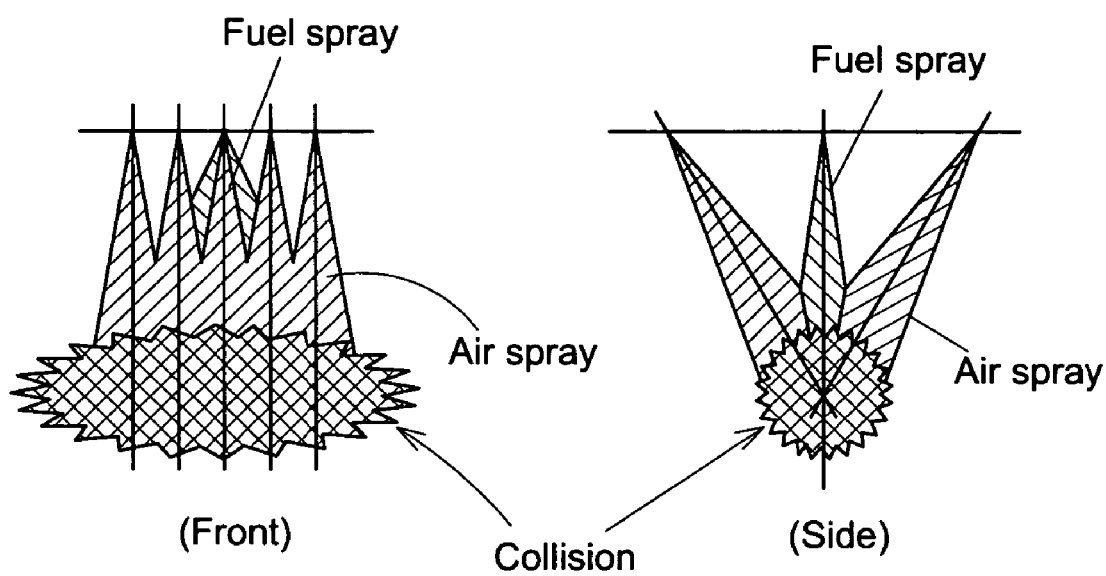
FIGS. 24A and 24B are conceptual diagrams each showing a state of collision of air jets with a fuel spray.

FIGS. 24A and 24B are conceptual diagrams showing a state of collision of plural air jets with a fuel spray. As shown in FIGS. 22A to 22C, since air jets having the same size and strength distribution are brought into collision with the fuel spray, the influence of the air jets can be exerted uniformly on the whole of the fuel spray. Thus, it is seen that fuel can be atomized effectively and that the spray penetration distance, etc. can be adjusted effectively.

Particularly in this embodiment, since the fuel injection orifice 82*a* is in the shape of a rectangular slit, the fuel spray expands in a flat cone shape. Besides, plural air injection orifices 82*b* are arranged at equal intervals on both sides of the rectangular fuel injection orifice 82*a* and in the longitudinal direction of the orifice 82*a*. Consequently, air jets collide with the fuel spray uniformly in the longitudinal direction of the fuel spray and from both sides of the spray. As a result, it is possible to attain uniform and finer fuel atomization without greatly changing the shape of the fuel spray which expands in a flat cone shape.

Other functions and effects of this second embodiment are basically the same as those of the fuel injection device 3 of the first embodiment.

Third Embodiment

Next, a direct injection type fuel injection device according to a third embodiment of the present invention will be described in detail below with reference to associated drawings.

In this third embodiment the arrangement and direction of air injection orifices formed in an orifice plate are different from those in the previous second embodiment. FIGS. 25A to 25D are characteristic diagrams of an orifice plate 83, of which FIG. 25A is a plan view of the orifice plate 83; FIG. 25B is a sectional view taken on line E1-E1 in FIG. 25A; FIG. 25C is a sectional view taken on line E2-E2 in FIG. 25A; and FIG. 25D is a conceptual diagram showing a positional relation between a fuel injection orifice 83*a* and an air injection orifice 83*b* when the orifice plate 83 shown in FIG. 25A is seen in the direction of arrow E3.

As shown in FIGS. 25A to 25D, one fuel injection orifice 83*a* formed in the orifice plate 83 is in a rectangular slit shape and plural (five in the illustrated example) air injection orifices are arranged at equal intervals on each of both sides of the fuel injection orifice 83*a* and in the longitudinal direction of the same orifice. The air injection orifices 83*b* are arranged in the vicinity of the fuel injection orifice 83*a*. The "vicinity" is defined by the foregoing distance X from the fuel injection orifice to each gas injection orifice. As shown in FIGS. 25C and 25D, the shape and size of the fuel injection orifice 83*a* are the same as those of the fuel injection orifice 82*a*, including a curved recess 83*c*. The recess 83*c* is aligned with the opening of the hole 66*a* of the tube 66. Each air injection orifice 83*b* is circular in section (elliptic at its open end) and extends through the orifice plate 83 obliquely relative to an end face of the orifice plate. In this embodiment, the spacing between adjacent air injection orifices 83*b* in each row is set narrower than the spacing between adjacent air injection orifices 82*b* in the orifice plate 82 used in the previous embodiment. As shown in FIG. 25D, the air injection orifices 83*b* in each row are somewhat inclined also in the direction of the row. The size of each air injection orifice 83*b* in this embodiment is the same as that of each injection orifice 82*b*.

Figure 26A:
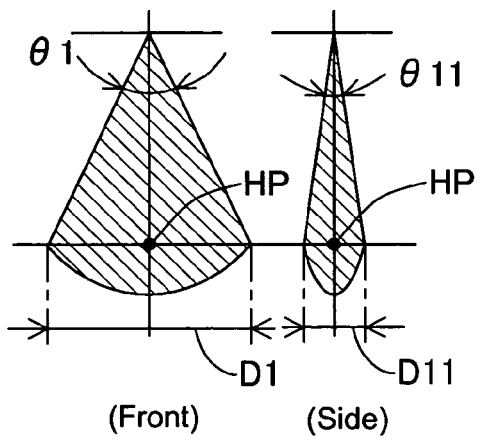
FIGS. 26A and 26B are conceptual diagrams each showing a fuel spray and an air jet(s)
Figure 26B:
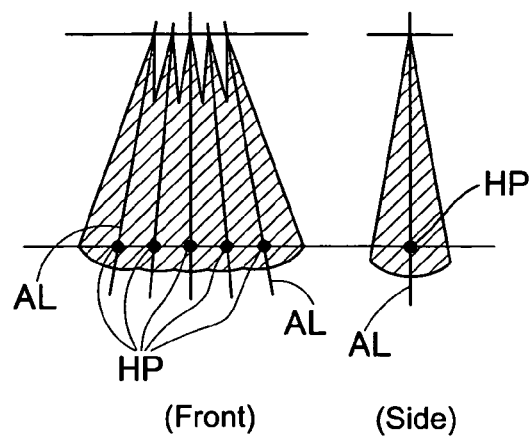

FIGS. 26A and 26B are conceptual diagrams each showing a fuel spray and an air jet(s). As shown in FIG. 26A, a fuel spray is in a flat, generally conical shape. A front splay angle θ1 of the spray is larger than a side spray angle θ11 of the spray. The spray angles θ1 and θ11 are determined by maximum and minimum widths of the fuel injection orifice 83*a* formed in the orifice plate 83. As shown in FIG. 26B, multi-orifice jets injected from the plural air injection orifices 83*b* are in a serrated shape having a wide front face and narrow side faces. A collision point HP in this fuel spray is set so as to be positioned at a distance from an air injection orifice 83*b* at which the energy of an air jet injected from the air injection orifice 83*b* interferes with the fuel spray and permits adjusting the atomization of the fuel spray and the spray penetration distance and spray shape. The size (outside diameter (width)) at the collision point HP of an air jet injected from each air injection orifice 83*b* is set so as to become almost equal to an outside diameter D1 at the collision point HP of a fuel spray injected from the fuel injection orifice 83*a*. The "size of an air jet" which becomes almost equal to the outside diameter D1 of the fuel spray is defined from "jet angle β," "gas jet outside diameter, b" and "distance, c" which are shown in FIGS. 8 and 9 and also from the foregoing expression "b=2*c*tan(β/2)." Thus, this fuel injection device is constructed so that the fuel injected from the fuel injection valve 43 and the air injected from the air injection valve 44 are brought into collision with each other within the combustion chamber 2.

Figure 27A:
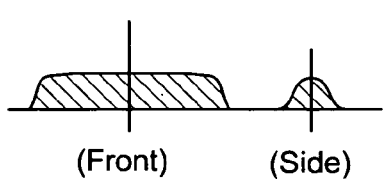
FIGS. 27A and 27B are conceptual diagrams each showing a difference between a spray strength and a jet strength at a collision point.
Figure 27B:
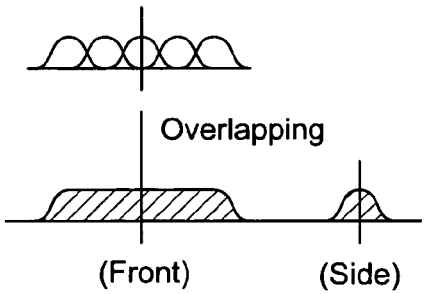

FIGS. 27A and 27B illustrate a difference between a spray strength and a jet strength at the collision point HP. As shown in FIG. 27A, the fuel spray exhibits a spray strength having a distribution range which is wide at a front face and narrow at a side face. As shown in FIG. 27B, multi-orifice jets also exhibit a jet strength having a distribution range which is wide at a front face and narrow at a side face. The front width of this jet strength is obtained by overlap of plural air jets. Thus, a design is made so that the strength distribution of air jets is superimposed uniformly on the strength distribution of the fuel spray.

Figure 28A:
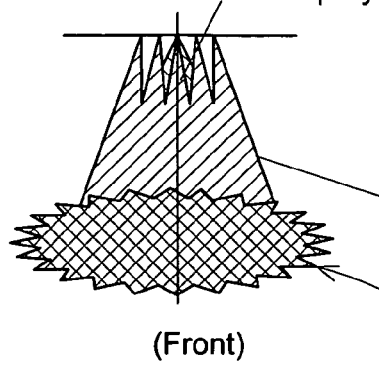
FIGS. 28A and 28B are conceptual diagrams each showing a state of collision of air jets with a fuel spray.
Figure 28B:
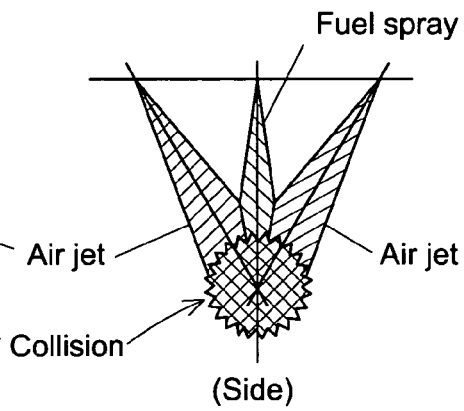

FIGS. 28A and 28B are conceptual diagrams showing a state of collision of plural air jets with a fuel spray. As shown in FIGS. 26A and 26B, since air jets having the same size and strength distribution are brought into collision with one fuel spray, at the spray angle θ1 and at the same size and strength distribution as the fuel spray at the collision point HP, the influence of the air jets can be exerted uniformly on the whole of the fuel spray without changing the spray angle θ1 after the collision. Thus, it is seen that fuel can be atomized effectively and that the spray penetration distance, etc. can be adjusted effectively.

Other functions and effects of this embodiment are basically the same as those of the fuel injection device of the second embodiment.

Fourth Embodiment

Next, a direct injection type fuel injection device according to a fourth embodiment of the present invention will be described in detail below with reference to associated drawings.

Figure 29B:
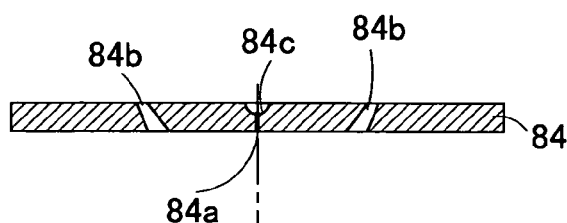
FIGS. 29A to 29D are characteristic diagrams of an orifice plate.
Figure 29A:
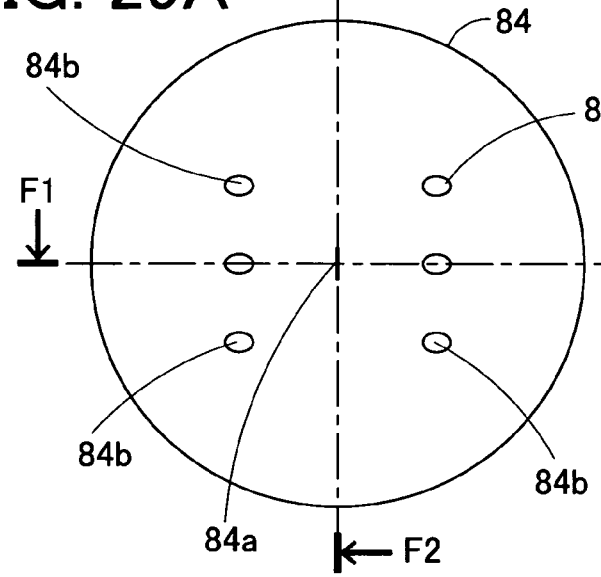
Figures 29C, 29D:
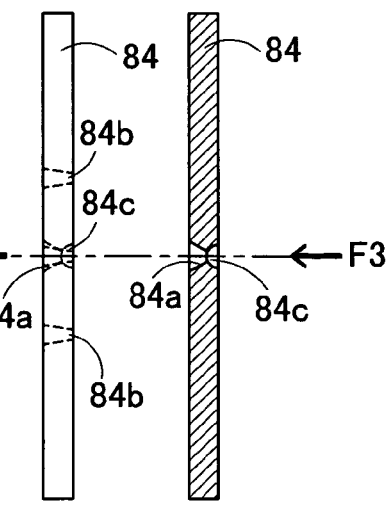

In this embodiment, the size, arrangement and shape of each air injection orifice formed in an orifice plate are different from those adopted in the previous second and third embodiments. FIGS. 29A to 29D are characteristic diagrams of an orifice plate 84, of which FIG. 29A is a plan view of the orifice plate 84; FIG. 29B is a sectional view taken on line F1-F1 in FIG. 29A; FIG. 29C is a sectional view taken on line F2-F2 in FIG. 29A; and FIG. 29D is a conceptual diagram showing a positional relation between a fuel injection orifice 84a and air injection orifices 84b when the orifice plate 84 shown in FIG. 29A is seen in the direction of arrow F3.

In the orifice plate 84, as shown in FIGS. 29A to 29D, one fuel injection orifice 84a is formed in a rectangular slit shape, and on both sides of the fuel injection orifice 84a there are formed plural (three in the illustrated example) air injection orifices 84b at equal intervals in the longitudinal direction of the fuel injection orifice 84a. The air injection orifices 84b are positioned in the vicinity of the fuel injection orifice 84a. The "vicinity" is defined by the foregoing distance X from the fuel injection orifice to each gas injection orifice. As shown in FIGS. 29C and 29D, the shape and size of the fuel injection orifice 84a are the same as those of the fuel injection orifices 82a and 83a described previously, including a recess 84c which is curved on the side (rightwards in the figure) opposite to the injection side. The recess 84c is aligned with the opening of the hole 66a of the tube 66. Each air injection orifice 84b is circular in section (elliptic at its open end) and includes an inner surface which is tapered divergently in the direction of injection. In this embodiment, the spacing between adjacent air injection orifice 84b in each row is set wider than the spacing between adjacent air injection orifices 82b (83b) described previously. An inside diameter of each air injection orifice 84b is set at 1.3 mm. Further, the spacing between adjacent air injection orifices 84b in each row is set at 2.0 mm.

FIGS. 30A to 30D are conceptual diagrams of a fuel spray and an air jet(s). As shown in FIG. 30A, the fuel spray is flat and generally conical in shape. A spray angle θ1 at a front face of the spray is larger than a spray angle θ11 at a side face of the spray. The shape (taper angle) of each of the spray angles θ1 and θ11 is determined by maximum and minimum widths of the fuel injection orifice 84a formed in the orifice plate 84. As shown in FIG. 30B, for example in the case where an inner surface shape of each air injection orifice 82b is not divergent as in the orifice plate 82, a front shape and a side shape of one air jet (free jet) are almost the same conical shapes. On the other hand, as shown in FIG. 30C, in the case where the inside diameter of each air injection orifice 84b is enlarged and an inner surface shape thereof is made divergent, a front shape and a side shape of one air jet (free jet) are the same conical shapes having a wide jet angle θ21. As shown in FIG. 30D, plural air jets (multi-orifice jets) injected from plural air injection orifices 84b are in a serrated shape having a wide front face and narrow side faces. A collision point HP in this fuel spray is set so as to be positioned at a distance from an air injection orifice 84b at which the energy of an air jet injected from the air injection orifice 84b interferes with the fuel spray and permits adjusting the atomization of the fuel spray and the spray penetration distance and spray shape. The size (outside diameter (width)) at the collision point HP of an air jet injected from each air injection orifice 84b is set so as to become almost equal to an outside diameter D1 at the collision point HP of a fuel spray injected from the fuel injection orifice 84a. The "size of an air jet" which becomes almost equal to the outside diameter D1 of the fuel spray is defined from "jet angle β," "gas jet outside diameter, b" and "distance, c" which are shown in FIGS. 8 and 9 and also from the foregoing expression "b=2*c*tan(β/2)." Thus, this fuel injection device is constructed so that the fuel injected from the fuel injection valve 43 and the air injected from the air injection valve 44 are brought into collision with each other within the combustion chamber 2.

Figure 31A:
FIGS. 31A to 31D are conceptual diagrams each showing a difference between a spray strength and a jet strength at a collision point.
Figure 31B:
Figure 31C:
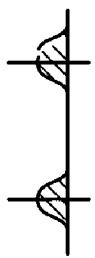
Figure 31D:
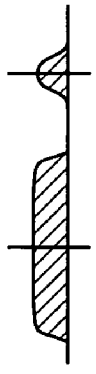

FIGS. 31A to 31D illustrate a difference between a spray strength and a jet strength at the collision point HP. As shown in FIG. 31A, the fuel spray exhibits a spray strength having a distribution range which is wide at a front face and narrow at a side face. FIG. 31B shows a jet strength of one air jet (free jet) in the case where an inner surface shape of each air injection orifice 82b is not divergent as in the orifice plate 82. In FIG. 31C there shown a jet strength of one air jet (free jet) in the case where the inside diameter of each air injection orifice 84b is enlarged and an inner surface shape thereof is made divergent. From FIG. 31C it is seen that the distribution range of the jet strength becomes wider correspondingly to the divergent shape. As shown in FIG. 31D, plural air jets (multi-orifice jets) exhibit a jet strength having a distribution range which is wide at a front face and narrow at a side face. The front width of this jet strength is obtained by overlap of plural air jets. Thus, a design is made so that the strength distribution of air jets superimposed uniformly and with a margin on the strength distribution of the fuel spray.

Figure 32A:
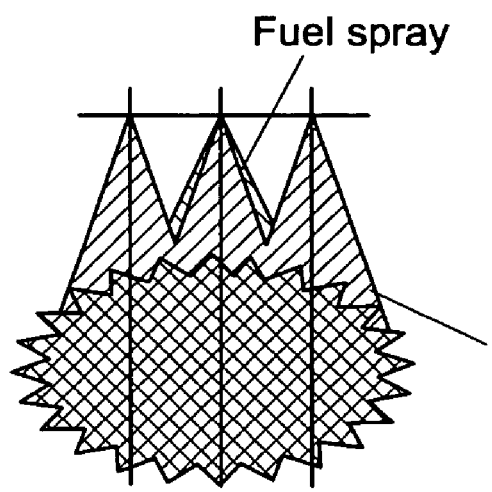
FIGS. 32A and 32B are conceptual diagrams each showing a state of collision of air jets with a fuel spray.
Figure 32B:
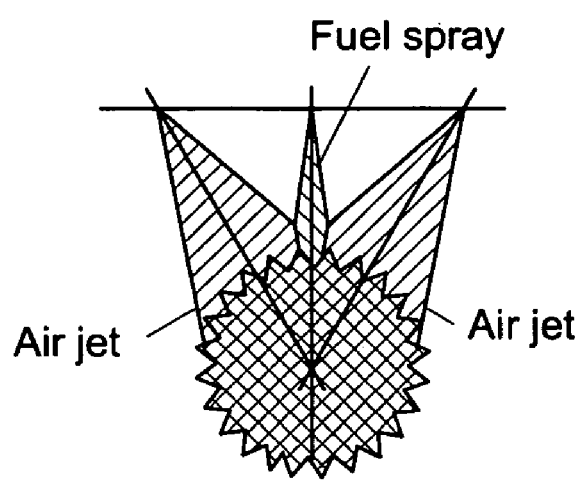

FIGS. 32A and 32B are conceptual diagrams showing a state of collision of plural air jets with a fuel spray. As shown in FIGS. 30A and 30D, since plural air jets having the same size and strength distribution are brought into collision with one fuel spray at the spray angle θ1 and at the same size and strength distribution as the fuel spray at the collision point HP, the influence of the air jets can be exerted uniformly on the whole of the fuel spray without changing the spray angle θ1 of the fuel spray after the collision. Besides, since one air jet is made divergent, the air jet angle θ21 becomes larger than the jet angle θ2 and the jet distribution strength becomes flat. Consequently, air jets can be brought into collision with the fuel spray in a relatively wide range and with a margin and the atomization of fuel can be done positively even if the fuel spray distribution changes. Further, by enlarging the orifice diameter to increase the jet strength, an equal performance can be exhibited even if the number of orifices is decreased in comparison with the case where the air jet is not made divergent. Thus, it is seen that the fuel can be atomized effectively and that the spray penetration distance, etc. can be adjusted effectively.

Other functions and effects of this embodiment are basically the same as those of the fuel injection devices of the second and third embodiments.

Fifth Embodiment

A direct injection type fuel injection device according to a fifth embodiment of the present invention will be described in detail below with reference to associated drawings.

This fifth embodiment is different from the previous embodiments in the construction of air injection orifices formed in an orifice plate. FIGS. 33A to 33D are characteristic diagrams of an orifice plate 85, of which FIG. 33A is a plan view of an orifice plate 85; FIG. 33B is a sectional view taken on line G1-G1 in FIG. 33A; FIG. 33C is a sectional view taken on line G2-G2 in FIG. 33A; and FIG. 33D is a conceptual diagram showing a positional relation between a fuel injection orifice 85a and an air injection orifice 85b when the orifice plate 85 shown in FIG. 33A is seen in the direction of arrow G3.

In the orifice plate 85, as shown in FIGS. 33A to 33D, one fuel injection orifice 85a is formed in a rectangular slit shape and a pair of air injection orifices 85b are formed on both sides of and in parallel with the fuel injection orifice 85a. The air injection orifices 85b are positioned in the vicinity of the fuel injection orifice 85a. The "vicinity" is defined by the foregoing distance X from the fuel injection orifice to the gas injection orifice. The air injection holes 85b are each in a rectangular shape of an elongated section. As shown in FIGS. 33C and 33D, the shape and size of the fuel injection orifice 85a are the same as those of the fuel injection orifices 82a, 83a, and 84a. The fuel injection orifice 85a includes a curved recess 85c on the side (right-hand side in the figure) opposite to the injection side. The recess 85c is aligned with the opening of the hole 66a of the tube 66. A maximum width and a minimum width of each air injection orifice 85b are set to 6.0 mm and 0.65 mm, respectively.

FIGS. 34A and 34B are conceptual diagrams of a fuel spray and an air jet. As shown in FIG. 34A, the fuel spray is in a flat, generally conical shape. A spray angle θ1 at a front face of the spray is larger than a spray angle θ11 at a side face of the spray. The spray angles θ1 and θ11 are determined by maximum and minimum widths of the fuel injection orifice 85a formed in the orifice plate 85. As shown in FIG. 34B, an air jet injected from each air injection orifice 85b is in a wedge shape which is wide at a front face and narrow at a side face. A collision point HP in this fuel spray is set so as to be positioned at a distance from an air injection orifice 85b at which the energy of an air jet injected from the air injection orifice 85b interfaces with the fuel spray and permits adjusting the atomization of the fuel spray and the spray penetration distance and spray shape. The size (outside diameter (width)) at the collision point HP of an air jet injected from each air injection orifice 85b is set so as to become almost equal to an outside diameter D1 at the collision point HP of a fuel spray injected from the fuel injection orifice 85a. The "size of an air jet" which becomes almost equal to the outside diameter D1 of the fuel spray is defined from "jet angle β," "gas jet outside diameter, b" and "distance, c" which are shown in FIGS. 8 and 9 and also from the foregoing expression "b=2*c*tan(β/2)." Thus, this fuel injection device is constructed so that the fuel injected from the fuel injection valve 43 and the air injected from the air injection valve 44 are brought into collision with each other within the combustion chamber 2.

FIGS. 35A and 35B illustrate a difference between a spray strength and a jet strength at the collision point HP. As shown in FIG. 35A, the fuel spray exhibits a spray strength having a distribution range which is wide at a front face and narrow at a side face. As shown in FIG. 35B, each air jet exhibits a jet strength having a distribution range wide at a front face and narrow at a side face. Thus, a design is made so that the strength distribution of air jets is superimposed uniformly on the strength distribution of the fuel spray.

FIGS. 36A and 36B are conceptual diagrams showing a state of collision of plural air jets with a fuel spray. As shown in FIGS. 34A and 34B, since a pair of air jets having the same size and strength distribution are brought into collision with one fuel spray at the spray angle θ1 and at the same size and strength distribution as the fuel spray at the collision point HP, the influence of the air jets can be exerted uniformly on the whole of the fuel spray without changing the spray angle θ1 of the fuel spray after the collision. Accordingly, it is seen that it is possible to atomize the fuel effectively and adjust the spray penetration distance, etc. effectively.

In this embodiment, since each air injection orifice 85a is rectangular, each air jet spreads in a flat conical shape. Particularly, therefore, the air jets can be brought into collision uniformly with the whole of the fuel spray which spreads flatwise, and it is possible to atomize the fuel into uniform and finer particles.

In this embodiment, moreover, since the fuel injection orifice 85a is rectangular, the fuel spray injected therefrom spreads in a flat conical shape. Further, since a pair of rectangular air injection orifices 85b are on both sides of and in parallel with the rectangular fuel injection orifice 85a, a pair of air jets come into collision uniformly with the fuel spray in the longitudinal direction of the fuel spray and from both sides of the spray. Particularly, therefore, gas jets can be brought into collision uniformly with the whole of the fuel spray which spreads flatwise and thus the fuel can be atomized uniformly and more finely without greatly changing the spray shape.

Other functions and effects of this embodiment are basically the same as those of the fuel injection device of the first embodiment.

Sixth Embodiment

Next, a direct injection type fuel injection device according to a sixth embodiment of the present invention will be described in detail below with reference to associated drawings.

Figure 37B:
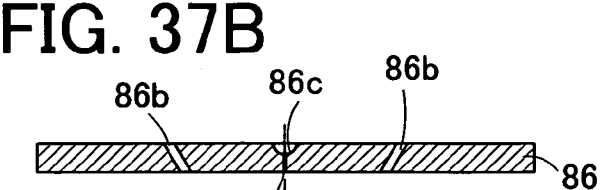
FIGS. 37A to 37D are characteristic diagrams of an orifice plate.
Figure 37A:
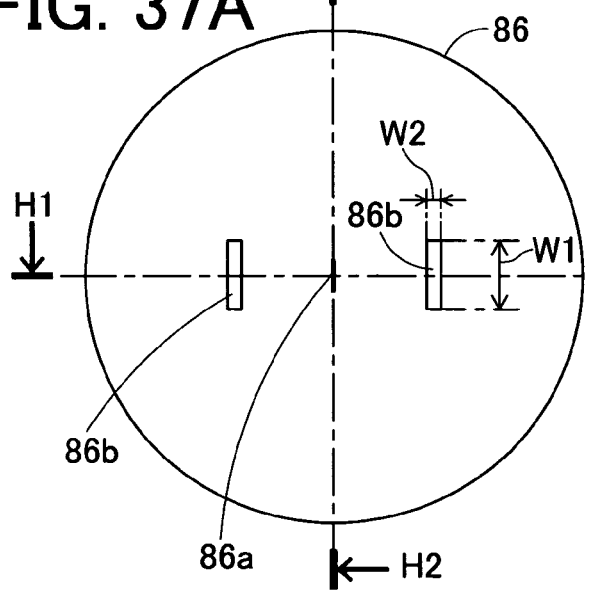
Figures 37C, 37D:
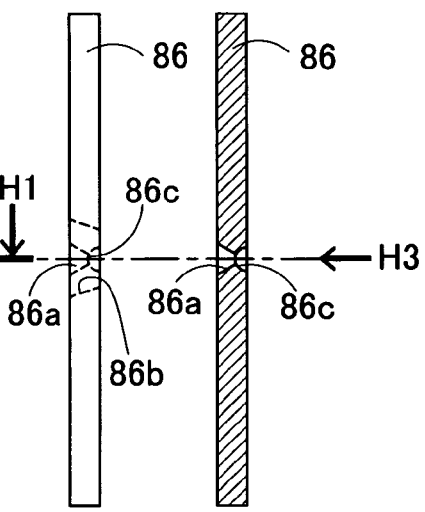

In this fifth embodiment the construction of each air jet orifice formed in an orifice plate is different from that in the previous fifth embodiment. FIGS. 37A to 37D are characteristic diagrams of an orifice plate 86, of which FIG. 37A is a plan view of the orifice plate 86; FIG. 37B is a sectional view taken on line H1-H1 in FIG. 37A; FIG. 37C is a sectional view taken on line H2-H2 in FIG. 37A; and FIG. 37D is a conceptual diagram showing a positional relation between a fuel injection orifice 86a and an air injection orifice 86b when the orifice plate 86 shown in FIG. 37A is seen in the direction of arrow H3.

In the orifice plate 86, as shown in FIGS. 37A to 37D, one fuel injection orifice 86a is formed in a rectangular slit shape and a pair of air injection orifices 86b are formed on both sides of and in parallel with the fuel injection orifice 86a. The air injection orifices 86b are in a rectangular shape of an elongated section and are positioned in the vicinity of the fuel injection orifice 86a. The "vicinity" is defined by the foregoing distance X from the fuel injection orifice to each gas injection orifice. As shown in FIGS. 37C and 37D, the shape and size of the fuel injection orifice 86a are the same as those of the fuel injection orifices 82a, 83a, 84a, and 85a. The fuel injection orifice 86a includes a curved recess 86c on the side (right-hand side in the figure) opposite to the injection side. The recess 86c is aligned with the hole 66a of the tube 66. In this embodiment, a maximum width W1 of each air injection orifice 86b is set narrower than the maximum width W1 of each air injection orifice 85b in the previous fifth embodiment. Instead, as shown in FIG. 37D, each air injection orifice 86b in this embodiment has a shape including an inner surface which is tapered divergently in the direction of injection. In this embodiment, the maximum width W1 of each air injection orifice 86b is set to 4.0 mm and a minimum width W2 thereof is set to 1.3 mm.

Figure 38A:
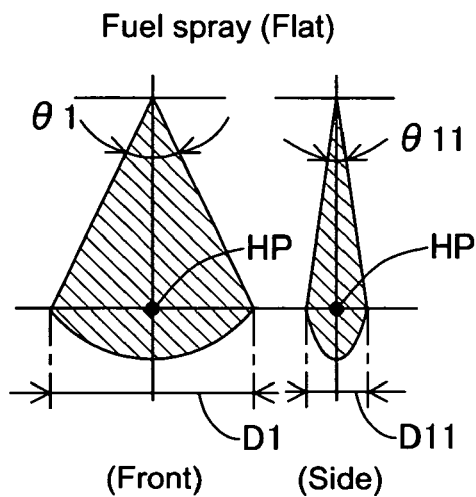
FIGS. 38A and 38B are conceptual diagrams each showing a fuel spray and an air jet.
Figure 38B:
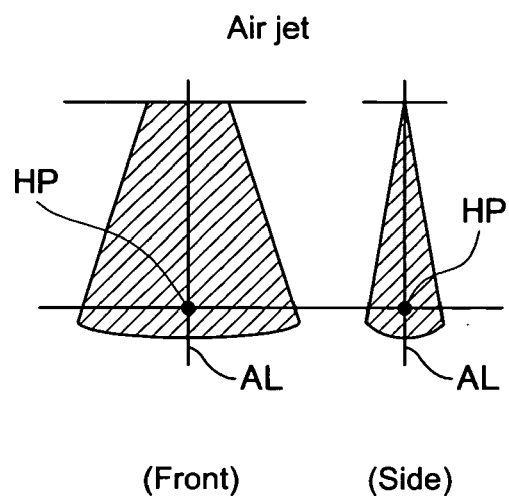

FIGS. 38A and 38B are conceptual diagrams of a fuel spray and an air jet. As shown in FIG. 38A, the fuel spray is in a flat, generally conical shape. A spray angle $\theta 1$ at a front face of the spray is larger than a spray angle $\theta 11$ at a side face of the spray. The spray angles $\theta 1$ and $\theta 11$ are determined by maximum and minimum widths of the fuel injection orifice 86a formed in the orifice plate 86. As shown in FIG. 38B, an air jet injected from each air injection orifice 86b is in a wedge shape wide at a front face and narrow at a side face. A collision point HP in this fuel spray is set so as to be positioned at a distance from an air injection orifice 86b at which the energy of an air jet injected from the air injection orifice 86b interferes with the fuel spray and permits adjusting the atomization of the fuel spray and the spray penetration distance and the spray shape. The size (outside diameter (width)) at the collision point HP of an air jet injected from each air injection orifice 86b is set so as to become almost equal to an outside diameter D1 at the collision point HP of a fuel spray injection from the fuel injection orifice 86a. The "size of an air jet" which becomes almost equal to the outside diameter D1 of the fuel spray is defined from "jet angle β," "gas jet outside diameter, b" and "distance, c" which are shown in FIGS. 8 and 9 and also from the foregoing expression "b=2*c*tan(β/2)." Thus, this fuel injection device is constructed so that the fuel injected from the fuel injection valve 43 and the air injected from the air injection valve 44 are brought into collision with each other within the combustion chamber 2.

Figure 39A:
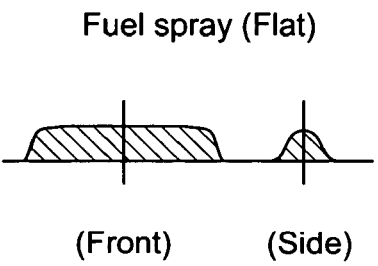
FIGS. 39A and 39B are conceptual diagrams each showing a difference between a spray strength and a jet strength at a collision point.
Figure 39B:
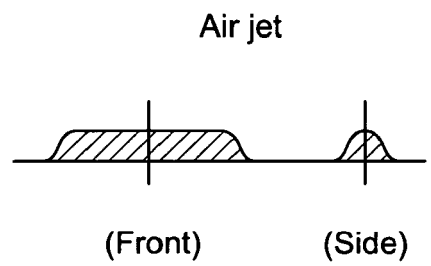

FIGS. 39A and 39B illustrate a difference between a spray strength and a jet strength at the collision point HP. As shown in FIG. 39A, the fuel spray exhibits a spray strength having a distribution range which is wide at a front face and narrow at a side face. As shown in FIG. 39B, each air jet exhibits a jet strength having a distribution range which is wide at a front face and narrow at a side face. Thus, a design is made so that the strength distribution of an air jet is superimposed uniformly on the strength distribution of the fuel spray.

Figure 40A:
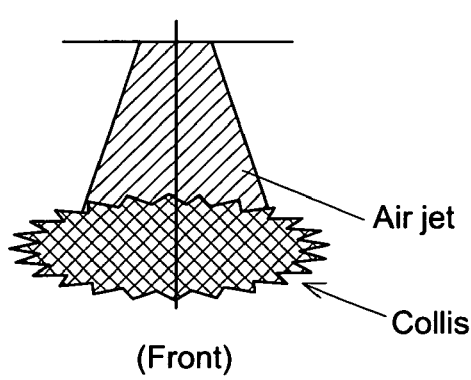
FIGS. 40A and 40B are conceptual diagrams each showing a state of collision of air jets with a fuel spray.
Figure 40B:
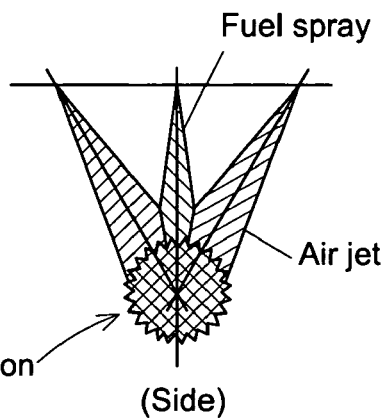

FIGS. 40A and 40B are conceptual diagrams showing a state of collision of plural air jets with a fuel spray. As shown in FIGS. 38A and 38B, a pair of air jets having the same size and strength distribution are brought into collision with one fuel spray at the spray angle $\theta 1$ and at the same size and strength distribution as the fuel spray at the collision point HP, so that the influence of the air jets can be exerted uniformly on the whole of the fuel spray without changing the spray angle $\theta 1$ of the fuel spray after the collision.

Particularly in this embodiment, since each air injection orifice 86b is rectangular in shape, an air jet injected therefrom expands in a flat conical shape corresponding to the rectangular shape. Since each air injection orifice 86b has an inner surface which is tapered divergently in the direction of injection, the strength distribution in the spread direction of the air jet becomes more flat and hence each air jet collides with the fuel spray more uniformly. As a result, the influence of each air jet can be exerted on the whole of the fuel spray without changing the spray angle $\theta 1$ of the fuel spray after the collision. Thus, it is seen that fuel can be atomized appropriately and that the spray penetration distance, etc., can be set appropriately.

Other functions and effects of this embodiment are basically the same as those of the fuel injection device of the fifth embodiment.

Seventh Embodiment

Next, a direct injection type fuel injection device according to a seventh embodiment of the present invention will be described in detail below with reference to associated drawings.

Figure 47A:
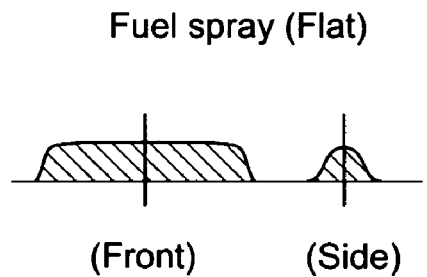
FIGS. 47A and 47B are conceptual diagrams each showing a difference between a spray strength and a jet strength at a collision point.

In this seventh embodiment the construction of an orifice plate is different from that in each of the previous embodiments. FIGS. 41A to 41D are characteristic diagrams of an orifice plate 87, of which FIG. 41A is a plan view of the orifice plate 87; FIG. 41B is a sectional view taken on line J1-J1 in FIG. 41A; FIG. 41C is a sectional view taken on line J2-J2 in FIG. 41A; and FIG. 41D is a conceptual diagram showing a positional relation between a fuel injection orifice 87a and air injection orifices 87b when the orifice plate 87 shown in FIG. 47A is seen in the direction of arrow J3.

In the orifice plate 87 used in this embodiment, as shown in FIGS. 41A to 41D, plural air injection orifices 87b are arranged at equal intervals on one side and in the longitudinal direction of the fuel injection orifice 87a which is in a rectangular slit shape. In this point the construction of the orifice plate 87 is different from that of the orifice plate 82 used in the second embodiment. More particularly, in the second embodiment a plurality of air injection orifices 82b are arranged in a row on each of both sides of the fuel injection orifice 82a, while in this seventh embodiment a plurality of air injection orifices 87b are arranged in a row on one side of the fuel injection orifice 87a. Other constructional points of the orifice plate 87 correspond to those of the orifice plate 82 used in the second embodiment.

FIGS. 42A and 42B are conceptual diagrams of a fuel spray and an air jet(s). The shape of the fuel spray and that of the air jet(s) in this embodiment correspond to those shown in FIGS. 22A and 22C.

FIGS. 43A and 43B illustrate a difference between a spray strength and a jet strength at the collision point HP. The state of the spray strength and that of the jet strength in this embodiment correspond to those shown in FIGS. 23A and 23C.

Figure 44C:
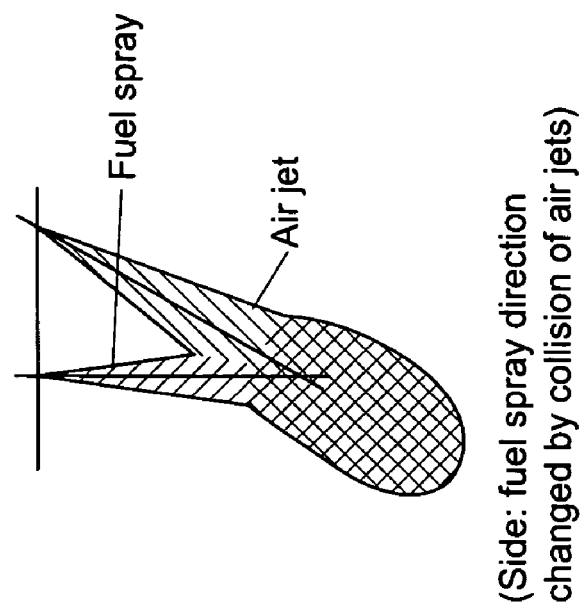
FIGS. 44A to 44C are conceptual diagrams each showing a state of collision of air jets with a fuel spray.
Figure 44B:
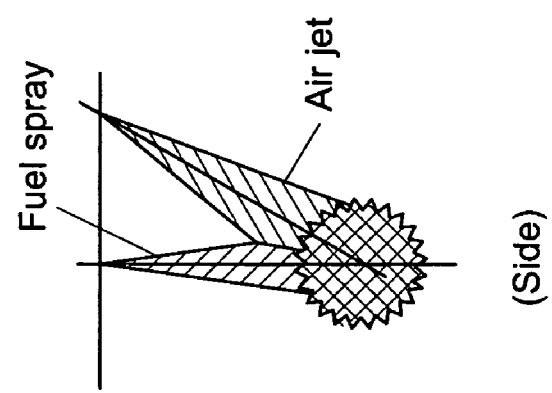
Figure 44A:
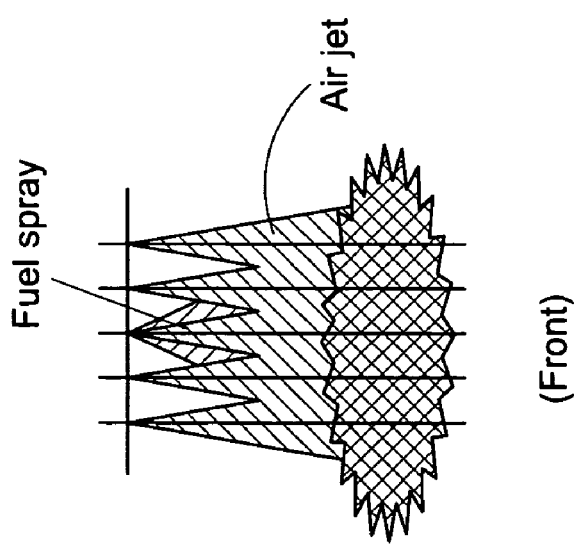

FIGS. 44A to 44C are conceptual diagrams showing a state of collision of plural air jets with a fuel spray. A collision point HP in this fuel spray is set so as to be positioned at a distance from an air injection orifice 87b at which the energy of an air jet injected from the air injection orifice 87b interferes with the fuel spray and permits adjusting atomization of the fuel spray and the spray penetration distance and spray shape. The size (outside diameter (width)

at the collision point HP of an air jet injected from each air injection orifice 87b is set so as to become almost equal to an outside diameter D1 at the collision point HP of a fuel spray injected from the fuel injection orifice 87a. The "size of an air jet" which becomes almost equal to the outside diameter D1 of the fuel spray is defined from "jet angle β," "gas jet outside diameter, b" and "distance, c" which are shown in FIGS. 8 and 9 and also from the foregoing expression "b=2*c*tan(β/2)." Thus, the influence of air jets can be exerted uniformly on the whole of the fuel spray. Consequently, it is seen that fuel can be atomized effectively and that the spray penetration distance, etc. can be adjusted effectively.

In this embodiment, moreover, since plural air injection orifices 87b are arranged in a row on only one side of the fuel injection orifice 87a to create air jets, the direction of the fuel spray can be changed obliquely horizontally by collision therewith of the air jets, as shown in FIG. 44C. Thus, the fuel can be atomized in conformity with the shape of the combustion chamber 2.

Other functions and effects of this embodiment are the same as those of the fuel injection device of the first embodiment.

Eighth Embodiment

A direct injection type fuel injection device according to an eighth embodiment of the present invention will be described in detail below with reference to associated drawings.

The construction of an air injection orifice formed in an orifice plate in this embodiment is different from that in the previous seventh embodiment. FIGS. 45A to 45D are characteristic diagrams of an orifice plate 88, of which FIG. 45A is a plan view of the orifice plate 88; FIG. 45B is a sectional view taken on line K1-K1 in FIG. 45A; FIG. 45C is a sectional view taken on line K2-K2 in FIG. 45A; and FIG. 45D is a conceptual diagram showing a positional relation between a fuel injection orifice 88a and an air injection orifice 88b when the orifice plate 88 shown in FIG. 45A is seen in the direction of arrow K3.

In the orifice plate 88, as shown in FIGS. 45A to 45D, one rectangular air injection orifice 88b is formed on one side of a fuel injection orifice 88a which is in a rectangular slit shape, the air injection orifice 88b being disposed in the longitudinal direction of and in parallel with the fuel injection orifice 88a. In this point the construction of the orifice plate 88 in this eighth embodiment is different from that of the orifice plate 85 used in the fifth embodiment. More particularly, in the fifth embodiment a pair of air injection orifices 85b are disposed on both sides of and in parallel with the fuel injection orifice 85a, while in this eighth embodiment the air injection orifice 88b is disposed on only one side of and in parallel with the fuel injection orifice 88a. Other constructional points of the orifice plate 88 correspond to those of the orifice plate 85 used in the fifth embodiment.

Figure 46A:
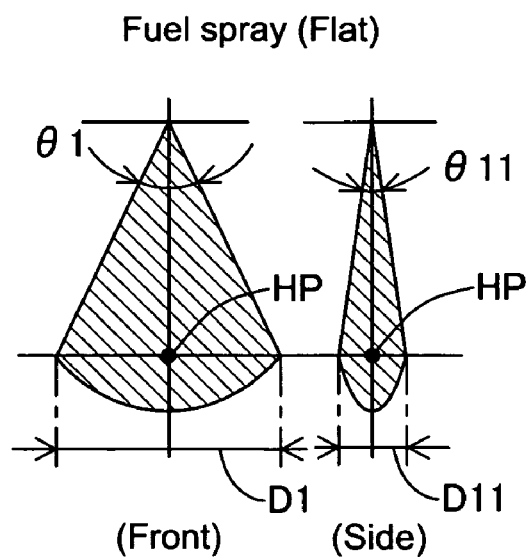
FIGS. 46A and 46B are conceptual diagrams each showing a fuel spray and an air jet.
Figure 46B:
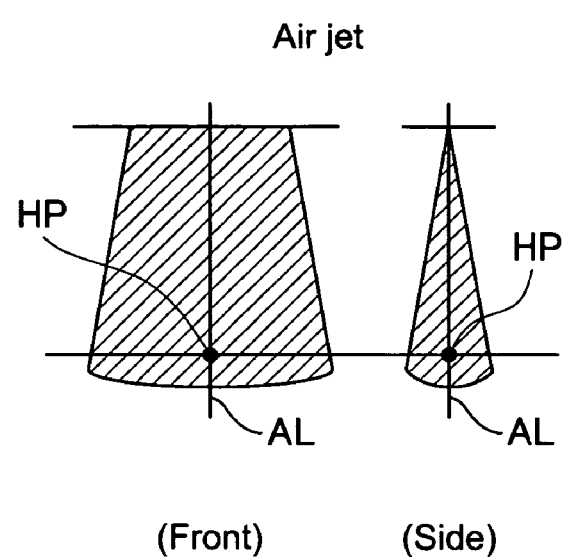

FIGS. 46A and 46B are conceptual diagrams of a fuel spray and an air jet. The shape of the fuel spray and the air jet in this embodiment correspond to those shown in FIGS. 34A and 34B.

Figure 47B:
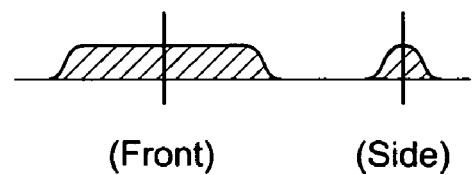

FIGS. 47A and 47B illustrate a difference between a spray strength and a jet strength at the collision point HP. The state of spray strength and that of jet strength in this embodiment correspond to those shown in FIGS. 35A and 35B.

Figure 48C:
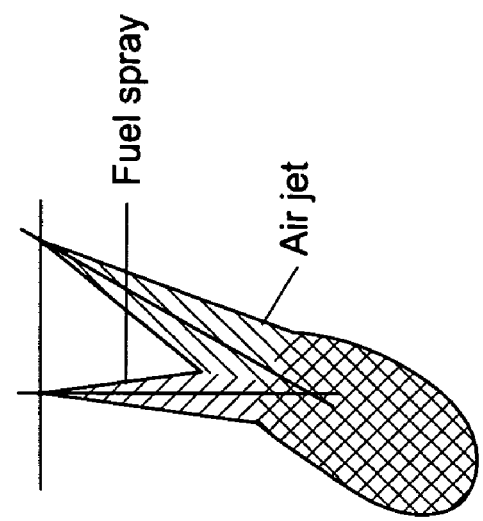
FIGS. 48A to 48C are conceptual diagrams each showing a state of collision of air jets with a fuel spray.
Figure 48B:
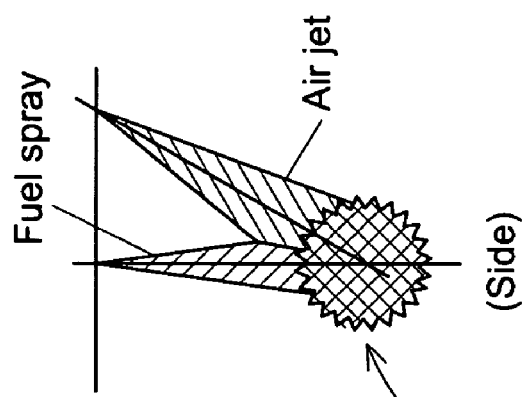
Figure 48A:
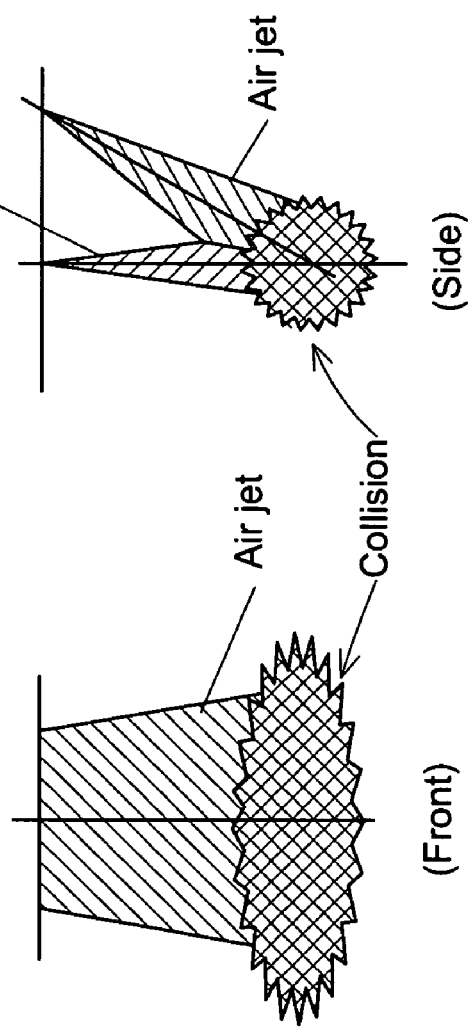

FIGS. 48A to 48C are conceptual diagrams showing a state of collision of plural air jets with a fuel spray. As shown in FIGS. 46A and 46B, since air jets are brought into collision with the fuel spray at the same size and strength distribution as the fuel spray at the collision point HP, the influence of the air jet can be exerted uniformly on the whole of the fuel spray. Consequently, it is seen that fuel can be atomized effectively and that the spray penetration distance, etc. can be adjusted effectively In this embodiment, moreover, since one air injection orifice 88b is disposed on only one side of and in parallel with the fuel injection orifice 88a to generate an air jet, the direction of the fuel spray can be changed obliquely horizontally by collision therewith of the air jet, as shown in FIG. 48C. Thus, the fuel can be atomized in conformity with the shape of the combustion chamber 2.

Other functions and effects of this embodiment are basically the same as those of the fuel injection device of the previous seventh embodiment.

Ninth Embodiment

Next, a direct injection type fuel injection device according to a ninth embodiment of the present invention will be described in detail below with reference to associated drawings.

Figure 49:
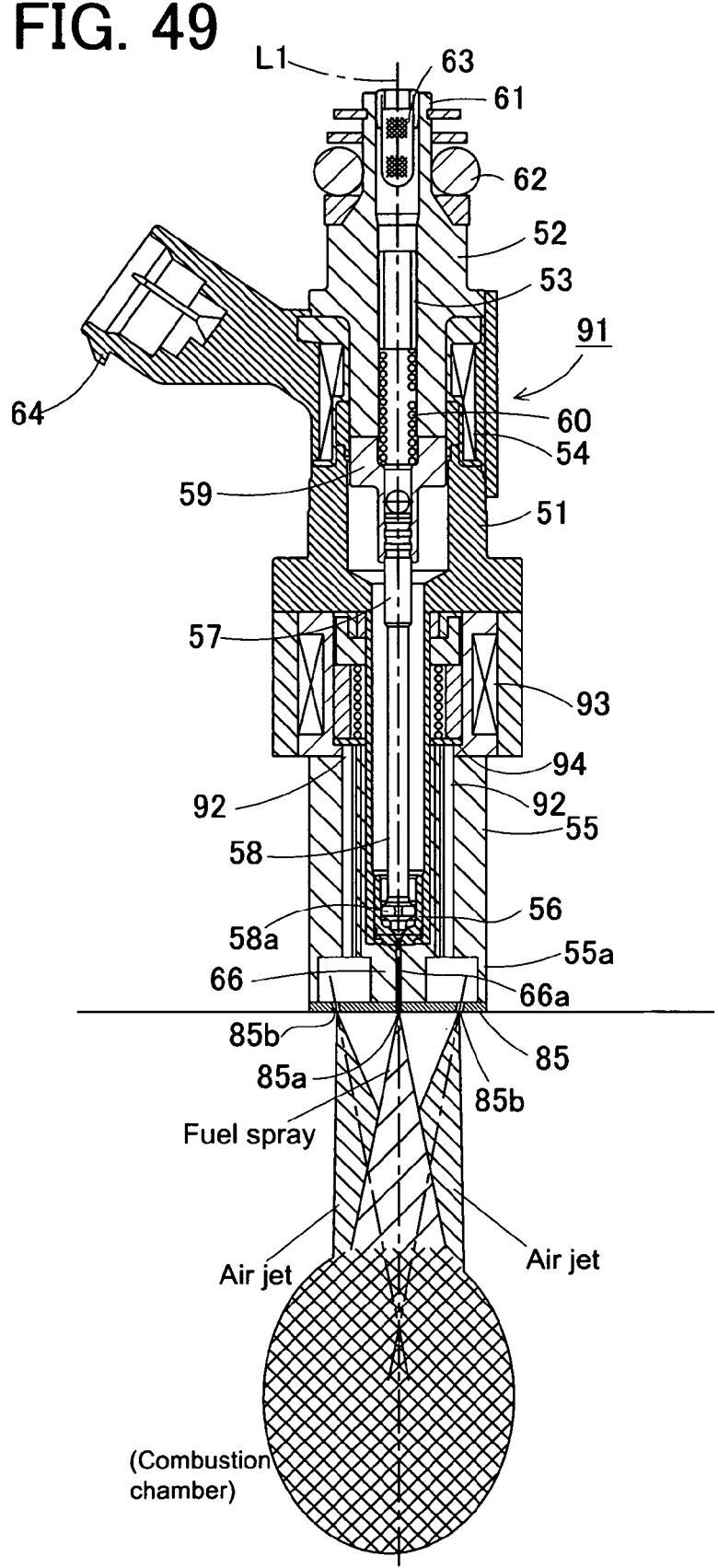
FIG. 49, which is concerned with a ninth embodiment of the present invention, is a sectional view showing an integral type fuel injection valve.

The construction of this embodiment is different from that of the previous embodiments in that a fuel injection valve is integrally endowed with the function of an air injection valve. FIG. 49 is a sectional view of an air injection valve-combined fuel injection valve 91. The combined type fuel injection valve 91 used in this embodiment is integrally provided with a cylindrical portion 55a at a front end of a lower body 55 thereof. An orifice plate 85 is fixed to a front end of the cylindrical portion 55a. Pressurized air is fed to an air passage 92 through an air pipe (not shown). A solenoid 93 is provided at a base end portion of the lower body 55. A valve body 94 for opening and closing the air passage 92 is provided in the lower body 55. When the valve body 94 operates upon energization or deenergization of the solenoid 93, the passage 92 is opened or closed and pressurized air is fed into the cylindrical portion 55a and is injected from an air injection orifice 85b formed in the orifice plate 85 to form an air jet. Further, fuel is injected from a fuel injection orifice 85a formed in the orifice plate 85 through a hole 66a of a tube 66 which is integrally provided at the center of the cylindrical portion 55a, thereby forming a fuel spray.

Thus, in this embodiment there is used the air injection valve-combined fuel injection valve 91, so that the fuel injection device can be constructed more compactly than in the previous embodiments wherein the fuel injection valve 43 and the air injection valve 44 are provided separately. Other functions and effects of this embodiment are basically the same as those of the previous embodiments.

Tenth Embodiment

Next, a direct injection type fuel injection device according to a tenth embodiment of the present invention will be described in detail below with reference to associated drawings.

Figure 50:
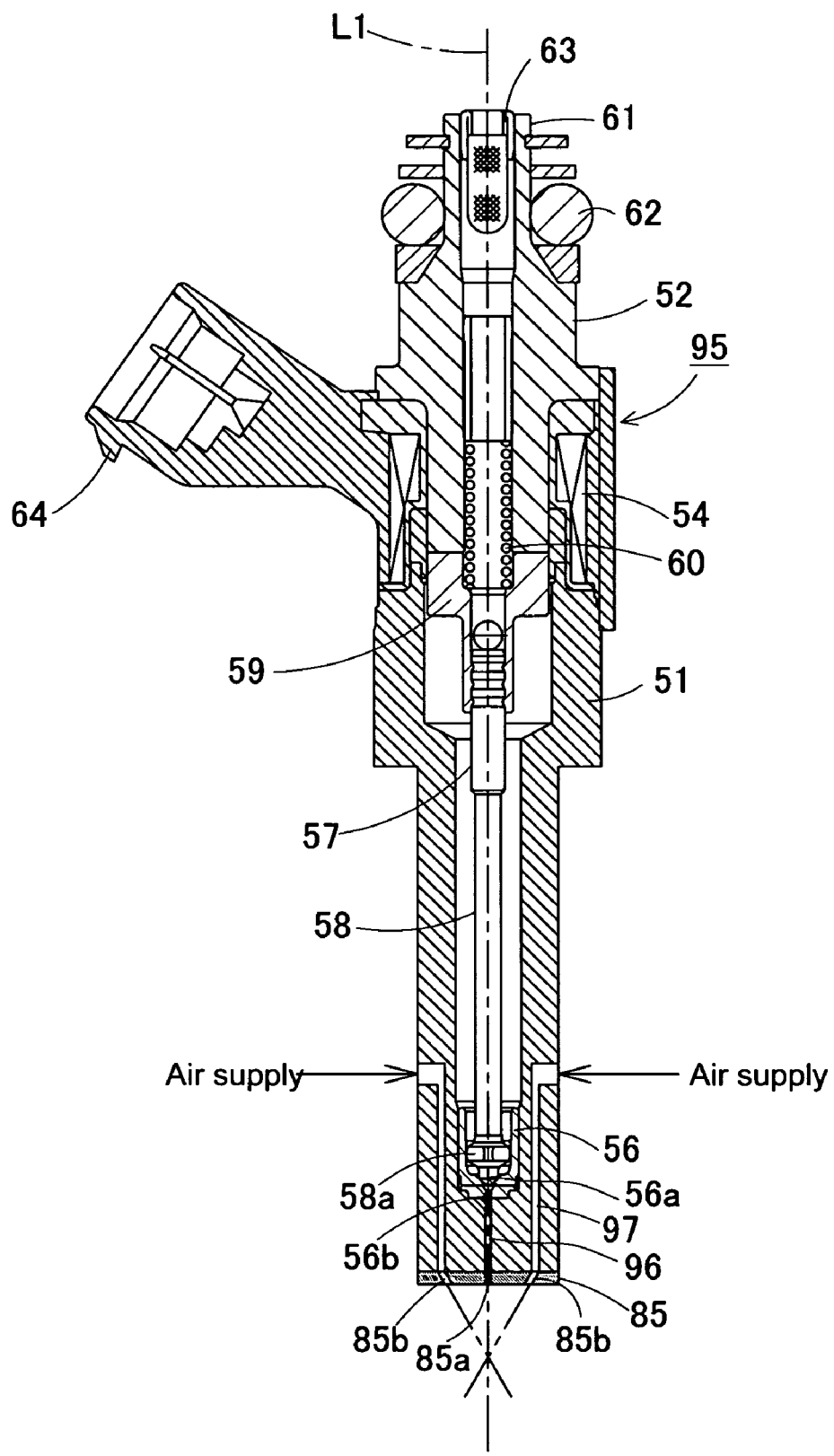
FIG. 50, which is concerned with a tenth embodiment of the present invention, is a sectional view showing a fuel injection valve.

The construction of this embodiment is different from that of the previous embodiments in that a fuel injection valve is endowed with the air injecting function of an air injection valve. FIG. 50 is a sectional view of a fuel injection valve 95. In the fuel injection valve 95 used in this tenth embodiment, a lower body is integral with a housing 51. An orifice plate 85 is fixed directly to a front end of the housing 51. In the front end portion of the housing 51 is formed a fuel passage 96 which provides communication between a fuel injection orifice 85a formed in the orifice plate 85 and a valve hole 56b formed in a nozzle body 56. Also, in the front end portion of the housing 51 there are formed air passages 97 around the fuel passage 96. Pressurized air is fed to each of the air passages 97 through an air control valve (not shown) which is provided separately. When the air control valve is controlled, pressurized air is injected from air injection orifices 85b in the orifice plate 85 through the air passages 97 to form air jets. Further, as a valve portion 58a opens or closes with respect to a valve seat 56a, fuel is injected through the fuel passage 96 and further through a fuel injection orifice 95a formed in the orifice plate 85 to form a fuel spray.

Thus, since in this embodiment the fuel injection valve 95 is endowed with the function of an air injection valve, the construction of the fuel injection device located around the engine can be made compact in comparison with the previous embodiments wherein the fuel injection valve 43 and the air injection valve 44 are provided separately. Other functions and effects of this embodiment are the same as those of the previous embodiments.

Eleventh Embodiment

Next, a direct injection type fuel injection device according to an eleventh embodiment of the present invention will be described in detail below with reference to associated drawings.

The fuel injection device of this embodiment is provided with a fuel injection valve for forming one fuel spray and plural air injection valves for forming plural air jets each independently. In this point the construction of the fuel injection valve of this embodiment is different from those of the previous embodiments.

Figure 51:
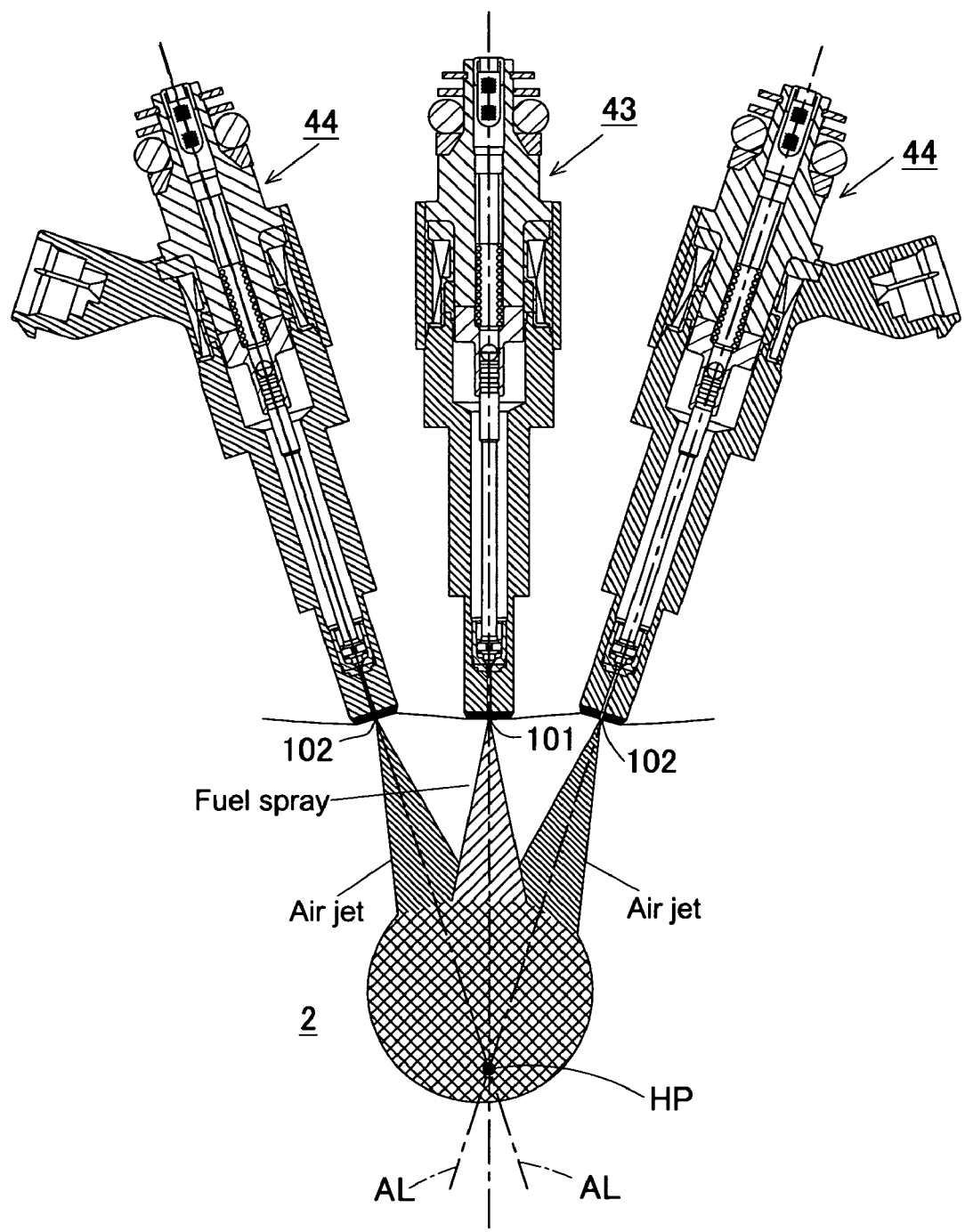
FIG. 51, which is concerned with an eleventh embodiment of the present invention, is a sectional view showing a schematic construction of a fuel injection device.

FIG. 51 is a sectional view showing a schematic construction of the fuel injection device. A fuel injection valve 43 and two air injection valves 44 are basically the same in construction. A detailed construction of the injection valves 43 and 44 is the same as that of the fuel injection valve 43 shown in FIG. 2. In this embodiment, a fuel injection orifice 101 provided correspondingly to the fuel injection valve 43 and opening into a combustion chamber 2 may be, for example, circular or in a rectangular slit shape. On the other hand, air injection orifices 102 provided correspondingly to the air injection valves 44 and opening into the combustion chamber 2 may comprise a row of plural air injection orifices of a circular shape or may be rectangular air injection orifices. Also in this embodiment a design is made so that air jets are brought into collision with a fuel spray at the same size and strength distribution as the fuel spray at a collision point HP. Thus, this fuel injection device is constructed so that the fuel injected from the fuel injection valve 43 and the air injected from the air injection valve 44 are brought into collision with each other within the combustion chamber 2.

Therefore, also in the fuel injection device of this embodiment there can be obtained the same functions and effects as those of the fuel injection devices of the previous embodiments.

Twelfth Embodiment

Next, a direct injection type fuel injection device according to a twelfth embodiment of the present invention will be described in detail below with reference to associated drawings.

Figure 52:
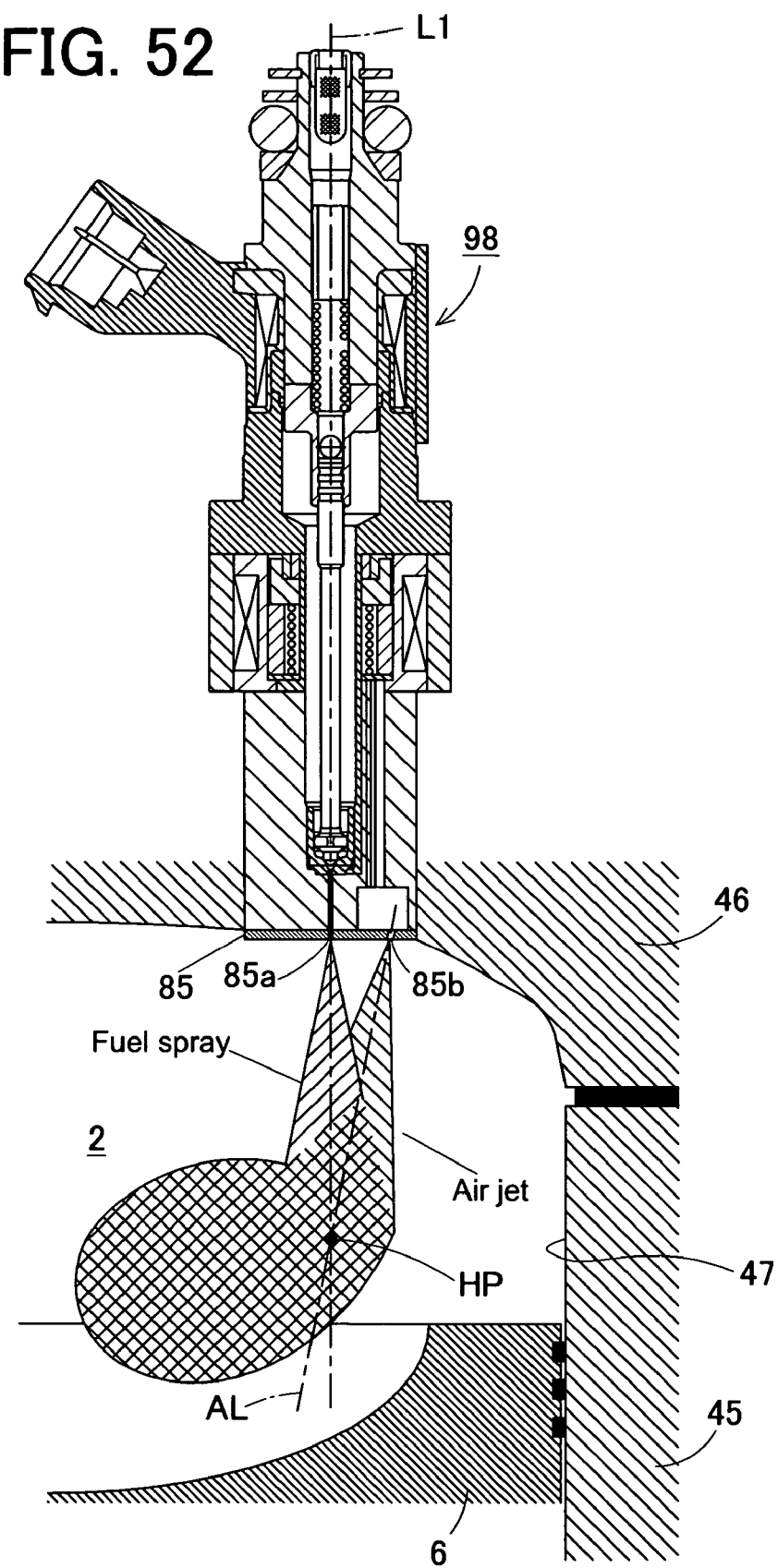
FIG. 52, which is concerned with a twelfth embodiment of the present invention, is a sectional view showing a schematic construction of a fuel injection device.

The fuel injection device of this embodiment corresponds to a modification of the ninth embodiment. FIG. 52 is a sectional view showing a schematic construction of this fuel injection device. As is seen from a comparison with FIG. 49, an integral type fuel injection valve 98 used in this embodiment is constructed such that an air jet is brought into collision from only one side with a fuel spray. The integral type fuel injection valve 98 basically has the same construction as that of the integral type fuel injection valve 91 used in the ninth embodiment. Therefore, an explanation of a detailed construction of the injection valve 98 will here be omitted. In this embodiment, a fuel injection orifice 85a is in a rectangular slit shape and an air injection orifice 85b is rectangular. An air jet is created from the air injection orifice 85b positioned on one side of the fuel injection orifice 85a. Further, a design is made so that the air jet is brought into collision with a fuel spray at the same size and strength distribution as the fuel spray at a collision point HP. Thus, this fuel injection device is constructed so that the fuel injected from the integral type fuel injection valve 98 and the air injected from the air injection orifice 85b are brought into collision with each other within the combustion chamber 2.

Accordingly, also in the fuel injection device of this embodiment there can be obtained the same functions and effects as those of the fuel injection devices of the previous embodiments. Additionally, since in this embodiment the air injection orifice 85b is disposed on only one side of the fuel injection orifice 85a to form an air jet, the direction of a fuel spray can be changed obliquely horizontally by collision therewith of the air jet. Consequently, fuel can be atomized in conformity with the shape of the combustion chamber 2.

Thirteenth Embodiment

A direct injection type fuel injection device according to a thirteenth embodiment of the present invention will be described in detail below with reference to associated drawings.

Figure 53:
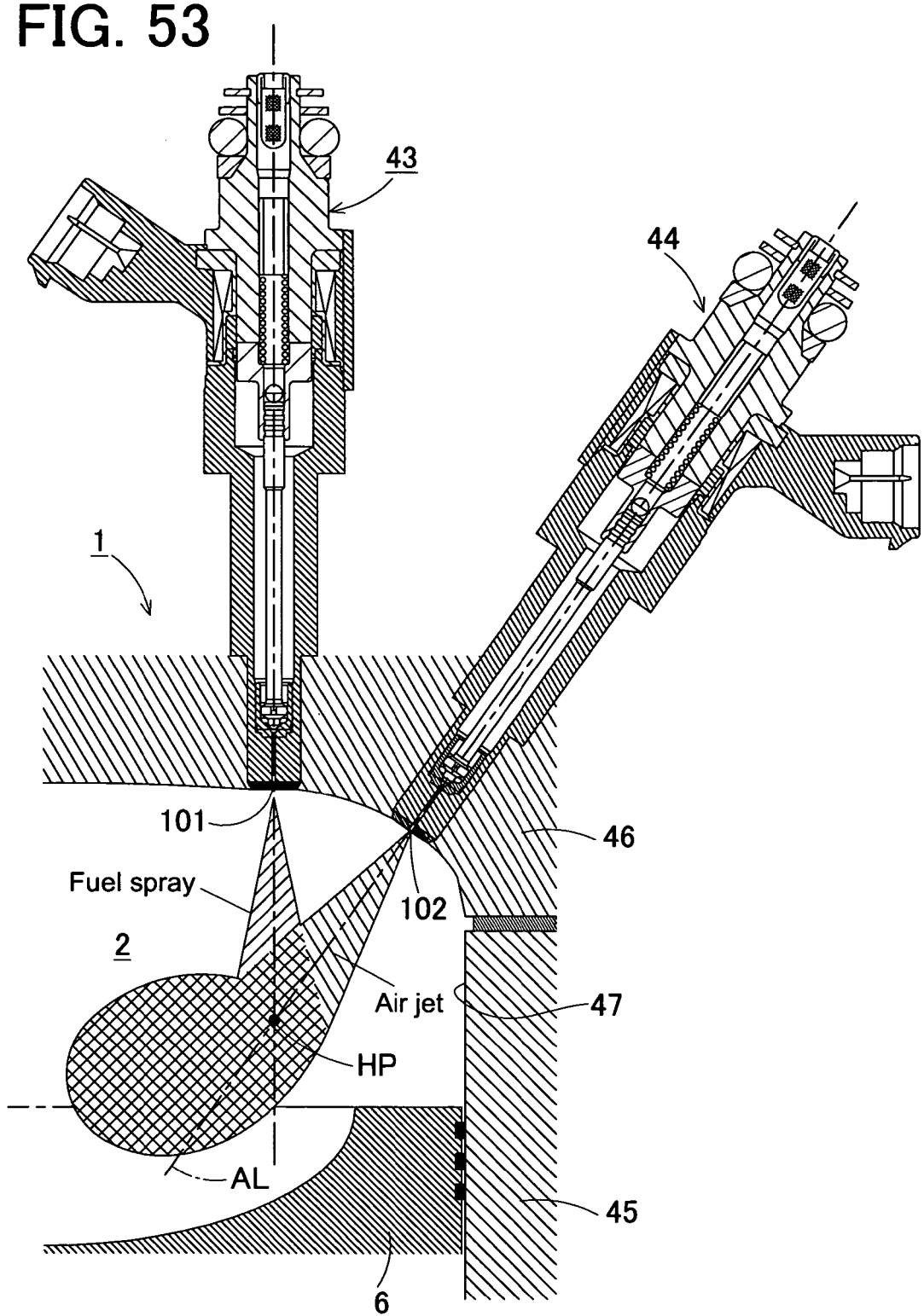
FIG. 53, which is concerned with a thirteenth embodiment of the present invention, is a sectional view showing a schematic construction of a fuel injection device.

In the fuel injection device of this embodiment it is intended that the function of the fuel injection device of the previous twelfth embodiment is to be attained not by the integral type fuel injection device 98 but by a fuel injection valve 43 and an air injection valve 44 which are provided separately. FIG. 53 is a sectional view showing a schematic construction of this fuel injection device. In this embodiment, as is seen from a comparison with FIG. 52, one fuel injection valve 43 and at least one air injection valve 44 are mounted to the cylinder head 46. In this embodiment, a fuel injection orifice 101 provided correspondingly to the fuel injection valve 43 and opening into a combustion chamber 2 may be, for example, circular or in a rectangular slit shape. On the other hand, an air injection orifice 102 provided correspondingly to the air injection valve(s) 44 may comprise a row of plural circular air injection orifices or may be a rectangular air injection orifice. The air injection valve(s) 44 is disposed so that an air jet(s) is brought into collision from only one side with a fuel spray injected from one fuel injection valve 43. That is, a design is made so that a jet axis AL of an airjet from the air injection orifice 102 intersects a collision point HP at a maximum diameter of the fuel spray injected from the fuel injection valve 43. Thus, the fuel injection device of this embodiment is constructed such that the fuel injected from the fuel injection valve 43 and the air injected from the air injection valve 44 are brought into collision with each other within the combustion chamber 2.

Accordingly, also in the fuel injection device of this embodiment there can be obtained the same functions and effects as in the fuel injection devices of the previous embodiments. In this embodiment, moreover, since the air injection valve 44 is disposed on only one side of the fuel injection valve 43 to generate an air jet, the direction of the fuel spray can be changed obliquely horizontally by collision therewith of the air jet, as shown in FIG. 53. Thus, fuel can be atomized in conformity with the shape of the combustion chamber 2.

Fourteenth Embodiment

Next, a direct injection type fuel injection device according to a fourteenth embodiment of the present invention will be described in detail below with reference to associated drawings.

Figure 54:
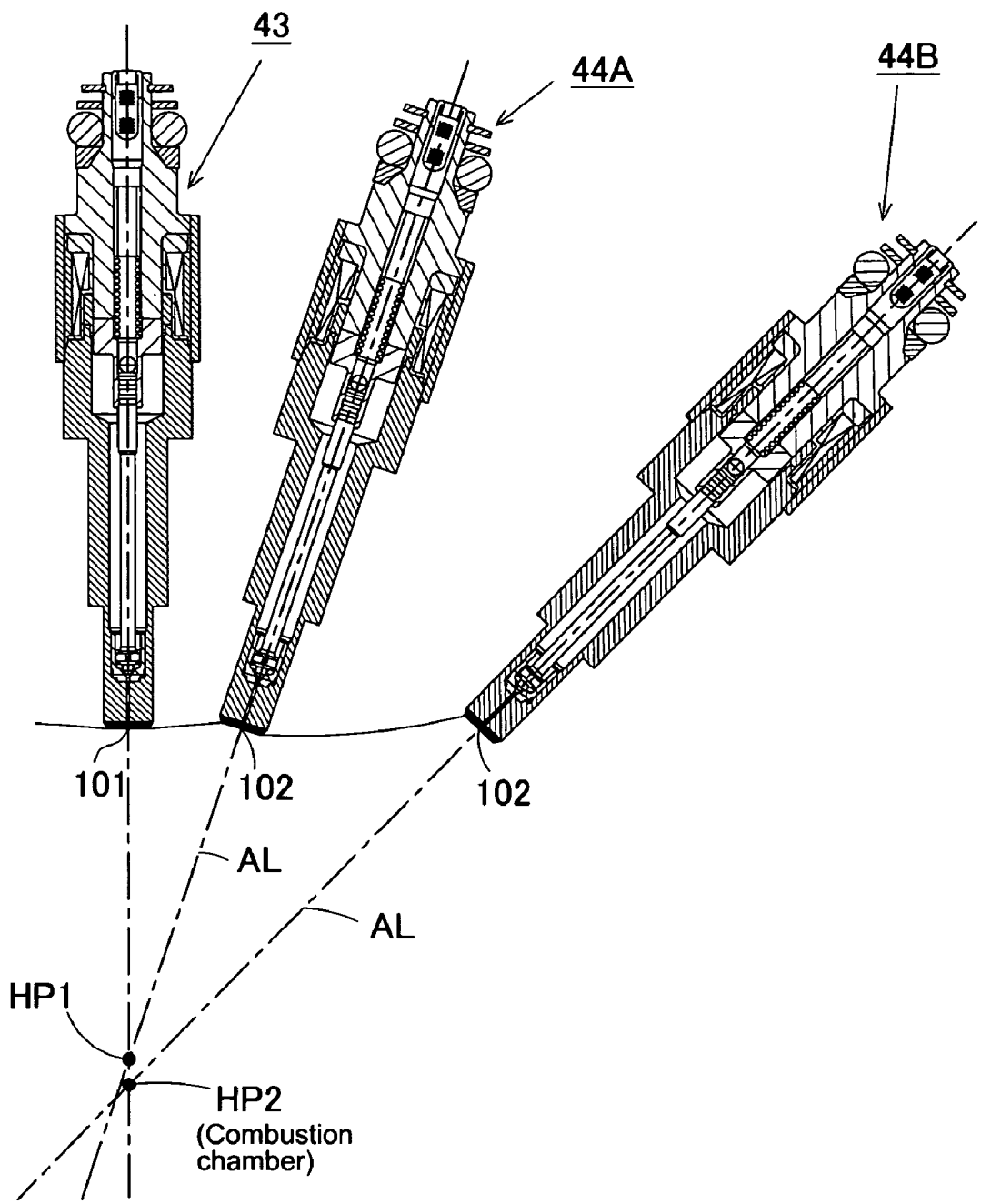
Figure 55:
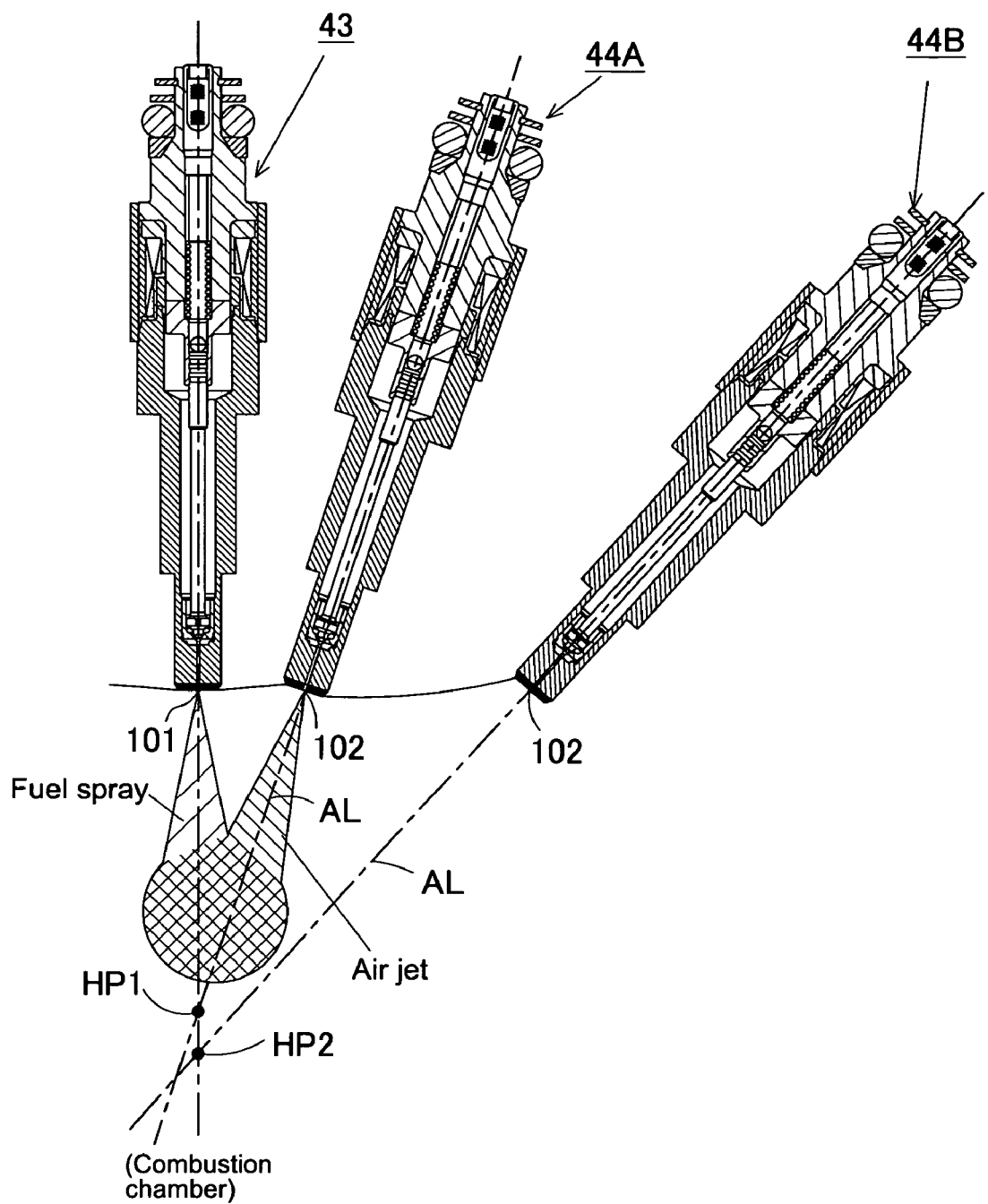
Figure 56:
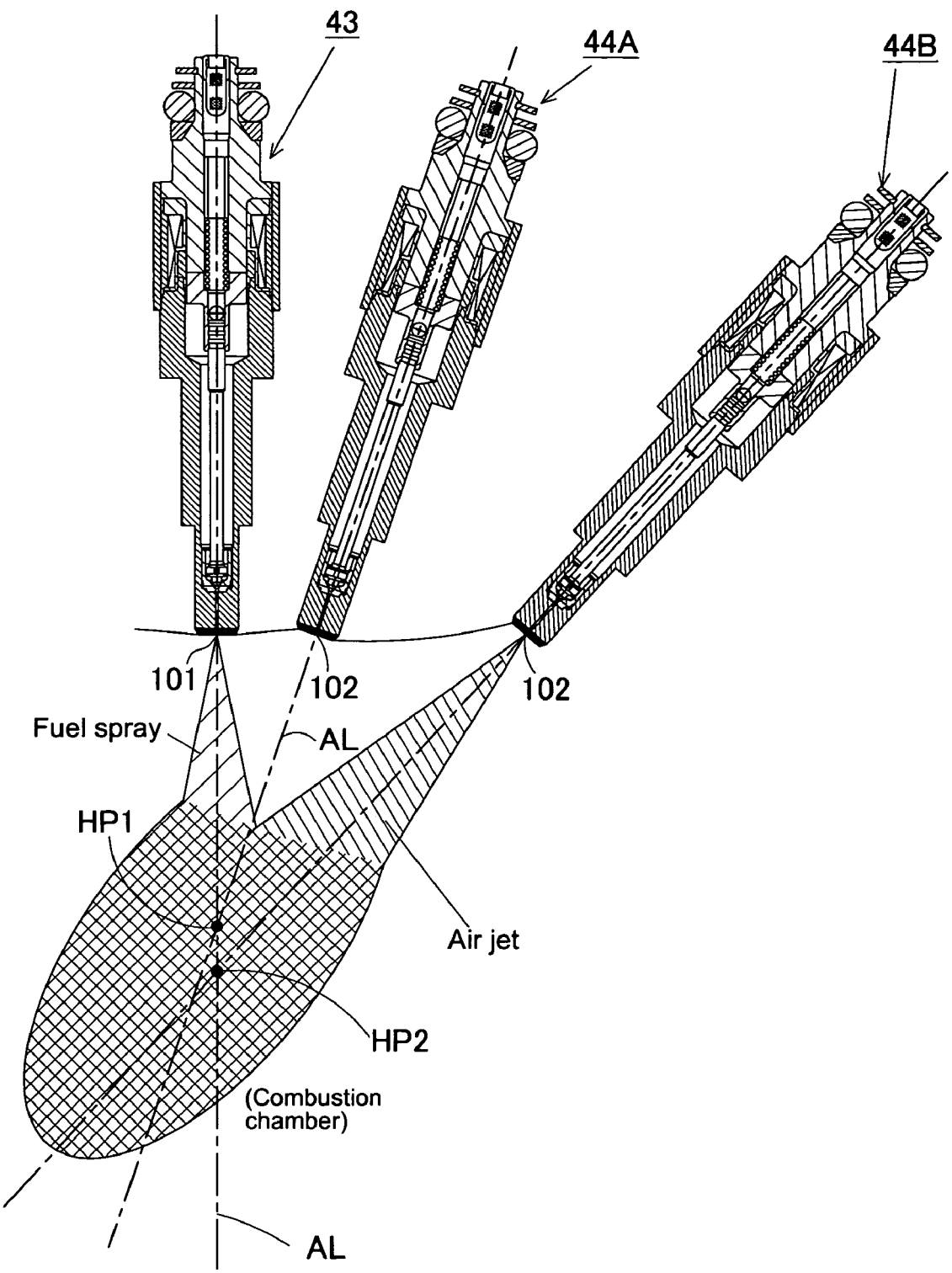

FIGS. 54 to 56 are sectional views showing a schematic construction of a fuel injection device according to this fourteenth embodiment. In the fuel injection device of this embodiment, at least first and second air injection valves 44A and 44B are provided for one fuel injection valve 43 which includes one fuel injection orifice 101. Air injection orifices 102 are provided correspondingly to the air injection valves 44A and 44B and, for selectively switching the injection of air from one to the other air injection orifice 102, the air injection valves 44A and 44B are switched from one to the other in use.

In this embodiment, the first and second air injection valves 44A and 44B are arranged in such a manner that air jets are brought into collision from only one side of a fuel spray with the fuel spray which is formed by one fuel injection valve 43. That is, a design is made so that an air jet injected from the air injection orifice 102 of the first air injection valve 44A is brought into collision with the fuel spray at the same size and strength distribution as the fuel spray at a collision point HP. Likewise, a design is made so that an air jet injected from the air injection orifice 102 of the second air injection valve 44B is brought into collision with the fuel spray at the same size and strength distribution as the fuel spray at a collision point HP. Thus, the fuel injection device of this embodiment is constructed such that the fuel injected from the fuel injection valve 43 and the air injection from each of the air injection valves 44A and 44B are brought into collision within the combustion chamber 2.

Therefore, according to the fuel injection device of this embodiment, by switching the two air injection valves 44A and 44B from one to the other in use, the injection of air from the air injection orifices 102 is switched selectively. With this switching operation, the form of collision of an air jet with the fuel spray is changed and hence the shape of the fuel spray is changed. That is, as shown in FIG. 55, in case of using only the first air injection valve 44A selectively for the fuel injection valve 43 and when an air jet is brought into collision with a fuel spray injected from the fuel injection valve 43, it is possible to let the collision occur in a relatively narrow range. On the other hand, as shown in FIG. 56, in case of using only the second air injection valve 44B selectively for the fuel injection valve 43 and when an air jet is brought into collision with the fuel spray, it is possible to let the collision occur in a relatively wide range. Thus, the collision range between fuel spray and air jet can be switched between two ranges. As a result, the spray penetration distance and the spray shape can be switched selectively and hence it is possible to adjust the atomization of fuel in accordance with operating conditions of the engine 1.

The present invention is not limited to the above embodiments, but a part of its construction may be altered appropriately, for example as follows, within the scope not departing from the gist of the invention.

Although in the above embodiments air is used as the gas to be collided with fuel, there may be used any other specific gas than air.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A direct injection type fuel injection device having a fuel injection valve for injecting fuel into a combustion chamber in an internal combustion engine which includes an intake valve and an exhaust valve, and having a gas injection valve for injecting gas into the combustion chamber, the direct injection type fuel injection device comprising:
    said one fuel injection valve, with one or more fuel injection orifices being provided correspondingly to the fuel injection valve and opened into the combustion chamber; and
    at least said one gas injection valve, with one or more gas injection orifices being provided correspondingly to the gas injection valve and opened into the combustion chamber,
    the shape, size, direction, and arrangement of the fuel injection orifice being specified,
    the number, shape, size, direction, and arrangement relative to the fuel injection orifice, of the gas injection orifice being specified,
    wherein fuel injected from the fuel injection valve into the combustion chamber through the fuel injection orifice and gas injected from the gas injection valve into the combustion chamber through the gas injection orifice are brought into collision with each other,
    the gas injection orifice is disposed in the vicinity of the fuel injection orifice,
    the vicinity is defined by a distance (X) between a center of the fuel injection orifice and a center of the gas injection orifice, represented by the following expression:

$$X \leq 0.03 * d * P_a^{0.5} * \rho_a^{0.35} * \rho_0^{-0.85}$$

where "d" stands for the diameter of the gas injection orifice, "$P_a$" stands for an absolute pressure of the injected gas, "$\rho_a$" stands for a gas density under the absolute pressure of the injected gas, and "$\rho_0$" stands for a gas density of an injection site.

2. The direct injection type fuel injection device according to claim 1, wherein the distance (X) is set at a predetermined value in a range of 1 to 4 mm.

3. The direct injection type fuel injection device according to claim 1, wherein an angle of collision between the fuel injected from the fuel injection orifice and the gas injected from the gas injection orifice is set at a predetermined value in a range of 15° to 75°.

4. The direct injection type fuel injection device according to claim 1, wherein pressure of the fuel fed to the fuel injection valve is set at a predetermined value in a range of 1 to 4 MPa.

5. The direct injection type fuel injection device according to claim 1, wherein the size of a gas jet injected from the gas injection orifice is set so as to become almost equal to the size of a fuel spray injected from the fuel injection orifice.

6. The direct injection type fuel injection device according to claim 1, wherein the gas injection orifice is rectangular.

7. The direct injection type fuel injection device according to claim 1, wherein the gas injection orifice includes an inner surface which is tapered divergently in the direction of injection.

8. The direct injection type fuel injection device according to claim 1, wherein the fuel injection orifice is circular, and a plurality of gas injection orifices are formed at equal angle intervals on a circumference centered at the fuel injection orifice.

9. The direct injection type fuel injection device according to claim 8, wherein an angle of collision between the fuel injected from the fuel injection orifice and the gas injected from the gas injection orifice is set at a predetermined value in a range of 15° to 75°.

10. The direct injection type fuel injection device according to claim 8, wherein pressure of the fuel fed to the fuel injection valve is set at a predetermined value in a range of 1 to 4 MPa.

11. The direct injection type fuel injection device according to claim 8, wherein the distance (X) is set at a predetermined value in a range of 1 to 4 mm.

12. The direct injection type fuel injection device according to claim 8, wherein the fuel injection orifice and the plural gas injection orifices are formed in one orifice plate.

13. The direct injection type fuel injection device according to claim 1, wherein the fuel injection orifice is rectangular, and a plurality of gas injection orifices are arranged at equal intervals on both sides of and in the longitudinal direction of the fuel injection orifice.

14. The direct injection type fuel injection device according to claim 13, wherein the fuel injection orifice and the plural gas injection orifices are formed in one orifice plate.

15. The direct injection type fuel injection device according to claim 1, wherein the fuel injection orifice is rectangular, and a pair of gas injection orifices are arranged on both sides of and in parallel with the fuel injection orifice.

16. The direct injection type fuel injection device according to claim 15, wherein the fuel injection orifice and the pair of gas injection orifices are formed in one orifice plate.

17. The direct injection type fuel injection device according to claim 1, wherein the fuel injection orifice is rectangular, and a plurality of gas injection orifices are arranged at equal intervals on one side and in the longitudinal direction of the fuel injection orifice.

18. The direct injection type fuel injection device according to claim 17, wherein the fuel injection orifice and the plural gas injection orifice are formed in one orifice plate.

19. The direct injection type fuel injection device according to claim 1, wherein the fuel injection orifice is rectangular, and one gas injection orifice is disposed on one side of and in parallel with the fuel injection orifice.

20. The direct injection type fuel injection device according to claim 19, wherein the fuel injection orifice and the gas injection orifice are formed in one orifice plate.

21. The direct injection type fuel injection device according to claim 1, wherein the fuel injection valve and the gas injection valve are mounted integrally with each other by a mounting member correspondingly to the combustion chamber.

22. The direct injection type fuel injection device according to claim 1, wherein said plural gas injection valves are provided, one or more gas injection orifices are provided correspondingly to the gas injection valves, and the gas injection valves are switched from one to another in use for switching the injection of gas from the gas injection orifices selectively.

* * * * *